(12) United States Patent
Wakabayashi et al.

(10) Patent No.: US 10,074,958 B2
(45) Date of Patent: Sep. 11, 2018

(54) LASER SYSTEM

(71) Applicant: Gigaphoton Inc., Tochigi (JP)

(72) Inventors: Osamu Wakabayashi, Oyama (JP);
Masaki Arakawa, Oyama (JP); Kouji Kakizaki, Oyama (JP)

(73) Assignee: Gigaphoton Inc., Tochigi (JP)

( * ) Notice: Subject to any disclaimer, the term of this patent is extended or adjusted under 35 U.S.C. 154(b) by 0 days.

(21) Appl. No.: 15/353,235

(22) Filed: Nov. 16, 2016

(65) Prior Publication Data

US 2017/0063025 A1  Mar. 2, 2017

Related U.S. Application Data

(63) Continuation of application No. PCT/JP2014/069982, filed on Jul. 29, 2014.

(30) Foreign Application Priority Data

Jun. 20, 2014 (WO) .................. PCT/JP2014/066396
Jul. 11, 2014 (WO) .................. PCT/JP2014/068581

(51) Int. Cl.
| | |
|---|---|
| *G02B 27/10* | (2006.01) |
| *H01S 3/13* | (2006.01) |
| *G01J 1/42* | (2006.01) |
| *H01S 3/00* | (2006.01) |
| *H01S 3/139* | (2006.01) |

(Continued)

(52) U.S. Cl.
CPC .......... *H01S 3/1305* (2013.01); *G01J 1/4257* (2013.01); *H01S 3/0014* (2013.01); *H01S 3/1394* (2013.01); *H01S 3/2383* (2013.01); *G01J 2001/4261* (2013.01); *H01S 3/005* (2013.01); *H01S 3/0071* (2013.01); *H01S 3/225* (2013.01)

(58) Field of Classification Search
CPC .... H01S 3/1305; H01S 3/2383; H01S 3/0014; H01S 3/1394; H01S 3/225; H01S 3/005; H01S 3/0071; G01J 1/4257; G01J 2001/4261; G02B 27/10
See application file for complete search history.

(56) References Cited

U.S. PATENT DOCUMENTS

| | | |
|---|---|---|
| 7,061,959 B2 | 6/2006 | Partlo et al. |
| 8,416,500 B2 | 4/2013 | Mitra et al. |

(Continued)

FOREIGN PATENT DOCUMENTS

| | | |
|---|---|---|
| EP | 0 980 123 A2 | 2/2000 |
| JP | H04-174580 A | 6/1992 |

(Continued)

OTHER PUBLICATIONS

International Search Report issued in PCT/JP2014/069982; dated Jan. 13, 2015.

*Primary Examiner* — Joseph P Martinez
(74) *Attorney, Agent, or Firm* — Studebaker & Brackett PC

(57) ABSTRACT

The laser system may include a plurality of laser apparatuses, a beam delivery device configured to bundle pulse laser beams emitted from respective laser apparatuses of the plurality of laser apparatuses to emit a bundled pulse laser beam, and a beam parameter measuring device provided in an optical path of the bundled pulse laser beam to measure a beam parameter of each one of the pulse laser beams and a beam parameter of the bundled pulse laser beam.

9 Claims, 31 Drawing Sheets

(51) Int. Cl.
*H01S 3/23* (2006.01)
*H01S 3/225* (2006.01)

(56) References Cited

U.S. PATENT DOCUMENTS

2009/0285076 A1 11/2009 Rothenberg
2011/0228230 A1 9/2011 Inoue et al.

FOREIGN PATENT DOCUMENTS

| | | | |
|---|---|---|---|
| JP | H08-213716 A | 8/1996 | |
| JP | 2000-056280 A | 2/2000 | |
| JP | 2002-176007 A | 6/2002 | |
| JP | 2005-294409 | * 10/2005 | ............... H01S 3/10 |
| JP | 2005-294409 A | 10/2005 | |
| WO | 2010/100898 A1 | 9/2010 | |

* cited by examiner

US 10,074,958 B2

LASER SYSTEM

TECHNICAL FIELD

The present disclosure relates to a laser system.

BACKGROUND ART

A laser annealing apparatus may apply a pulse laser beam on an amorphous silicon film formed on a substrate. The pulse laser beam may be emitted from a laser system such as an excimer laser system. The pulse laser beam may have a wavelength of ultraviolet light region. Such pulse laser beam may reform the amorphous silicon film to a poly-silicon film. The poly-silicon film can be used to form thin film transistors (TFTs). The TFTs may be used in large sized liquid crystal displays.

SUMMARY

A laser system according to one aspect of the present disclosure may include: a plurality of laser apparatuses, a beam delivery device configured to bundle pulse laser beams emitted from respective laser apparatuses of the plurality of laser apparatuses to emit a bundled pulse laser beam, and a beam parameter measuring device provided in an optical path of the bundled pulse laser beam to measure a beam parameter of each one of the pulse laser beams and a beam parameter of the bundled pulse laser beam.

BRIEF DESCRIPTION OF DRAWINGS

Exemplary embodiments of the present disclosure will be described below with reference to the appended drawings.

FIGS. 5A and 5B schematically show a configuration of a first beam divergence adjuster 72a.

FIG. 6 schematically shows a configuration of a first beam steering device 8a.

DESCRIPTION OF EMBODIMENTS

Contents
1. Outline
2. Configuration of Laser Annealing Apparatus
  2.1 Beam Combiner System
  2.2 Exposure Apparatus
  2.3 Plurality of Laser Apparatuses
  2.4 Beam Delivery Device
  2.5 Laser System Controller and Beam Delivery Device Controller
  2.6 Beam Parameter Measuring Device
  2.7 Beam Divergence Adjuster
  2.8 Beam Steering Device
  2.9 Mirror-moving Mechanism
  2.10 Laser Apparatus
3. Controlling Operation
  3.1 Main Flow
  3.2 Measuring and Controlling Beam Divergence
  3.3 Measuring and Controlling Beam Pointing
  3.4 Measuring and Controlling Beam Position
  3.5 Measuring Bundled Laser Beam
4. Second Embodiment
  4.1 Main Flow
  4.2 Measuring and Controlling Beam Size
  4.3 Measuring Bundled Laser Beam
5. Third Embodiment
  5.1 Laser System Controller and Beam Delivery Device Controller
  5.2 Optical Path Length Adjuster
  5.3 Laser Apparatus
  5.4 Main Flow
  5.5 Measuring Bundled Laser Beam
6. Fourth Embodiment
7. Fifth Embodiment
8. Sixth Embodiment
9. Beam Combiner Including Fly Eye Lens
10. Exposure Apparatus Including Line Focusing Optics
11. Configuration of Controller Embodiments of the present disclosure will be described below in detail with reference to the drawings. The embodiments described below may represent several examples of the present disclosure, and may not intend to limit the content of the present disclosure. Not all of the configurations and operations described in the embodiments are indispensable in the present disclosure. Identical reference symbols may be assigned to identical elements and redundant descriptions may be omitted.

1. Outline

A laser annealing apparatus may perform laser annealing by irradiating an amorphous silicon film on a glass substrate with a pulse laser beam at a predetermined energy density. The pulse laser beam may be demanded to increase its energy per one pulse for enlarging irradiation area at the predetermined energy density to manufacture larger and larger liquid crystal displays as in recent years. Increasing energy per one pulse may be achieved by bundling pulse laser beams emitted from respective laser apparatuses to form a bundled laser beam. The bundled laser beam may be applied to the amorphous silicon film.

However, one of the laser apparatuses may emit a defect pulse laser beam having a beam parameter out of an acceptable range, where the defect pulse laser beam and other pulse laser beams emitted from the respective laser apparatuses may be bundled. This may degrade annealing quality.

According to one aspect of the present disclosure, the pulse laser beams emitted from the respective laser apparatuses may be bundled. A beam parameter measuring device may be provided in an optical path of the bundled pulse laser beam. The beam parameter measuring device may be capable of measuring both beam parameters of individual pulse laser beam and beam parameters of the bundled pulse laser beam.

2. Configuration of Laser Annealing Apparatus

Figure 1:
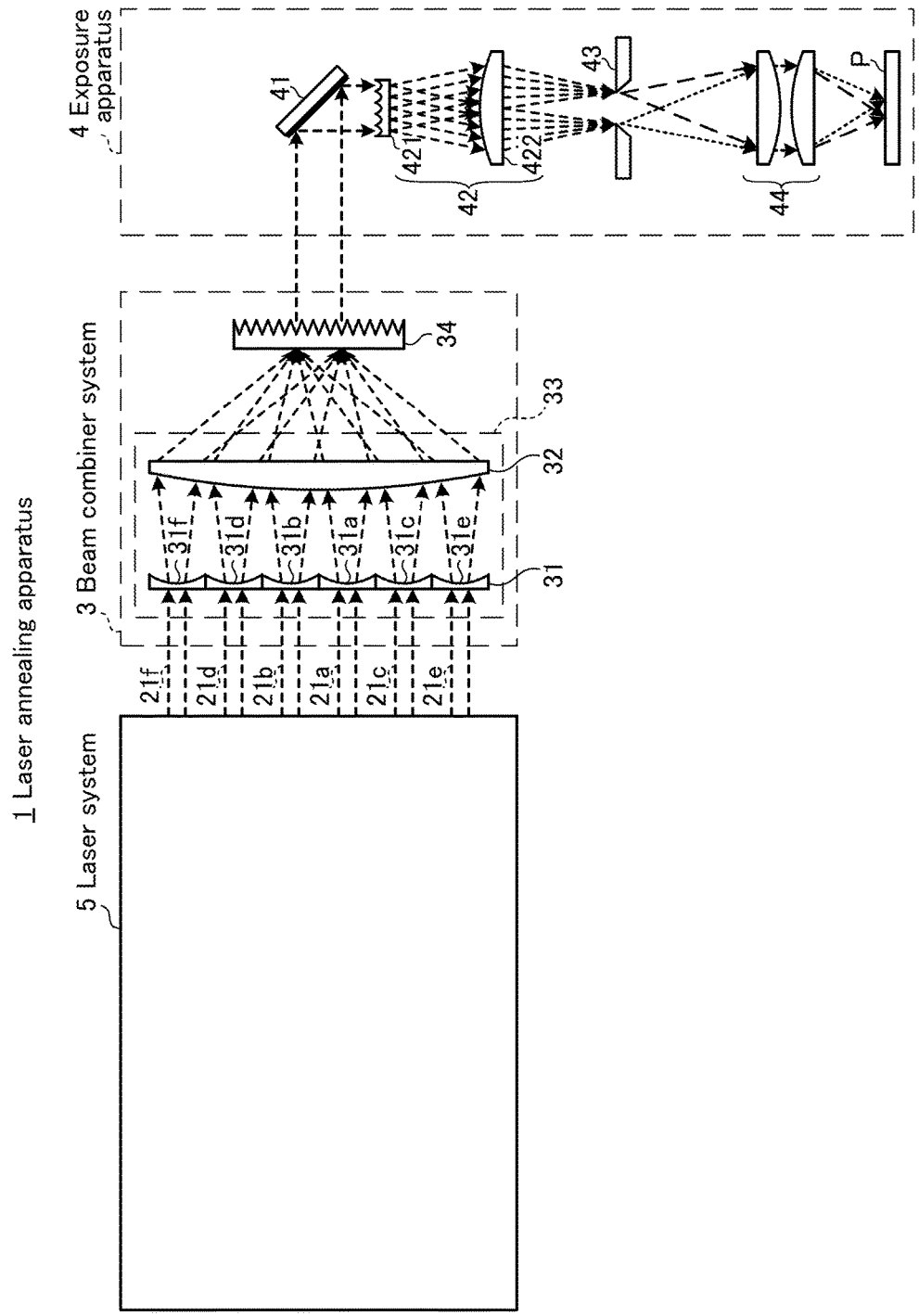
FIG. 1 schematically shows a configuration of a laser annealing apparatus 1 including an exemplary laser system 5.

FIG. 1 schematically shows a configuration of a laser annealing apparatus 1 including an exemplary laser system 5. The laser annealing apparatus 1 may include the laser system 5, a beam combiner system 3, and an exposure apparatus 4.

The laser system 5 may bundle pulse laser beams emitted from respective laser apparatuses explained below and emit the bundled pulse laser beam including first to sixth pulse laser beams 21a to 21f. The first to sixth pulse laser beams 21a to 21f emitted from the laser system 5 may have optical path axes substantially parallel to each other. The "optical path axis" of the pulse laser beam may be a central axis of the optical path of the pulse laser beam.

2.1 Beam Combiner System

The beam combiner system 3 may include incident optics 33 and a beam combiner 34.

The incident optics 33 may include secondary light source optics 31 and condenser optics 32, being designed to constitute a Koehler illumination.

The secondary light source optics 31 may include first to sixth concave lenses 31a to 31f.

The first concave lens 31a may be provided between the laser system 5 and the condenser optics 32 in the optical path of the first pulse laser beam 21a. The first concave lens 31a may transmit the first pulse laser beam 21a toward the condenser optics 32. The first concave lens 31a may expand beam width of the first pulse laser beam 21a.

The first to sixth concave lenses 31a to 31f may have substantially the same configurations with each other.

The second concave lens 31b may be provided in the optical path of the second pulse laser beam 21b.

The third concave lens 31c may be provided in the optical path of the third pulse laser beam 21c.

The fourth concave lens 31d may be provided in the optical path of the fourth pulse laser beam 21d.

The fifth concave lens 31e may be provided in the optical path of the fifth pulse laser beam 21e.

The sixth concave lens 31f may be provided in the optical path of the sixth pulse laser beam 21f.

The first to sixth pulse laser beams 21a to 21f entering the first to sixth concave lenses 31a to 31f, respectively, may have substantially the same beam sizes and substantially the same beam divergences with each other.

The optical path axes of the first to sixth pulse laser beams 21a to 21f transmitted by the first to sixth concave lenses 31a to 31f, respectively, may be substantially parallel to each other.

The condenser optics 32 may be arranged such that, as explained below, the first to sixth pulse laser beams 21a to 21f may be made incident on substantially the same portion of a light-receiving surface of the beam combiner 34 at respective predetermined incident angles.

The condenser optics 32 may extend over the cross sections of the optical paths of the first to sixth pulse laser beams 21a to 21f, at a position between the secondary light source optics 31 and the beam combiner 34. The condenser optics 32 may transmit the first to sixth pulse laser beams 21a to 21f toward the beam combiner 34. The condenser optics 32 may change respective directions of the optical path axes of the first to sixth pulse laser beams 21a to 21f to respective predetermined directions.

The condenser optics 32 may be provided such that a front-side focal plane of the condenser optics 32 substantially coincides with respective focal positions of the first to sixth concave lenses 31a to 31f. The condenser optics 32 may thus collimate each of the first to sixth pulse laser beams 21a to 21f transmitted by the first to sixth concave lenses 31a to 31f, respectively, such that each of the beams has substantially parallel rays.

The condenser optics 32 may be provided such that a rear-side focal plane of the condenser optics 32 substantially coincides with the light-receiving surface of the beam combiner 34. Thus, the condenser optics 32 may make the first to sixth pulse laser beams 21a to 21f be incident on substantially the same portion of the beam combiner 34 at respective predetermined incident angles.

FIG. 1 shows that the condenser optics 32 may include a single convex lens. However, the condenser optics 32 may include a combination of the convex lens and another convex or concave lens (not shown), or include a concave mirror (not shown).

The beam combiner 34 may include a diffractive optical element (DOE). The diffractive optical element may be constituted by an ultraviolet-transmitting substrate, such as a synthetic quartz substrate or a calcium fluoride substrate, on which multiple grooves each having a predetermined shape are formed at a predetermined interval.

The first to sixth pulse laser beams 21a to 21f, which were changed their directions of the optical path axes by the condenser optics 32 to the respective predetermined directions, may enter the beam combiner 34. The first to sixth pulse laser beams 21a to 21f, which entered the beam combiner 34, may be emitted from the beam combiner 34 to directions substantially the same with each other. The above-mentioned respective predetermined directions may be designed such that the first to sixth pulse laser beams 21a to 21f are combined by the beam combiner 34. Such beam combiner 34 may be a diffractive optical element, for example, disclosed in U.S. Patent Application Publication No. 2009/0285076.

The first to sixth pulse laser beams 21a to 21f emitted from the beam combiner 34 may travel through substantially the same optical paths to enter the exposure apparatus 4.

The first to sixth pulse laser beams 21a to 21f may thus be combined by the beam combiner system 3. In the following description, a pulse laser beam formed by combining pulse laser beams may be referred to as a "combined laser beam". The combined laser beam may include the first to sixth pulse laser beams 21a to 21f. The total pulse energy of the combined laser beam may be approximately six times of the pulse energy of the pulse laser beam emitted from a single laser apparatus. "Combining" pulse laser beams may include making first and second pulse laser beams share a common optical path.

2.2 Exposure Apparatus

The exposure apparatus 4 may include a high-reflective mirror 41, illumination optics 42, a mask 43, and transfer optics 44. The exposure apparatus 4 may apply the combined laser beam, which is emitted from the beam combiner system 3, to an irradiation object P according to a predetermined mask pattern.

The high-reflective mirror 41 may be provided in an optical path of the pulse laser beam emitted from the laser system 5. The high-reflective mirror 41 may reflect the combined laser beam emitted from the beam combiner system 3 to make the combined laser beam enter the illumination optics 42. The combined laser beam entering the illumination optics 42 may have substantially parallel rays.

The illumination optics 42 may be provided between the high-reflective mirror 41 and the mask 43 in the optical path of the combined laser beam emitted from the beam combiner system 3. The illumination optics 42 may include a fly eye lens 421 and condenser optics 422, being designed to constitute a Koehler illumination.

The fly eye lens 421 may be provided between the high-reflective mirror 41 and the condenser optics 422 in the optical path of the combined laser beam emitted from the beam combiner system 3. The fly eye lens 421 may include a plurality of lenses arranged in a cross section of the combined laser beam. The lenses may transmit respective parts of the combined laser beam toward the condenser optics 422 to expand beam widths of the respective parts.

The condenser optics 422 may be provided between the fly eye lens 421 and the mask 43 in the optical path of the combined laser beam emitted from the beam combiner system 3. The condenser optics 422 may irradiate the mask 43 with the combined laser beam emitted from the fly eye lens 421.

The condenser optics 422 may be provided such that a rear-side focal plane of the condenser optics 422 substantially coincides with a position of the mask 43. The condenser optics 422 may thus irradiate substantially the same portion of the mask 43 with the respective parts of the combined laser beam transmitted by the respective lenses of the fly eye lens 421.

FIG. 1 shows that the condenser optics 422 may include a single convex lens. However, the condenser optics 422 may include a combination of the convex lens and another convex or concave lens (not shown), or include a concave mirror (not shown).

According to the above-mentioned configuration, the illumination optics 42 may reduce variation in light intensity in a cross section of the combined laser beam, with which the mask 43 is irradiated.

The mask 43 may have a rectangular slit. The shape of the slit may form the mask pattern of the mask 43. The mask pattern of the mask 43 may not be limited to have the rectangular shape. The mask pattern may have any desired shape.

The transfer optics 44 may be provided between the mask 43 and the irradiation object P in the optical path of the combined laser beam emitted from the beam combiner system 3. The transfer optics 44 may be provided such that an image of the mask 43 is transferred by the transfer optics 44 at a position substantially coinciding with a position where the irradiation object P shall be irradiated with the combined laser beam. The transfer optics 44 may thus transfer the mask pattern of the mask 43, irradiated with the combined laser beam, to the irradiation object P.

The transfer optics 44 may include at least one convex lens. In another example, the transfer optics 44 may include a combination of a convex lens and a concave lens, or include a concave mirror. In still another example, the transfer optics 44 may include a cylindrical lens that transfers a lateral component of an image of the rectangular mask pattern to the irradiation object P.

The laser system 5 may thus emit, through the beam combiner system 3, the combined laser beam having higher pulse energy than the pulse energy of the pulse laser beam emitted from the single laser apparatus. Consequently, the laser annealing apparatus 1 may irradiate a large irradiation area of the large-sized irradiation object P with the combined laser beam at a predetermined pulse energy density required for annealing. Thus, large-sized liquid crystal displays may be efficiently manufactured.

In the above disclosure, the substantially parallel pulse laser beams 21a to 21f emitted from the laser system 5 are combined by the beam combiner system 3 and then made enter the illumination optics 42 of the exposure apparatus 4. However, the present disclosure is not limited to this. Without the beam combiner system 3, the substantially parallel pulse laser beams 21a to 21f emitted from the laser system 5 may enter the illumination optics 42 of the exposure apparatus 4.

2.3 Plurality of Laser Apparatuses

Figure 2A:
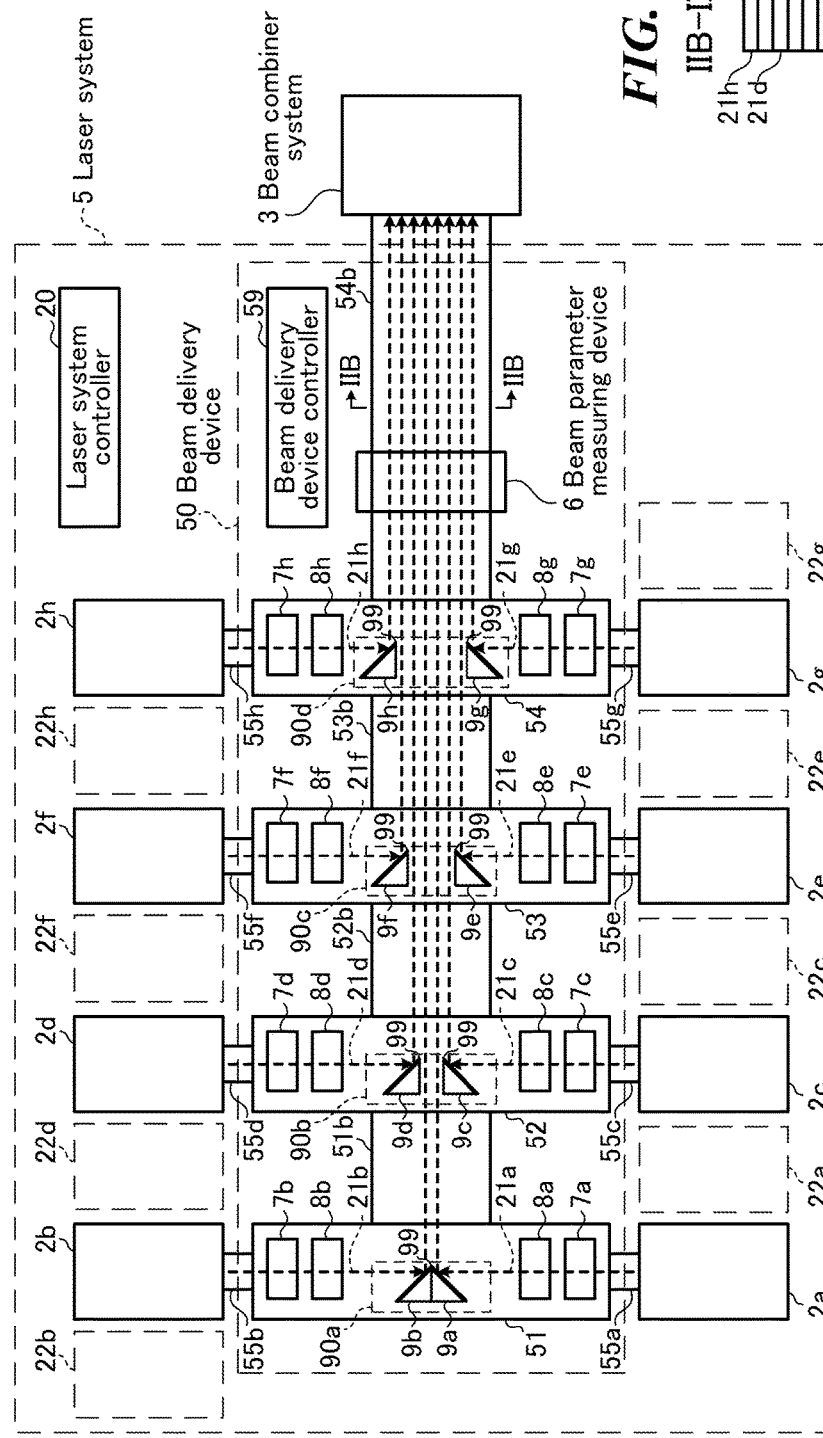
FIG. 2A schematically shows a configuration of a laser system according to a first embodiment of the present disclosure.

FIG. 2A schematically shows a configuration of a laser system according to a first embodiment of the present disclosure. The laser system 5 may include laser apparatuses 2a to 2h, a beam delivery device 50, and a laser system controller 20. In the following description, a direction of emitting the pulse laser beam from the laser system 5 may be a Z direction. A direction perpendicular to the Z direction and parallel to the gravity direction may be a V direction. A direction perpendicular to both the E direction and the V direction may be an H direction.

The laser apparatuses 2a to 2h may include a first laser apparatus 2a, a second laser apparatus 2b, a third laser apparatus 2c, a fourth laser apparatus 2d, a fifth laser apparatus 2e, a sixth laser apparatus 2f, a seventh laser apparatus 2g, and an eighth laser apparatus 2h. FIG. 2A shows the eight laser apparatuses 2a to 2h; however, the number of the laser apparatuses may not be limited but may be an integer equal to or more than two.

Each of the first to eighth laser apparatuses 2a to 2h may be an excimer laser apparatus using laser medium such as XeF, XeCl, KrF, or ArF. The first to eighth laser apparatuses 2a to 2h may have substantially the same configurations with each other. The first to eighth laser apparatuses 2a to 2h may receive respective oscillation trigger signals from the laser system controller 20, and emit the first to eighth pulse laser beams 21a to 21h, respectively. Each of the first to eighth pulse laser beams 21a to 21h may have a wavelength of an ultraviolet region.

The first laser apparatus 2a may be provided so as to emit the first pulse laser beam 21a to the beam delivery device 50 in a first direction. The first direction may correspond to the B direction in FIG. 2A.

The third, fifth, and seventh laser apparatuses 2c, 2e, and 2g may be provided to emit the third, fifth, and seventh pulse laser beams 21c, 21e, and 21g, respectively, to the beam delivery device 50 in directions substantially parallel to the first direction. The first, third, fifth, and seventh laser apparatuses 2a, 2c, 2e, and 2g may be oriented in directions substantially the same with each other.

The second laser apparatus 2b may be provided so as to emit the second pulse laser beam 21b to the beam delivery device 50 in a second direction different from the first direction. The second direction may correspond to a −H direction in FIG. 2A.

The fourth, sixth, and eighth laser apparatuses 2d, 2f, and 2h may be provided to emit the fourth, sixth, and eighth pulse laser beams 21d, 21f, and 21h, respectively, to the beam delivery device 50 in directions substantially parallel to the second direction. The second, fourth, sixth, and eighth laser apparatuses 2b, 2d, 2f, and 2h may be oriented in directions substantially the same with each other.

2.4 Beam Delivery Device

The beam delivery device 50 may include a plurality of beam adjusters 7a to 7h, a plurality of beam steering devices 8a to 8h, a plurality of mirrors 9a to 9h, a beam parameter measuring device 6, and a beam delivery device controller 59.

The number of the beam adjusters 7a to 7h may correspond to the number of the laser apparatuses 2a to 2h. The number of the beam steering devices 8a to 8h may correspond to the number of the laser apparatuses 2a to 2h. The number of the mirrors 9a to 9h may correspond to the number of the laser apparatuses 2a to 2h.

The first to eighth beam adjusters 7a to 7h may be provided in the optical paths of the first to eighth pulse laser beams 21a to 21h, respectively. The first to eighth beam steering devices 8a to 8h may be provided in the optical paths of the first to eighth pulse laser beams 21a to 21h, respectively, emitted from the first to eighth beam adjusters 7a to 7h, respectively. The first to eighth mirrors 9a to 9h may be provided in the optical paths of the first to eighth pulse laser beams 21a to 21h, respectively, emitted by the first to eighth beam steering devices 8a to 8h, respectively.

The first to eighth beam adjusters 7a to 7h may adjust beam divergences of the first to eighth pulse laser beams 21a to 21h, respectively. The first to eighth beam adjusters 7a to 7h may include first to eighth beam divergence adjusters 72a to 72h, respectively, described below.

The first to eighth beam steering devices 8a to 8h may adjust optical path axes of the first to eighth pulse laser beams 21a to 21h. Each of the first to eighth beam steering devices 8a to 8h may control beam pointing of the pulse laser beam and beam position of the pulse laser beam.

Each of the first to eighth mirrors 9a to 9h may have a triangular prism shape whose base surface has a nearly right-angled isosceles triangular shape. Each of these mirrors may be a prism mirror having a high-reflective film coated on one side surface of the triangular prism. Each of the first to eighth mirrors 9a to 9h may have a knife edge 99 that is the nearest from the beam combiner system 3 among three vertical edges. The knife edge 99 may be formed by two side surfaces contacting at an angle of 45 degrees or less. Each of the first to eighth mirrors 9a to 9h is not limited to a prism mirror. Each mirror may be formed by a substrate having a knife edge 99 and coated with a high-reflective film (see FIGS. 7A to 7C).

Reflective surfaces of the first, third, fifth, and seventh mirrors 9a, 9c, 9e, and 9g, each coated with the high-reflective film, may be substantially parallel to each other. Reflective surfaces of the second, fourth, sixth, and eighth mirrors 9b, 9d, 9f, and 9h, each coated with the high-reflective film, may be substantially parallel to each other.

The first to eighth pulse laser beams 21a to 21h may be incident on the respective reflective surfaces of the first to eighth mirrors 9a to 9h, at the respective portions adjacent to the knife edges 99. The first to eighth pulse laser beams 21a to 21h may be reflected by the first to eighth mirrors 9a to 9h, respectively, to the beam delivery direction. The beam delivery direction may correspond to the Z direction in FIG. 2A. The optical path axes of the first to eighth pulse laser beams 21a to 21h reflected by the first to eighth mirrors 9a to 9h, respectively, may be substantially parallel to each other.

The first and second mirrors 9a and 9b may be provided adjacent to each other. The knife edges 99 of the first and second mirrors 9a and 9b may be in contact with each other.

The third and fourth mirrors 9c and 9d may have a first predetermined gap between them. The first and second pulse laser beams 21a and 21b reflected by the first and second mirrors 9a and 9b, respectively, may pass through the gap between the third and fourth mirrors 9c and 9d.

The fifth and sixth mirrors 9e and 9f may have a second predetermined gap between them. The first to fourth pulse laser beams 21a to 21d reflected by the first to fourth mirrors 9a to 9d, respectively, may pass through the gap between the fifth and sixth mirrors 9e and 9f.

The seventh and eighth mirrors 9g and 9h may have a third predetermined gap between them. The first to sixth pulse laser beams 21a to 21f reflected by the first to sixth mirrors 9a to 9f, respectively, may pass through the gap between the seventh and eighth mirrors 9g and 9h.

As described above, the beam delivery device 50 may bundle the first to eighth pulse laser beams 21a to 21h. In the following description, a plurality of pulse laser beams bundled by the beam delivery device 50 may be referred to as a "bundled laser beam". "Bundling" pulse laser beams may include emitting both a first pulse laser beam incident in a first direction and a second pulse laser beam incident in a second direction, to a third direction. The first direction and the second direction may be substantially the same directions or different directions. The third direction may be a different direction from both of the first and second directions. The first and second pulse laser beams emitted to the third direction may be adjacent to each other. The third direction may be perpendicular to both the first and second directions.

The beam parameter measuring device 6 may be provided in the optical path of the bundled laser beam. The beam parameter measuring device 6 may measure a beam profile of the bundled laser beam, and a beam profile of each of the pulse laser beams included in the bundled laser beam.

Figure 2B:
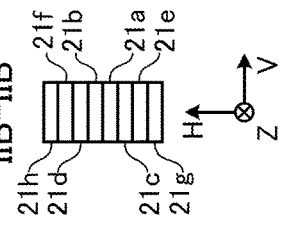
FIG. 2B shows a cross section of first to eighth pulse laser beams 21a to 21h at a line IIB-IIB in FIG. 2A.

FIG. 2B shows a cross section of the first to eighth pulse laser beams 21a to 21h at a line IIB-IIB in FIG. 2A. Cross sectional shapes of the first to eighth pulse laser beams 21a to 21h may be substantially the same with each other. The optical path axes of the first to eighth pulse laser beams 21a to 21h reflected by the first to eighth mirrors 9a to 9h, respectively, may be positioned in a single plane substantially parallel to HZ plane. The optical paths of the first and second pulse laser beams 21a and 21b may be positioned between the optical paths of the third and fourth pulse laser beams 21c and 21d. The optical paths of the third and fourth pulse laser beams 21c and 21d may be positioned between the optical paths of the fifth and sixth pulse laser beams 21e and 21f. The optical paths of the fifth and sixth pulse laser beams 21e and 21f may be positioned between the optical paths of the seventh and eighth pulse laser beams 21g and 21h. Two pulse laser beams of the first to eighth pulse laser beams 21a to 21h next to each other may be adjacent to each other.

The first and second mirrors 9a and 9b may be movable by a first mirror-moving mechanism 90a described below. The third and fourth mirrors 9c and 9d may be movable by a second mirror-moving mechanism 90b described below. The fifth and sixth mirrors 9e and 9f may be movable by a third mirror-moving mechanism 90c described below. The seventh and eighth mirrors 9g and 9h may be movable by a fourth mirror-moving mechanism 90d described below. If, for example, ninth and tenth laser apparatuses (not shown) are added such that ninth and tenth pulse laser beams (not shown) pass through a gap between the first and second mirrors 9a and 9b, the first to eighth mirrors 9a to 9h may be moved.

The first to eighth laser apparatuses 2a to 2h may require maintenance areas 22a to 22h, respectively, each on a right side with respect to the emitting direction of the pulse laser beam. Each of the maintenance areas 22a to 22h may serve as a working space for retrieving or exchanging various components of each laser apparatus.

First to fourth units 51 to 54 of the beam delivery device 50 may be stored in respective housings. The first laser apparatus 2a and the first unit 51 may be connected by a beam path tube 55a. The second laser apparatus 2b and the first unit 51 may be connected by a beam path tube 55b. The third laser apparatus 2c and the second unit 52 may be connected by a beam path tube 55c. The fourth laser apparatus 2d and the second unit 52 may be connected by a beam path tube 55d. The fifth laser apparatus 2e and the third unit 53 may be connected by a beam path tube 55e. The sixth laser apparatus 2f and the third unit 53 may be connected by a beam path tube 55f. The seventh laser apparatus 2g and the fourth unit 54 may be connected by a beam path tube 55g. The eighth laser apparatus 2h and the fourth unit 54 may be connected by a beam path tube 55h. The first unit 51 and the second unit 52, the second unit 52 and the third unit 53, the third unit 53 and the fourth unit 54, and the fourth unit 54 and the beam combiner system 3 may be connected by beam path tubes 51b, 52b, 53b, and 54b, respectively. Interior of each of the beam path tubes may be purged with inert gas. For example, the inert gas may include high purity nitrogen gas, helium gas, or argon gas.

2.5 Laser System Controller and Beam Delivery Device Controller

Figure 3:
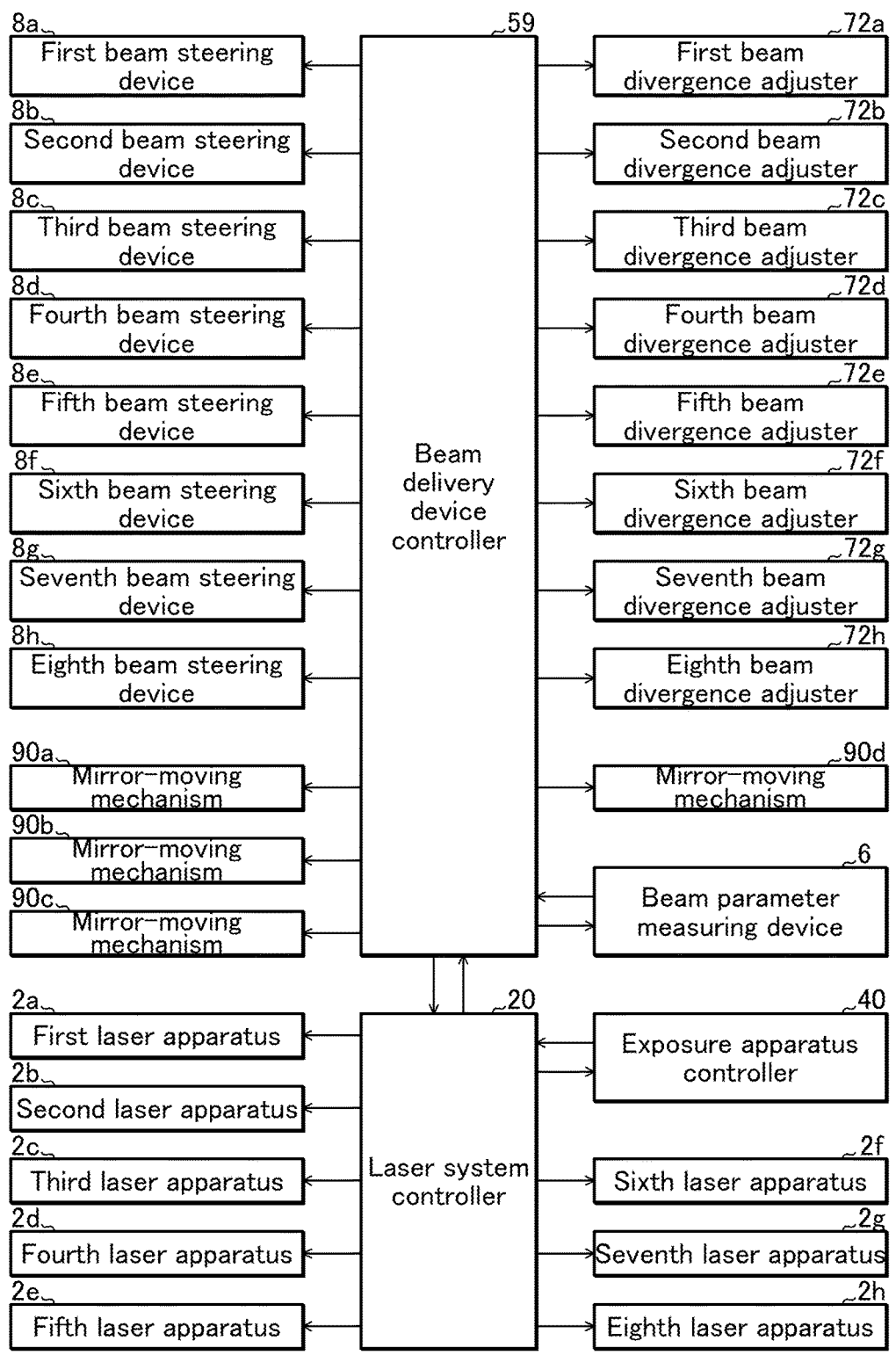
FIG. 3 is a block diagram of a laser system controller 20, a beam delivery device controller 59, and their periphery in the first embodiment of the present disclosure.

FIG. 3 is a block diagram of a laser system controller 20, a beam delivery device controller 59, and their periphery in the first embodiment of the present disclosure.

An exposure apparatus controller 40 included in the exposure apparatus 4 may perform moving a stage (not shown), which holds the irradiation object P, exchanging the irradiation object P, or exchanging the mask 43. The exposure apparatus controller 40 may output a trigger signal to the laser system controller 20.

The laser system controller 20 may receive the trigger signal from the exposure apparatus controller 40 in the exposure apparatus 4 and send oscillation trigger signals to the laser apparatuses 2a to 2h. The laser apparatuses 2a to 2h may emit the pulse laser beams based on the respective oscillation trigger signals received from the laser system controller 20.

The beam delivery device controller 59 may control the first to eighth beam steering devices 8a to 8h, the first to eighth beam divergence adjusters 72a to 72h, and the first to fourth mirror-moving mechanisms 90a to 90d. The control by the beam delivery device controller 59 may be performed based on data on target values of the beam parameters received via the laser system controller 20.

2.6 Beam Parameter Measuring Device

Figure 4:
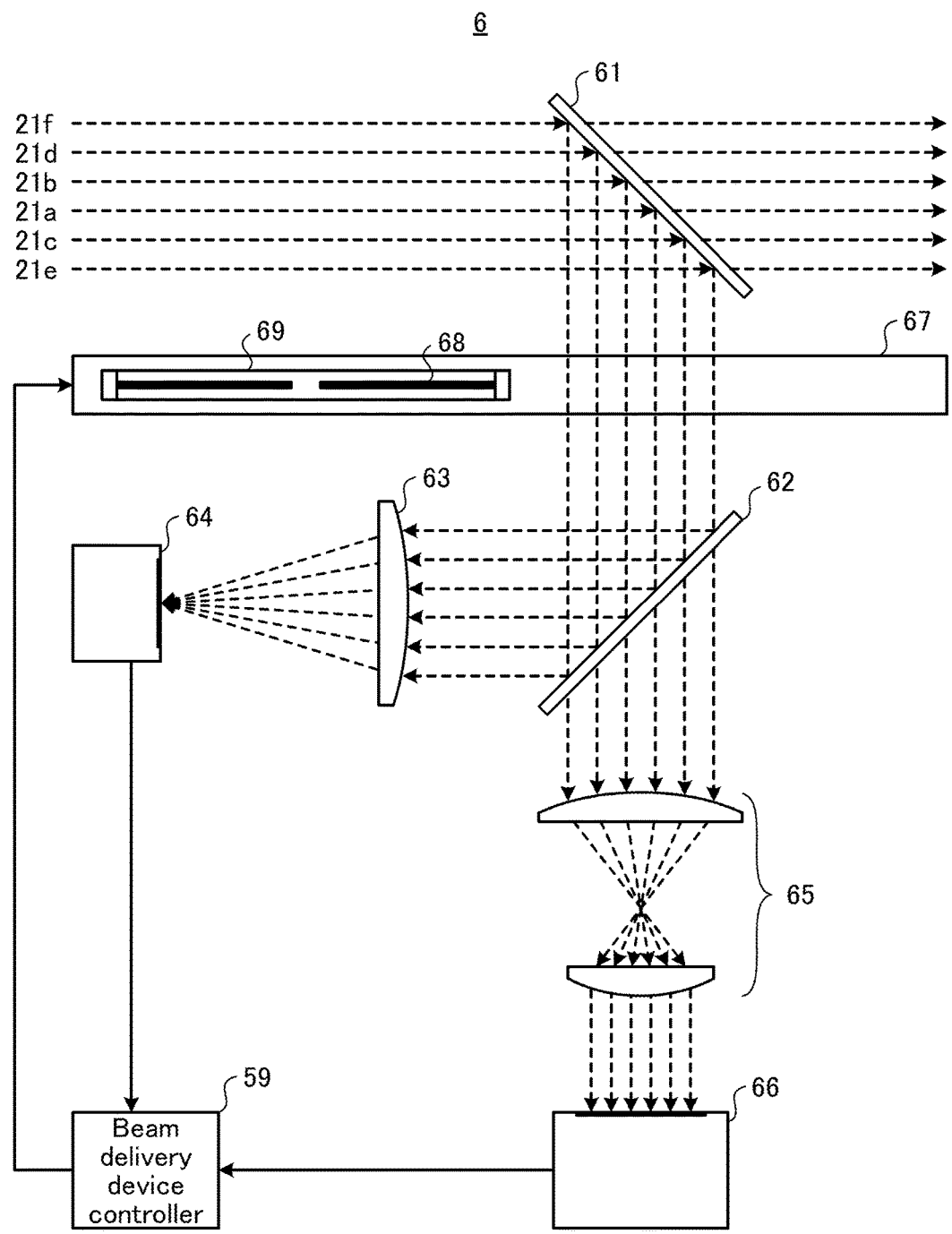
FIG. 4 shows a specific configuration of a beam parameter measuring device 6 shown in FIG. 2A.

FIG. 4 shows a specific configuration of a beam parameter measuring device 6 shown in FIG. 2A.

The beam parameter measuring device 6 may include beam splitters 61 and 62, focusing optics 63, an image sensor 64, transfer optics 65, an image sensor 66, and a beam selecting mechanism 67.

FIG. 4 shows that the bundled laser beam includes the first to sixth pulse laser beams 21a to 21f; however, the bundled laser beam may include the first to eighth pulse laser beams 21a to 21h, or any plural number of pulse laser beams.

The beam splitter 61 may be provided in the optical path of the bundled laser beam emitted from the beam delivery device 50. The beam splitter 61 may transmit a part of the bundled laser beam, bundled by the beam delivery device 50, at high transmittance to a first direction. The beam splitter 61 may reflect another part of the bundled laser beam to a second direction.

The beam selecting mechanism 67 may include a slit plate 68 and a moving mechanism 69. The beam selecting mechanism 67 may extend over a cross section of the optical path of the bundled laser beam reflected by the beam splitter 61 to the second direction. The moving mechanism 69 may move the slit plate 68 across the optical path axis of the bundled laser beam. The slit plate 68 may have a slit through which a single pulse laser beam of the laser beams included in the bundled laser beam may pass. The moving mechanism 69 may control the position of the slit plate 68 such that all or each of the pulse laser beams included in the bundled laser beam may be selected and pass through the beam selecting mechanism 67.

The beam splitter 62 may be provided in the optical path of the bundled laser beam or the individual pulse laser beam which passed through the beam selecting mechanism 67 to the second direction. The beam splitter 62 may transmit a part of the bundled laser beam or the individual pulse laser beam to the transfer optics 65, and reflect another part to the focusing optics 63.

The transfer optics 65 may transfer an image of a beam profile in a cross section of the bundled laser beam or the individual pulse laser beam, transmitted by the beam splitter 62, to a light-receiving surface of the image sensor 66.

The image sensor 66 may output data on distribution of light intensity in a cross section of the bundled laser beam or the individual pulse laser beam transferred by the transfer optics 65 to the beam delivery device controller 59.

The beam delivery device controller 59 may calculate a position of a center of the distribution of the light intensity as a beam position of the bundled laser beam or the individual pulse laser beam. The position of the center may be calculated based on the data, outputted from the image sensor 66, on the distribution of the light intensity in the cross section of the beam.

The beam delivery device controller 59 may calculate beam size in the cross section of the bundled laser beam or the individual pulse laser beam. The beam size may be calculated based on the data, outputted from the image sensor 66, on the distribution of the light intensity in the cross section of the beam. In the excimer laser, beam sizes in the H direction and the V direction may be different from each other. These beam sizes may be calculated based on the respective distributions of the light intensity in the H direction and the V direction.

The focusing optics 63 may concentrate the bundled laser beam or the individual pulse laser beam, reflected by the beam splitter 62, to a light-receiving surface of the image sensor 64.

The image sensor 64 may be provided in a focal plane of the focusing optics 63. The image sensor 64 may receive the bundled laser beam or the individual pulse laser beam concentrated by the focusing optics 63. The image sensor 64 may output data on distribution of light intensity of the bundled laser beam or the individual pulse laser beam at a light-concentration position to the beam delivery device controller 59.

The beam delivery device controller 59 may calculate a position of a center of the distribution of the light intensity as a spot center of the bundled laser beam or the individual pulse laser beam. The position of the center may be calculated based on the data, outputted from the image sensor 64, on the distribution of the light intensity at the light-concentration position. The beam delivery device controller 59 may divide the position of the center by the focal length of the focusing optics 63 to calculate beam pointing representing travelling direction of the bundled laser beam or the individual pulse laser beam.

The beam delivery device controller 59 may calculate spot diameter based on the data, outputted from the image sensor 64, on the distribution of the light intensity at the light-concentration position. The beam delivery device controller 59 may divide the spot diameter by the focal length of the focusing optics 63 to calculate beam divergence of the bundled laser beam or the individual pulse laser beam. In the excimer laser, beam divergences in the H direction and the V direction may be different from each other. These beam divergences may be calculated based on the respective distributions of the light intensity in the H direction and the V direction.

In the above configuration, data obtained by the same image sensor 66 and the same transfer optics 65 may be used to calculate the beam position of the bundled laser beam and the beam position of the individual pulse laser beam. The same applies to calculating the beam sizes. By using the data obtained by the same image sensor 66 and the same transfer optics 65, measuring accuracy in the beam positions and the beam sizes of each laser beam may be improved.

Further, data obtained by the same image sensor 64 and the same focusing optics 63 may be used to calculate the beam pointing of the bundled laser beam and the beam pointing of the individual pulse laser beam. The same applies to calculating the beam divergences. By using the data obtained by the same image sensor 64 and the same focusing optics 63, measuring accuracy in the beam pointings and the beam divergences of each laser beam may be improved.

2.7 Beam Divergence Adjuster

The first to eighth beam adjusters 7a to 7h in FIG. 2A may include first to eighth beam divergence adjusters 72a to 72h (see FIG. 3). The first to eighth beam divergence adjusters 72a to 72h may be configured to change, under control by the beam delivery device controller 59, the beam divergence of the first to eighth pulse laser beams 21a to 21h, respectively.

Figure 5A:
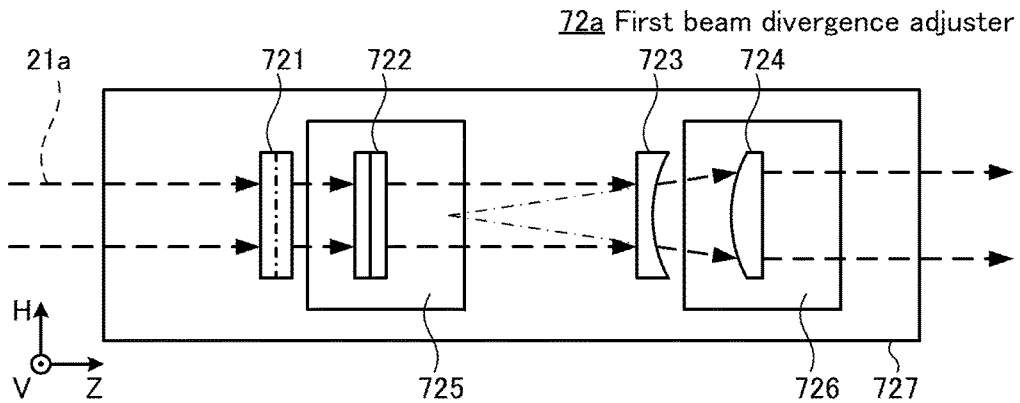
Figure 5B:
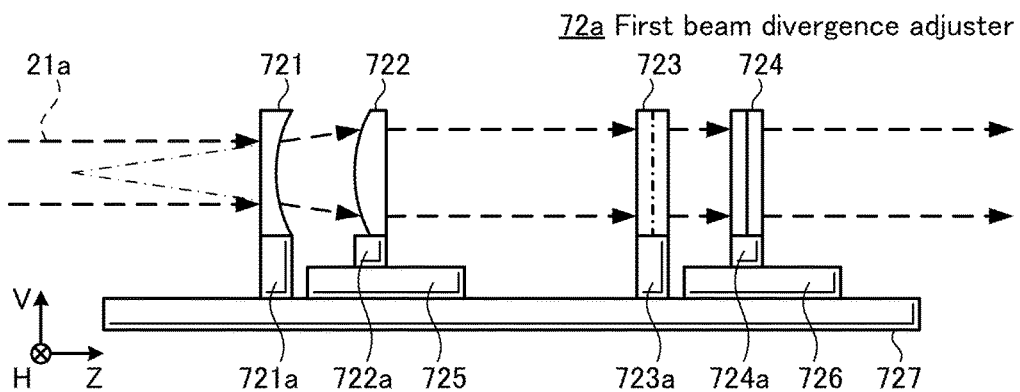

FIGS. 5A and 5B schematically show a configuration of the first beam divergence adjuster 72a. FIG. 5A is a plan view, and FIG. 5B is a side view. The first beam divergence adjuster 72a may include a first cylindrical concave lens 721, a first cylindrical convex lens 722, a second cylindrical concave lens 723, and a second cylindrical convex lens 724. The second to eighth beam divergence adjusters 72b to 72h may be substantially the same as the first beam divergence adjuster 72a.

The first cylindrical concave lens 721 may be held by a holder 721a on a plate 727. The first cylindrical convex lens 722 may be held by a holder 722a on a uniaxial stage 725. The second cylindrical concave lens 723 may be held by a holder 723a on the plate 727. The second cylindrical convex lens 724 may be held by a holder 724a on a uniaxial stage 726. The uniaxial stage 725 may move the first cylindrical convex lens 722 along the optical path axis of the first pulse laser beam 21a. The uniaxial stage 726 may move the second cylindrical convex lens 724 along the optical path axis of the first pulse laser beam 21a.

The concave surface of the first cylindrical concave lens 721 and the convex surface of the first cylindrical convex lens 722 may be cylindrical surfaces each having a central axis substantially parallel to the H direction. The first cylindrical concave lens 721 and the first cylindrical convex lens 722 may thus expand or reduce the beam width in the V direction.

A focal position of the first cylindrical concave lens 721 and a focal position of the first cylindrical convex lens 722 may coincide with each other. In that case, beam divergence Bdvout in the V direction of the first pulse laser beam 21a emitted from the first beam divergence adjuster 72a may be expressed by the following formula.

$$Bdvout = Bdvin \cdot F1/F2$$

Here, Bdvin may be the beam divergence in the V direction of the first pulse laser beam 21a entering the first beam divergence adjuster 72a. F1 may be a focal length of the first cylindrical concave lens 721, and F2 may be a focal length of the first cylindrical convex lens 722.

The uniaxial stage 725 may move the first cylindrical convex lens 722 along the optical path axis of the first pulse laser beam 21a, such that the focal position of the first cylindrical concave lens 721 separates from the focal position of the first cylindrical convex lens 722. When the focal position of the first cylindrical concave lens 721 is separate from the focal position of the first cylindrical convex lens 722, the first beam divergence adjuster 72a may change a wavefront of the pulse laser beam 21a in the V direction. By changing the wavefront of the pulse laser beam in the V direction, the beam divergence of the pulse laser beam may be changed in the V direction.

The concave surface of the second cylindrical concave lens 723 and the convex surface of the second cylindrical convex lens 724 may be cylindrical surfaces each having a central axis substantially parallel to the V direction. The second cylindrical concave lens 723 and the second cylindrical convex lens 724 may thus expand or reduce the beam width in the H direction.

A focal position of the second cylindrical concave lens 723 and a focal position of the second cylindrical convex lens 724 may coincide with each other. In that case, beam divergence Bdhout in the H direction of the first pulse laser beam 21a emitted from the first beam divergence adjuster 72a may be expressed by the following formula.

$$Bdhout = Bdhin \cdot F3/F4$$

Here, Bdhin may be the beam divergence in the H direction of the first pulse laser beam 21a entering the first beam divergence adjuster 72a. F3 may be a focal length of the second cylindrical concave lens 723, and F4 may be a focal length of the second cylindrical convex lens 724.

The uniaxial stage 726 may move the second cylindrical convex lens 724 along the optical path axis of the first pulse laser beam 21a, such that the focal position of the second cylindrical concave lens 723 separates from the focal position of the second cylindrical convex lens 724. When the focal position of the second cylindrical concave lens 723 is separate from the focal position of the second cylindrical convex lens 724, the first beam divergence adjuster 72a may change a wavefront of the pulse laser beam 21a in the H direction. By changing the wavefront of the pulse laser beam in the H direction, the beam divergence of the pulse laser beam may be changed in the H direction.

According to the first beam divergence adjuster 72a, the beam divergence in the V direction and the beam divergence in the H direction are independently controlled.

In FIGS. 5A and 5B, each of the beam divergences in the H direction and the V direction may be changed; however, the beam divergence may be changed in either one of the H direction and the V direction. For example, a stricter target value may be required for the beam divergence in the V direction than for the beam divergence in the H direction. In that case, only the distance between the first cylindrical concave lens 721 and the first cylindrical convex lens 722 may be made variable.

In the above description, the beam divergence of the pulse laser beam may be changed by the combination of the convex cylindrical lens and the concave cylindrical lens; however, the present disclosure may not be limited to this. For example, the beam divergence of the pulse laser beam may be changed by a combination of two convex cylindrical lenses.

2.8 Beam Steering Device

The first to eighth beam steering devices 8a to 8h in FIG. 2A may control the optical path axis of the first to eighth pulse laser beams 21a to 21h under control by the beam delivery device controller 59.

Figure 6:
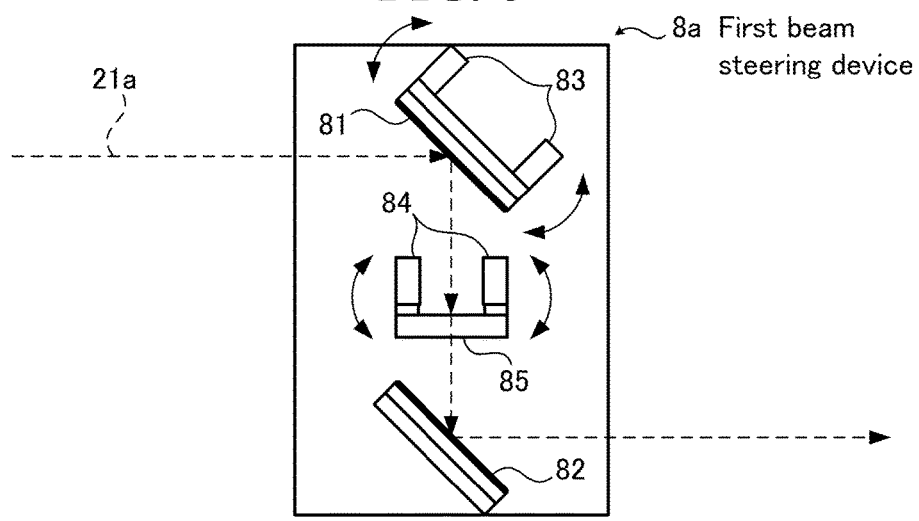

FIG. 6 schematically shows a configuration of a first beam steering device 8a. The first beam steering device 8a may include a first high-reflective mirror 81, a second high-reflective mirror 82, a transparent substrate 85, and actuators 83 and 84. The transparent substrate 85 may have a first surface and a second surface substantially parallel to each other. The second to eighth beam steering devices 8b to 8h may be substantially the same as the first beam steering device 8a.

The first high-reflective mirror 81 may be provided in the optical path of the first pulse laser beam 21a emitted from the first beam adjuster 7a in the first direction. The actuator 83 may change the posture of the first high-reflective mirror 81 according to a driving signal outputted by the beam delivery device controller 59. For example, the actuator 83 may be capable of changing posture angle of the first high-reflective mirror 81 in two directions perpendicular to each other. The first high-reflective mirror 81 may reflect the first pulse laser beam 21a to a direction according to the posture adjusted by the actuator 83.

The transparent substrate 85 may be provided in the optical path of the first pulse laser beam 21a reflected by the first high-reflective mirror 81. The actuator 84 may change the posture of the transparent substrate 85 according to a driving signal outputted by the beam delivery device controller 59. For example, the actuator 84 may be capable of changing posture angle of the transparent substrate 85 in two directions perpendicular to each other. By changing the posture angle of the transparent substrate 85, the first pulse laser beam 21a may be changed its incident angle to the transparent substrate 85. The first pulse laser beam 21a may be refracted at a light-receiving surface of the transparent substrate 85 and at a light-emitting surface of the transparent substrate 85 to opposite directions to each other. By changing the posture angle of the transparent substrate 85, the beam position of the first pulse laser beam 21a may thus be changed, while suppressing changes of the beam pointing representing the travelling direction of the first pulse laser beam 21a.

By controlling the posture angle of the high-reflective mirror 81 and the posture angle of the transparent substrate 85, the first beam steering device 8a may control both the beam pointing and the beam position of the first pulse laser beam 21a independently from each other.

The first pulse laser beam 21a emitted from the transparent substrate 85 may be incident on the second high-reflective mirror 82.

The second high-reflective mirror 82 may be provided in the optical path of the first pulse laser beam 21a emitted from the transparent substrate 85. The second high-reflective mirror 82 may reflect the first pulse laser beam 21a.

The first pulse laser beam 21a reflected by the second high-reflective mirror 82 may be incident on the first mirror 9a.

Instead of the first beam steering device 8a in FIG. 6, a first beam steering device 8ay described below with reference to FIG. 35 may be provided in the beam delivery device 50.

2.9 Mirror-Moving Mechanism

Figure 7A:
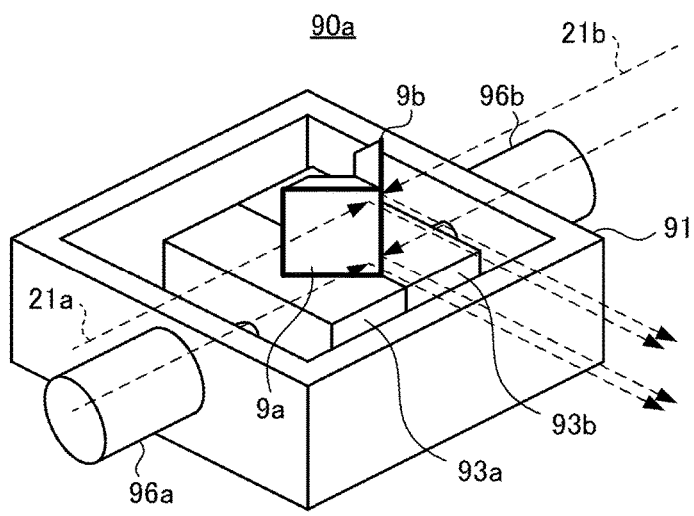
FIGS. 7A to 7C show a mirror-moving mechanism 90a for moving first and second mirrors 9a and 9b shown in FIG. 2A.
Figure 7B:
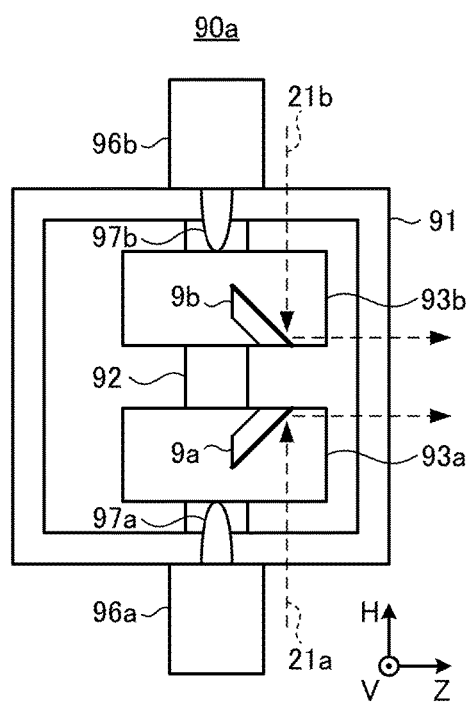
Figure 7C:
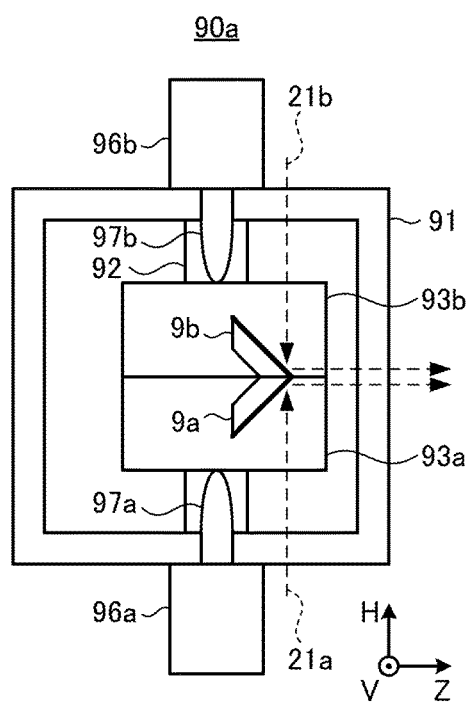

FIGS. 7A to 7C show a mirror-moving mechanism 90a for moving first and second mirrors 9a and 9b shown in FIG. 2A. FIG. 7A is a perspective view, FIG. 7B is a plan view where the gap between the mirrors is wide, and FIG. 7C is another plan view where the gap between the mirrors is narrowed.

The first mirror 9a may be movable by the mirror-moving mechanism 90a along the optical path axis of the first pulse laser beam 21a incident on the first mirror 9a. The second mirror 9b may be movable by the mirror-moving mechanism 90a along the optical path axis of the second pulse laser beam 21b incident on the second mirror 9b. Mechanisms to move the third to eighth mirrors 9c to 9h may be substantially the same as the mirror-moving mechanism 90a.

The mirror-moving mechanism 90a may include a casing 91, a linear guide 92, mirror holders 93a and 93b, and automatic micrometers 96a and 96b. The casing 91 may store the linear guide 92 and the mirror holders 93a and 93b.

The linear guide 92 may be provided such that its longitudinal direction is substantially the same with the H direction. The mirror holders 93a and 93b may hold the first and second mirrors 9a and 9b, respectively. Each of the mirror holders 93a and 93b may be attached to the linear guide 92 so as to move along the longitudinal direction of the linear guide 92. The mirror holders 93a and 93b may be forced to go away from each other by some springs (not shown).

The automatic micrometers 96a and 96b may be attached to the casing 91. Movable elements 97a and 97b of the automatic micrometers 96a and 96b may be capable of pushing the mirror holders 93a and 93b, respectively, to get close to each other.

Upon the movable element 97a being drawn out by the automatic micrometer 96a according to a driving signal outputted by the beam delivery device controller 59, the mirror holder 93a may be pushed. The mirror holder 93a may thus be moved in the H direction, and the gap between the first and second mirrors 9a and 9b may be narrowed.

Upon the movable element 97a being drawn back by the automatic micrometer 96a, the mirror holder 93a may be pushed by the springs (not shown). The mirror holder 93a may thus be moved in the −H direction.

Upon the movable element 97b being drawn out by the automatic micrometer 96b according to a driving signal outputted by the beam delivery device controller 59, the mirror holder 93b may be pushed. The mirror holder 93b may thus be moved in the −H direction, and the gap between the first and second mirrors 9a and 9b may be narrowed.

Upon the movable element 97b being drawn back by the automatic micrometer 96b, the mirror holder 93b may be pushed by the springs (not shown). The mirror holder 93b may thus be moved in the H direction.

2.10 Laser Apparatus

Figure 8:
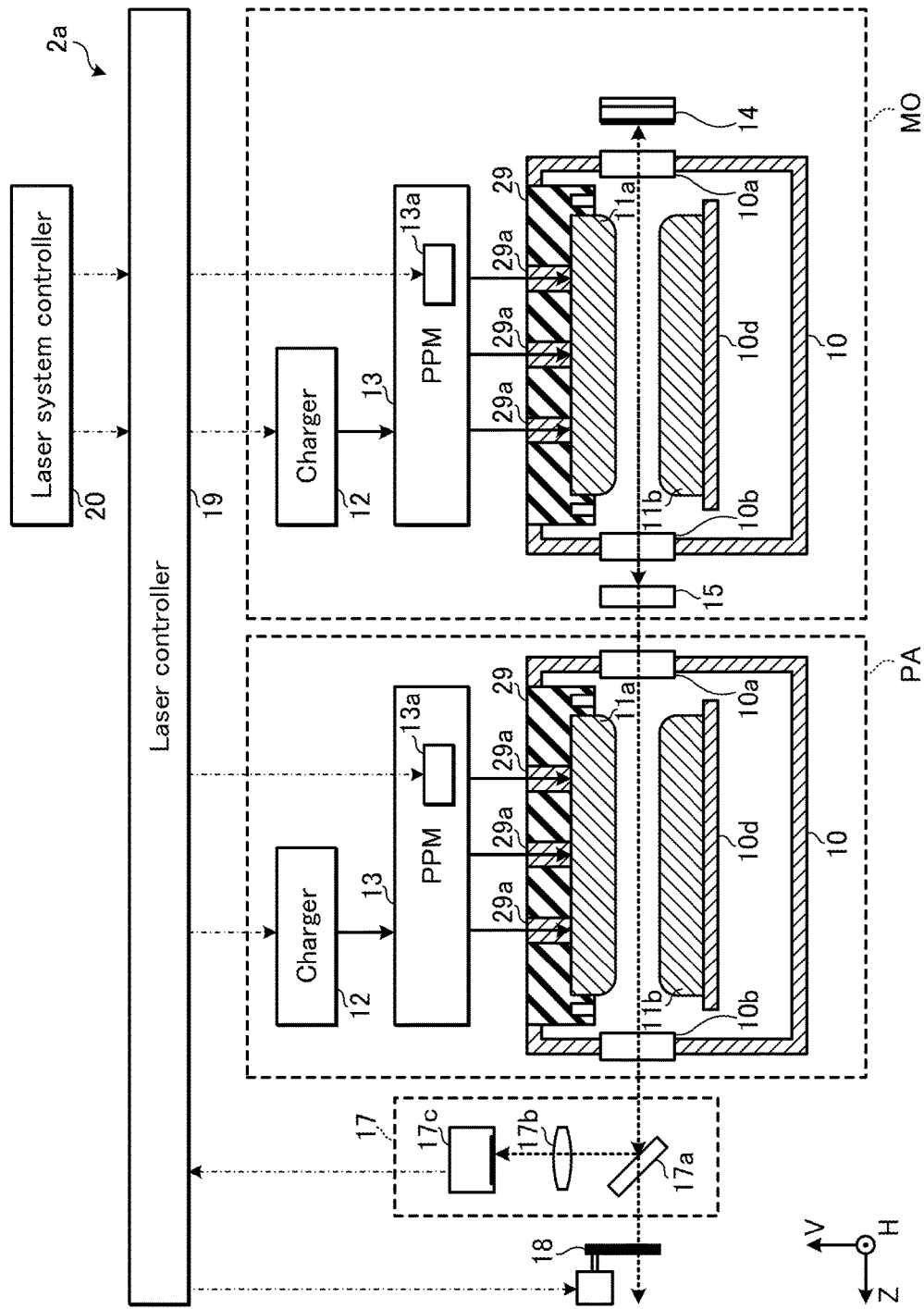
FIG. 8 shows an exemplary configuration of the laser apparatus shown in FIG. 2A.

FIG. 8 shows an exemplary configuration of the laser apparatus shown in FIG. 2A. The first laser apparatus 2a, for example, includes a master oscillator MO, a power amplifier PA, a pulse energy measuring unit 17, a shutter 18, and a laser controller 19. Configuration of each of the second to eighth laser apparatuses 2b to 2h may be substantially the same as that of the first laser apparatus 2a.

The master oscillator MO may include a laser chamber 10, a pair of electrodes 11a and 11b, a charger 12, and a pulse power module (PPM) 13. The master oscillator MO may further include a high-reflective mirror 14 and an output coupling mirror 15. FIG. 8 shows an internal configuration of the laser chamber 10 viewed from the H direction.

The laser chamber 10 may store laser gases constituting a laser medium, including a rare gas such as argon, krypton or xenon, a buffer gas such as neon or helium, and a halogen gas such as chlorine or fluorine. The pair of electrodes 11a and 11b may be provided in the laser chamber 10 as electrodes for exciting the laser medium by electric discharge. The laser chamber 10 may have an opening, sealed by an insulating member 29. The electrode 11a may be supported by the insulating member 29 and the electrode 11b may be supported by a return plate 10d. The return plate 10d may be electrically connected to an inner surface of the laser chamber 10 through electric wirings (not shown). In the insulating member 29, conductive members 29a may be molded. The conductive members 29a may apply high-voltage, which is supplied by the pulse power module 13, to the electrode 11a.

The charger 12 may be a direct-current power source for charging a charge capacitor (not shown) of the pulse power module 13 at a predetermined voltage. The pulse power module 13 may include a switch 13a controlled by the laser controller 19. When the switch 13a turns ON, the pulse power module 13 may generate the pulsed high-voltage using electric energy in the charger 12. The high-voltage may be applied to the pair of electrodes 11a and 11b.

The high-voltage applied to the pair of electrodes 11a and 11b may cause dielectric breakdown and cause the electric discharge between the pair of electrodes 11a and 11b. Energy of the electric discharge may excite the laser medium in the laser chamber 10 to a high energy level. The excited laser medium may then change to a low energy level, where the laser medium generates light according to the difference of the energy levels.

The laser chamber 10 may have windows 10a and 10b at respective ends of the chamber. The light generated in the laser chamber 10 may be emitted from the laser chamber 10 through the windows 10a and 10b.

The high-reflective mirror 14 may reflect the light emitted from the window 10a of the laser chamber 10 at high reflectance to return the light to the laser chamber 10.

The output coupling mirror 15 may transmit to output a part of the light emitted from the window 10b of the laser chamber 10 and reflect to return another part of the light to the laser chamber 10.

The high-reflective mirror 14 and the output coupling mirror 15 may thus constitute an optical resonator. The light emitted from the laser chamber 10 may travel back and forth between the high-reflective mirror 14 and the output coupling mirror 15. The light may be amplified at every time to pass a laser gain region between the electrode 11a and the electrode 11b. The pulse laser beam of the amplified light may be emitted through the output coupling mirror 15.

The power amplifier PA may be provided in the optical path of the pulse laser beam emitted from the output coupling mirror 15 of the master oscillator MO. The power amplifier PA may include, as in the master oscillator MO, a laser chamber 10, a pair of electrodes 11a and 11b, a charger 12, and a pulse power module (PPM) 13. Configurations of these elements may be substantially the same as those in the master oscillator MO. The power amplifier PA does not have to include the high-reflective mirror 14 or the output coupling mirror 15. The pulse laser beam, which entered the power amplifier PA through the window 10a, may once pass the laser gain region between the electrode 11a and the electrode 11b, and then be emitted through the window 10b.

The pulse energy measuring unit 17 may be provided in the optical path of the pulse laser beam emitted from the power amplifier PA. The pulse energy measuring unit 17 may include a beam splitter 17a, focusing optics 17b, and an optical sensor 17c.

The beam splitter 17a may transmit a part of the pulse laser beam, emitted from the power amplifier PA, at high transmittance to the shutter 18. The beam splitter 17a may reflect another part of the pulse laser beam to the focusing optics 17b. The focusing optics 17b may concentrate the light reflected by the beam splitter 17a on the light-receiving surface of the optical sensor 17c. The optical sensor 17c may detect pulse energy of the pulse laser beam concentrated on the light-receiving surface and output data on the pulse energy to the laser controller 19.

The laser controller 19 may send and receive various signals to and from the laser system controller 20. For example, the laser controller 19 may receive the oscillation trigger signal or data on the target pulse energy from the laser system controller 20. Further, the laser controller 19 may send a setting signal to set the charging voltage to the charger 12 and send an instruction signal for ON/OFF of the switch to the pulse power module 13.

The laser controller 19 may receive the data on the pulse energy from the pulse energy measuring unit 17 and control the charging voltage of the charger 12 with reference to the data on the pulse energy. Controlling the charging voltage of the charger 12 may result in controlling the pulse energy of the laser beam.

Further, the laser controller 19 may correct timing of an oscillation trigger such that the discharge occurs at a predetermined timing from the oscillation trigger based on the charging voltage.

The shutter 18 may be provided in the optical path of the pulse laser beam transmitted by the beam splitter 17a of the pulse energy measuring unit 17. The laser controller 19 may control the shutter 18 to be closed, from starting laser oscillation, until difference between the pulse energy received from the pulse energy measuring unit 17 and the target pulse energy falls within an acceptable range. The laser controller 19 may control the shutter 18 to be opened if the difference between the pulse energy received from the pulse energy measuring unit 17 and the target pulse energy falls within the acceptable range. The signal to indicate the pulse energy may be sent to the laser system controller 20 to show the timing of the pulse laser beam 21.

FIG. 8 shows an example where the laser apparatus includes the power amplifier PA; however, the power amplifier PA may be omitted.

Further, the laser apparatus does not have to be limited to the excimer laser apparatus. The laser apparatus may be a solid laser apparatus. For example, the solid laser apparatus may be a YAG laser apparatus to generate a third harmonic light having a wavelength of 355 nm or a fourth harmonic light having a wavelength of 266 nm.

3. Controlling Operation 3.1 Main Flow

Figure 9:
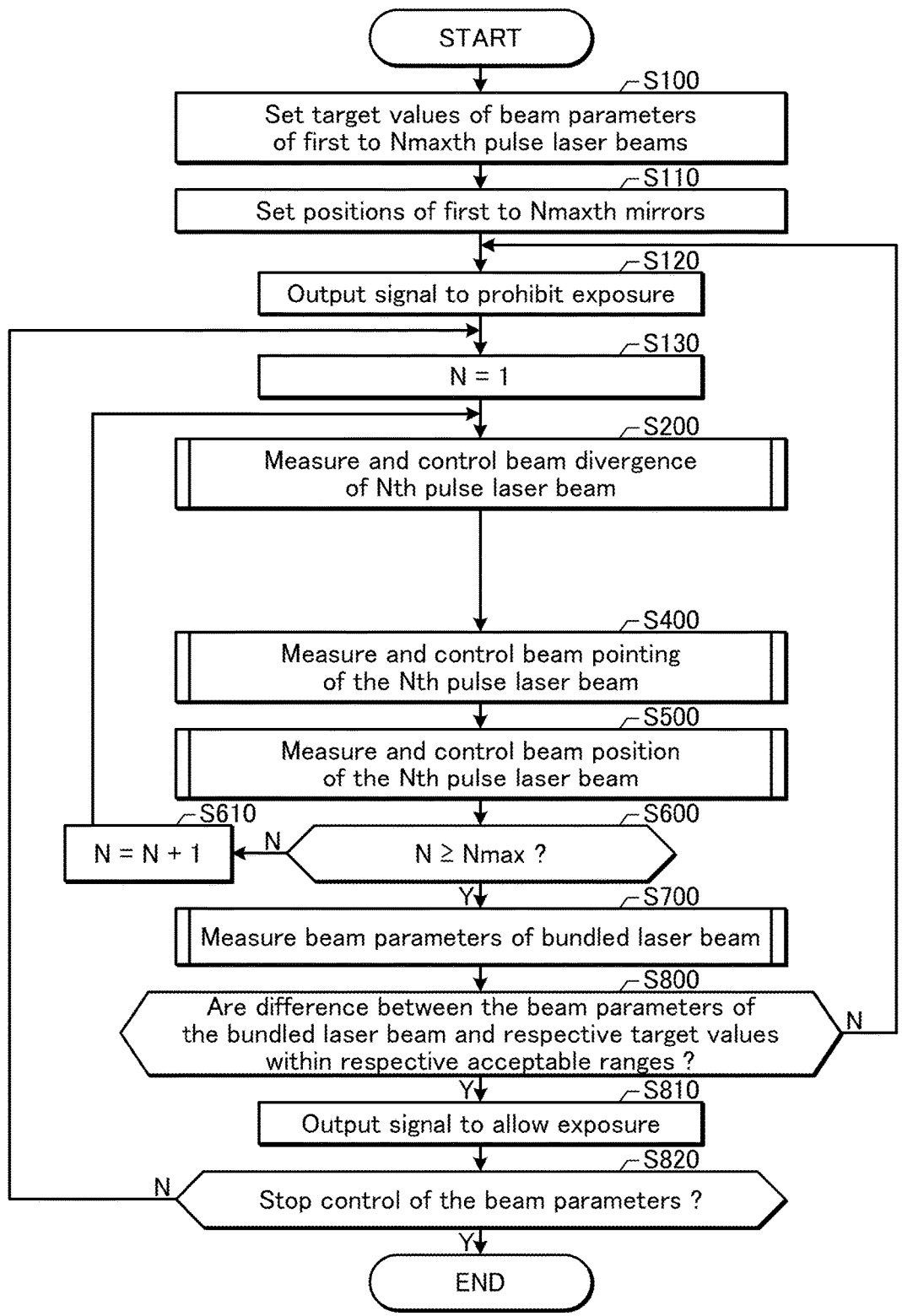
FIG. 9 is a flowchart illustrating an operation of a beam delivery device controller 59 shown in FIG. 2A.

FIG. 9 is a flowchart illustrating an operation of the beam delivery device controller 59 shown in FIG. 2A. In the following description, Nmax may be the number of the laser apparatuses included in the laser system 5. The beam delivery device controller 59 may adjust the beam parameters for each of the first to Nmaxth pulse laser beams. The beam delivery device controller 59 may then determine whether the beam parameters of the bundled laser beam are within their respective acceptable ranges.

First, at S100, the beam delivery device controller 59 may set target values of the beam parameters of the first to Nmaxth pulse laser beams. The target values of the beam parameters may include the target value of the beam divergence, the target value of the beam pointing, and the target value of the beam position. The target values of the beam parameters may be set based on values required by the exposure apparatus controller 40 of the exposure apparatus 4 for the beam parameters of the bundled laser beam.

Next, at S110, the beam delivery device controller 59 may set the positions of the first to Nmaxth mirrors. The positions of the first to Nmaxth mirrors may be the positions of the mirrors 9a to 9h shown in FIG. 2A.

Next, at S120, the beam delivery device controller 59 may output a signal to prohibit exposure. The signal to prohibit exposure may be sent to the exposure apparatus controller 40 of the exposure apparatus 4 via the laser system controller 20.

Next, at S130, the beam delivery device controller 59 may set a value of a counter N to 1. The value of the counter N may identify one of the first to Nmaxth laser apparatuses.

Next, at S200, the beam delivery device controller 59 may measure the beam divergence of the Nth pulse laser beam. The beam delivery device controller 59 may then control the Nth beam adjuster such that the beam divergence of the Nth pulse laser beam approaches a desired value. Details of this process will be described below with reference to FIGS. 10 to 12.

Next, at S400, the beam delivery device controller 59 may measure the beam pointing of the Nth pulse laser beam. The beam delivery device controller 59 may then control the Nth beam steering device such that the beam pointing of the Nth pulse laser beam approaches a desired value. Details of this process will be described below with reference to FIGS. 13 to 15.

Next, at S500 the beam delivery device controller 59 may measure the beam position of the Nth pulse laser beam. The beam delivery device controller 59 may then control the Nth beam steering device such that the beam position of the Nth pulse laser beam approaches a desired value. Details of this process will be described below with reference to FIGS. 16 to 18.

Next, at S600, the beam delivery device controller 59 may determine whether the value of the counter N has reached Nmax. If the value of the counter N has not reached Nmax (S600: NO), the beam delivery device controller 59 may add 1 to the current value of the counter N at S610 to update the value of the counter N. The beam delivery device controller 59 may then return to the above S200, to measure the beam parameters of the next pulse laser beam of the next laser apparatus.

If the value of the counter N has reached Nmax (S600: YES), the beam delivery device controller 59 may measure the beam parameters of the bundled laser beam at S700. Details of this process will be described below with reference to FIGS. 19 to 21.

Next, at S800, the beam delivery device controller 59 may determine whether differences between the beam parameters of the bundled laser beam and their respective target values are within their respective acceptable ranges.

If one of the differences between the beam parameters of the bundled laser beam and their respective target values is not within the corresponding acceptable range (S800: NO), the beam delivery device controller 59 may return to the above S120. The beam delivery device controller 59 may thus output the signal to prohibit exposure. The signal to prohibit exposure may be sent to the exposure apparatus controller 40 of the exposure apparatus 4 via the laser system controller 20. The beam delivery device controller 59 may then perform again the measuring and controlling of the beam parameters of each beam of the bundled laser beam.

If the differences between the beam parameters of the bundled laser beam and their respective target values are within their respective acceptable ranges (S800: YES), the beam delivery device controller 59 may output a signal to allow exposure at S810. The signal to allow exposure may be sent to the exposure apparatus controller 40 of the exposure apparatus 4 via the laser system controller 20.

Next, at S820, the beam delivery device controller 59 may determine whether the control of the beam parameters should be stopped. If the control of the beam parameters should not be stopped (S820: NO), the beam delivery device controller 59 may return to the above S130.

If the control of the beam parameters should be stopped (S820: YES), the beam delivery device controller 59 may terminate the processing of this flowchart.

3.2 Measuring and Controlling Beam Divergence

Figure 10:
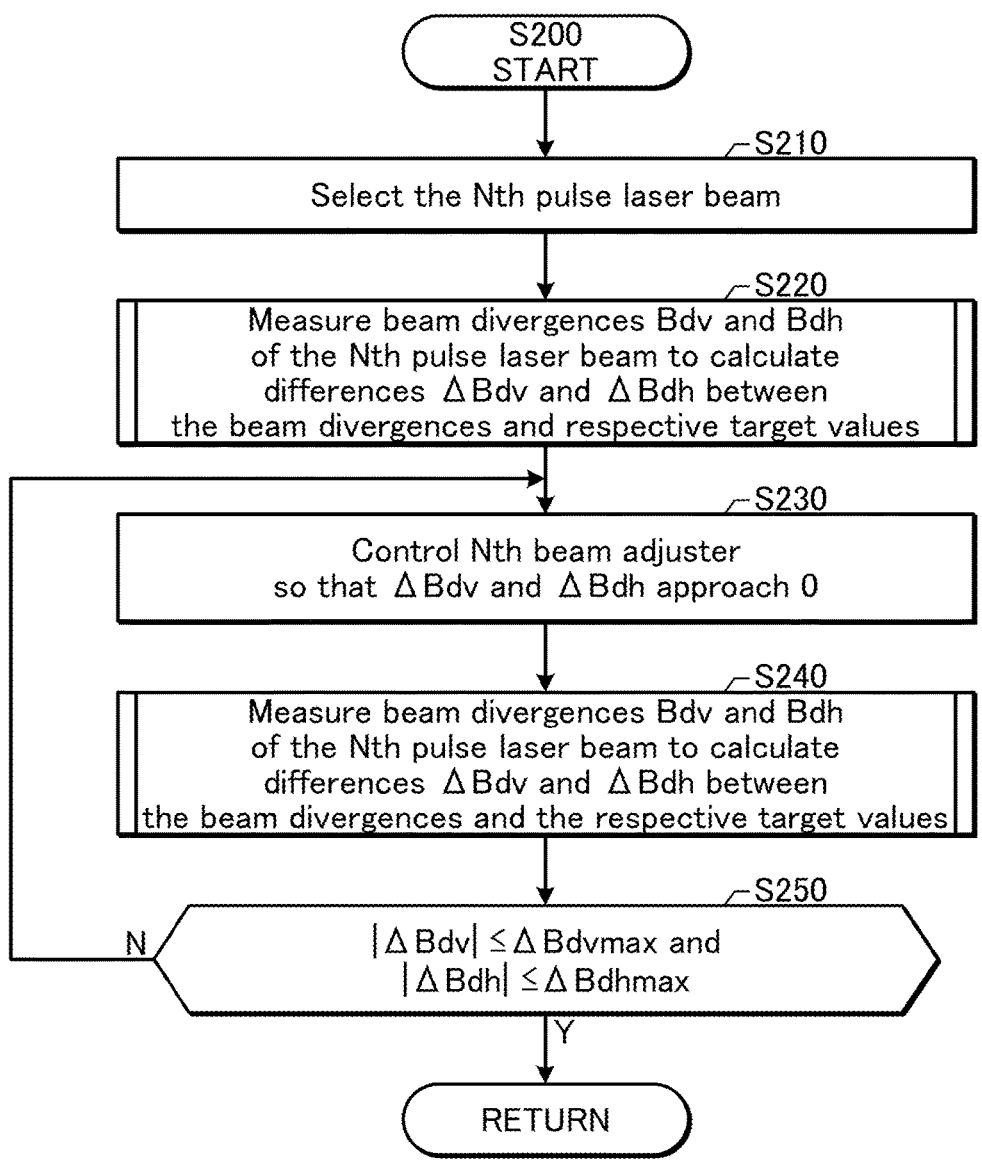
FIG. 10 is a flowchart illustrating detailed processing of measuring and controlling beam divergences of an Nth pulse laser beam shown in FIG. 9.

FIG. 10 is a flowchart illustrating detailed processing of measuring and controlling the beam divergence of the Nth pulse laser beam shown in FIG. 9. The processing shown in FIG. 10 may be performed by the beam delivery device controller 59 as a subroutine of S200 shown in FIG. 9.

First, at S210, the beam delivery device controller 59 may control the beam selecting mechanism 67 of the beam parameter measuring device 6 to select the Nth pulse laser beam.

Next, at S220, the beam delivery device controller 59 may measure the beam divergences of the Nth pulse laser beam using data outputted from the beam parameter measuring device 6. The beam divergences may include beam divergence Bdv in the V direction and beam divergence Bdh in the H direction. The beam delivery device controller 59 may then calculate differences ΔBdv and ΔBdh between the beam divergences Bdv and Bdh and their respective target values.

Details of these processes will be described below with reference to FIGS. 11 and 12.

Next, at S230, the beam delivery device controller 59 may control the Nth beam adjuster such that the differences ΔBdv and ΔBdh between the beam divergences Bdv and Bdh and their respective target values approach 0. The Nth beam divergence adjuster may be controlled as the Nth beam adjuster.

Next, at S240, the beam delivery device controller 59 may measure the beam divergences of the Nth pulse laser beam again, and calculate the differences ΔBdv and ΔBdh between the beam divergences Bdv and Bdh and their respective target values. This process may be substantially the same as the process of S220 described above.

Next, at S250, the beam delivery device controller 59 may determine whether absolute values of the respective differences ΔBdv and ΔBdh between the respective beam divergences and their respective target values are equal to or less than respective predetermined threshold values as follows.

$$|\Delta Bdv| \leq \Delta Bdv\mathrm{max}$$

$$|\Delta Bdh| \leq \Delta Bdh\mathrm{max}$$

ΔBdvmax may be a threshold value to define the acceptable range of the difference ΔBdv between the beam divergence and the target value. ΔBdhmax may be a threshold value to define the acceptable range of the difference ΔBdh between the beam divergence and the target value.

If one of the absolute values of the respective differences ΔBdv and ΔBdh between the respective beam divergences and their respective target values is not equal to or less than the corresponding threshold value (S250: NO), the beam delivery device controller 59 may return to the above S230 to control the Nth beam adjuster.

If both of the absolute values of the respective differences ΔBdv and ΔBdh between the respective beam divergences and their respective target values are equal to or less than their respective threshold values (S250: YES), the beam delivery device controller 59 may terminate the processing of this flowchart to return to S400 in FIG. 9.

Figure 11:
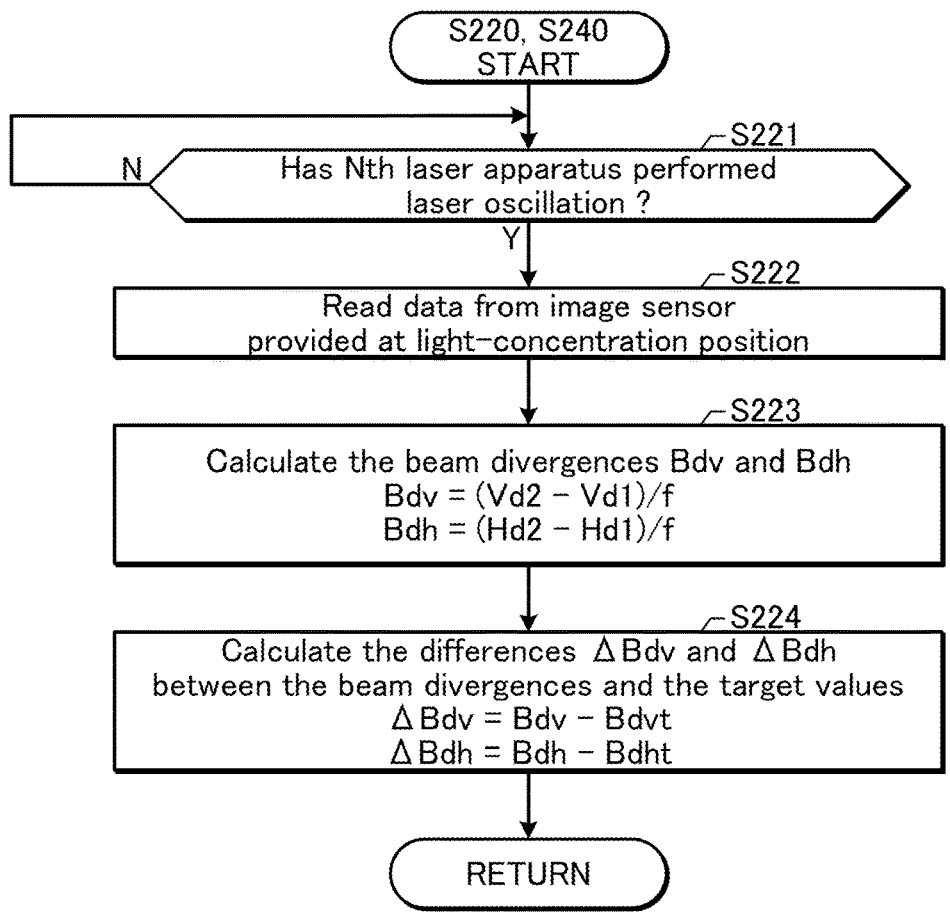
FIG. 11 is a flowchart illustrating detailed processing of measuring the beam divergences and calculating differences between the beam divergences and their respective target values shown in FIG. 10.

FIG. 11 is a flowchart illustrating detailed processing of measuring the beam divergences and calculating the differences between the beam divergences and their respective target values shown in FIG. 10. The processing shown in FIG. 11 may be performed by the beam delivery device controller 59 as a subroutine of S220 or S240 shown in FIG. 10.

First, at S221, the beam delivery device controller 59 may determine whether the Nth laser apparatus has performed laser oscillation.

If the Nth laser apparatus has not performed laser oscillation (S221: NO), the beam delivery device controller 59 may stand by until the Nth laser apparatus performs laser oscillation.

If the Nth laser apparatus has performed laser oscillation (S221: YES), the beam delivery device controller 59 may proceed to S222.

At S222, the beam delivery device controller 59 may read data from the image sensor 64 provided at the light-concentration position concentrated by the focusing optics 63 of the beam parameter measuring device 6. The data from the image sensor 64 may include data on the distribution of the light intensity of the Nth pulse laser beam at the light-concentration position. The beam delivery device controller 59 may detect coordinates of opposite ends of the spot diameter of the Nth pulse laser beam at the light-concentration position. The coordinates may be detected based on the data on the distribution of the light intensity of the Nth pulse laser beam at the light-concentration position.

Figure 12:
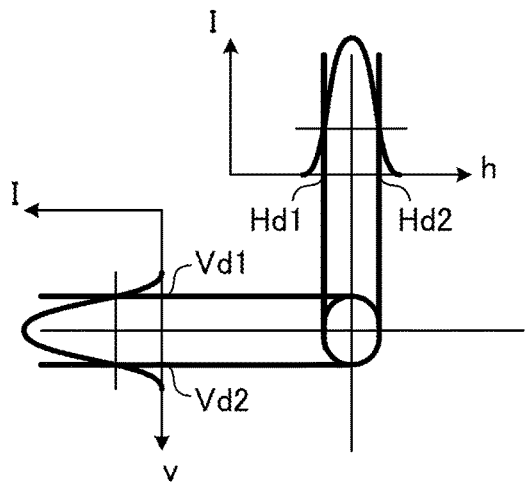
FIG. 12 shows a relationship between data on distributions of light intensity of the Nth pulse laser beam at a light-concentration position and spot diameters at the light-concentration position.

FIG. 12 shows a relationship between the data on the distributions of the light intensity of the Nth pulse laser beam at the light-concentration position and spot diameters at the light-concentration position. Each of the spot diameters of the Nth pulse laser beam at the light-concentration position may be a width of a portion having light intensity corresponding to a predetermined ratio or more of the peak intensity. The predetermined ratio may be any one of $1/e^2$, 50%, and 5%. The spot diameters of the Nth pulse laser beam at the light-concentration position may include a spot diameter in the V direction and a spot diameter in the H direction. The spot diameter in the V direction may be a distance between a first position Vd1 where the light intensity is a threshold value and a second position Vd2 where the light intensity is the same threshold value. The spot diameter in the H direction may be a distance between a first position Hd1 where the light intensity is the same threshold value and a second position Hd2 where the light intensity is the same threshold value. The light intensities in these positions Vd1, Vd2, Hd1, and Hd2 may correspond to the predetermined ratio of the peak intensity.

Referring back to FIG. 11, after reading the data from the image sensor 64 at S222, the beam delivery device controller 59 may proceed to S223.

At S223, the beam delivery device controller 59 may calculate the beam divergence Bdv in the V direction and the beam divergence Bdh in the H direction by the following formula.

$$Bdv=(Vd2-Vd1)/f$$

$$Bdh=(Hd2-Hd1)/f$$

Here, f may be a focal length of the focusing optics 63. The beam divergence may be a value obtained by dividing the spot diameter of the light received by the image sensor 64 by the focal length of the focusing optics 63.

Next, at S224, the beam delivery device controller 59 may calculate differences ΔBdv and ΔBdh between the beam divergences Bdv and Bdh and their respective target values as follows.

$$\Delta Bdv=Bdv-Bdvt$$

$$\Delta Bdh=Bdh-Bdht$$

Bdvt and Bdht may be the respective target values of the beam divergences in the V direction and the H direction.

3.3 Measuring and Controlling Beam Pointing

Figure 13:
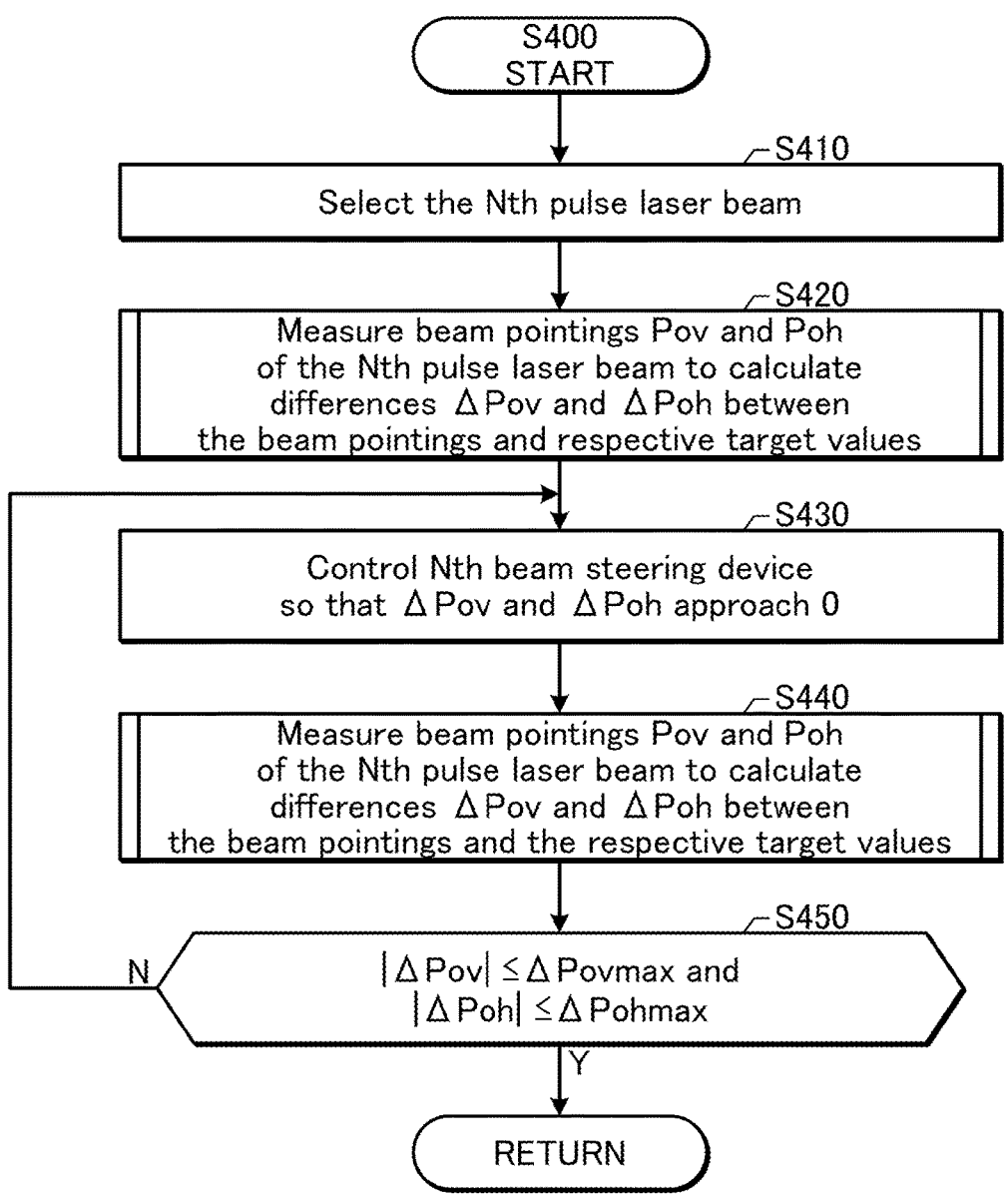
FIG. 13 is a flowchart illustrating detailed processing of measuring and controlling beam pointings of the Nth pulse laser beam shown in FIG. 9.

FIG. 13 is a flowchart illustrating detailed processing of measuring and controlling the beam pointings of the Nth pulse laser beam shown in FIG. 9. The processing shown in FIG. 13 may be performed by the beam delivery device controller 59 as a subroutine of S400 shown in FIG. 9.

As explained below, the processing shown in FIG. 13 may be substantially the same as that in FIG. 10 except that the beam pointings are measured instead of measuring the beam divergences, and that the beam steering device may be controlled instead of controlling the beam adjuster.

First, the process of S410 may be substantially the same as the process of S210 in FIG. 10.

Next, at S420, the beam delivery device controller 59 may measure beam pointings Pov and Poh of the Nth pulse laser beam using data outputted from the beam parameter measuring device 6. The beam delivery device controller 59 may then calculate differences ΔPov and ΔPoh between the beam pointings Pov and Poh and their respective target values.

Details of these processes will be described below with reference to FIGS. 14 and 15.

Next, at S430, the beam delivery device controller 59 may control the Nth beam steering device such that the differences ΔPov and ΔPoh between the beam pointings Pov and Poh and their respective target values approach 0.

The next process of S440 may be substantially the same as the process of S420 described above.

Next, at S450, the beam delivery device controller 59 may determine whether absolute values of the respective differences ΔPov and ΔPoh between the respective beam pointings and their respective target values are equal to or less than their respective predetermined threshold values as follows.

$$|\Delta Pov| \leq \Delta Povmax$$

$$|\Delta Poh| \leq \Delta Pohmax$$

ΔPovmax may be a threshold value to define the acceptable range of the difference ΔPov between the beam pointing and the target value. ΔPohmax may be a threshold value to define the acceptable range of the difference ΔPoh between the beam pointing and the target value.

If one of the absolute values of the respective differences ΔPov and ΔPoh between the respective beam pointings and their respective target values is not equal to or less than the corresponding threshold value (S450: NO), the beam delivery device controller 59 may return to the above S430 to control the Nth beam steering device.

If both of the absolute values of the respective differences ΔPov and ΔPoh between the respective beam pointings and their respective target values are equal to or less than their respective threshold values (S450: YES), the beam delivery device controller 59 may terminate the processing of this flowchart to proceed to S500 in FIG. 9.

Figure 14:
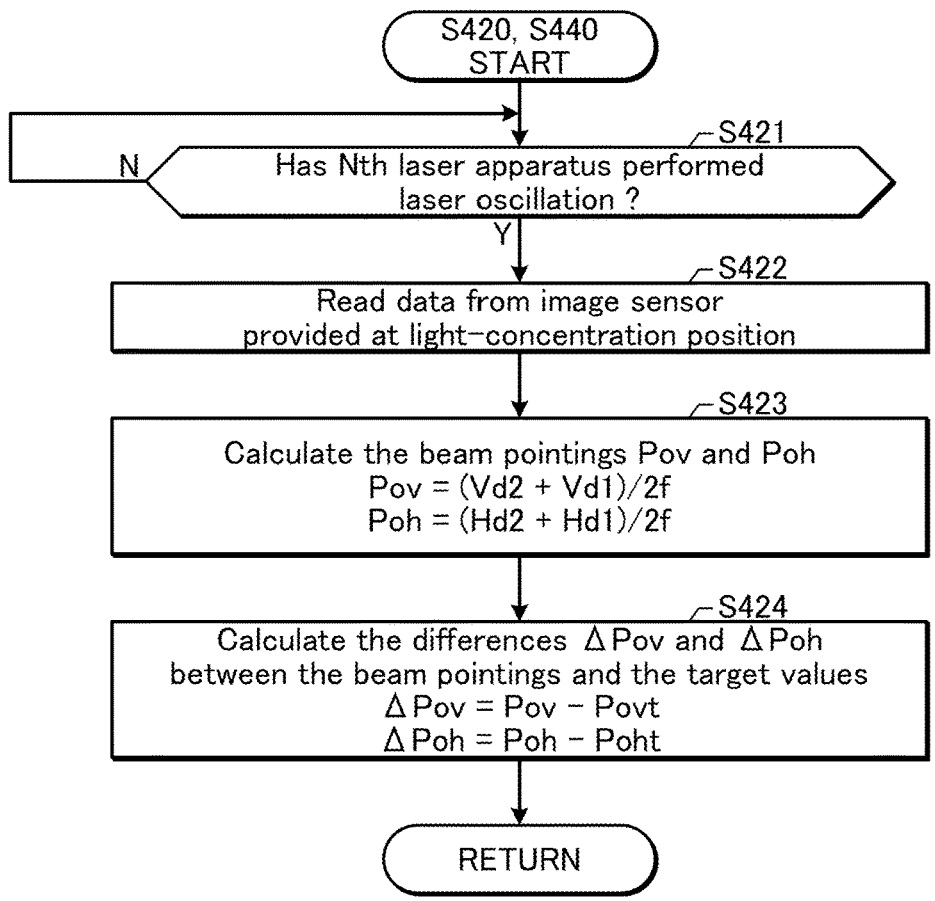
FIG. 14 is a flowchart illustrating detailed processing of measuring the beam pointings and calculating differences between the beam pointings and their respective target values shown in FIG. 13.

FIG. 14 is a flowchart illustrating detailed processing of measuring the beam pointings and calculating the differences between the beam pointings and their respective target values shown in FIG. 13. The processing shown in FIG. 14 may be performed by the beam delivery device controller 59 as a subroutine of S420 or S440 shown in FIG. 13.

First, the processes at S421 and S422 may be substantially the same as the processes at S221 and S222 described above with reference to FIG. 11.

Figure 15:
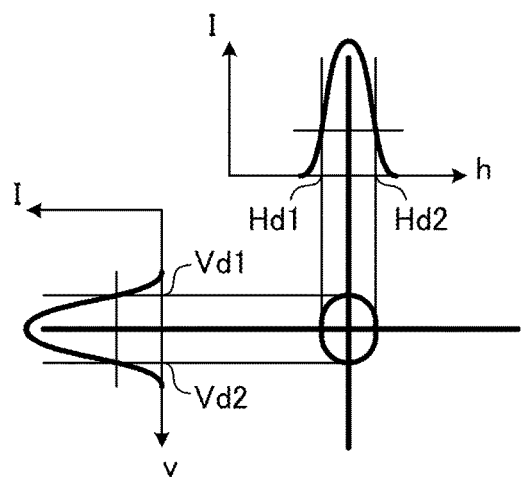
FIG. 15 shows a relationship between the data on the distributions of the light intensity of the Nth pulse laser beam at the light-concentration position and spot centers at the light-concentration position.

FIG. 15 shows a relationship between the data on the distributions of the light intensity of the Nth pulse laser beam at the light-concentration position and spot centers at the light-concentration position. Each of the spot centers of the Nth pulse laser beam at the light-concentration position may be a center of a portion having light intensity corresponding to a predetermined ratio or more of the peak intensity. The predetermined ratio may be any one of $1/e^2$, 50%, and 5%. Alternatively, the spot center may be a centroid of the distribution of the light intensity. The spot centers of the Nth pulse laser beam at the light-concentration position may include a spot center in the V direction and a spot center in the H direction. The spot center in the V direction may be a middle point between the first position Vd1 where the light intensity is the threshold value and the second position Vd2 where the light intensity is the same threshold value. The spot center in the H direction may be a middle point between the first position Hd1 where the light intensity is the threshold value and the second position Bd2 where the light intensity is the same threshold value. The light intensities in these positions Vd1, Vd2, Hd1, and Hd2 may correspond to the predetermined ratio of the peak intensity.

Referring back to FIG. 14, at S423, the beam delivery device controller 59 may calculate the beam pointing Pov in the V direction and the beam pointing Poh in the H direction by the following formula.

$$Pov=(Vd2+Vd1)/2f$$

$$Poh=(Hd2+Hd1)/2f$$

Here, f may be the focal length of the focusing optics 63. The beam pointing may be a value obtained by dividing the spot center of the light received by the image sensor 64 by the focal length of the focusing optics 63.

Next, at S424, the beam delivery device controller 59 may calculate differences ΔPov and ΔPoh between the beam pointings Pov and Poh and their respective target values as follows.

$$\Delta Pov=Pov-Povt$$

$$\Delta Poh=Poh-Poht$$

Povt and Poht may be the respective target values of the beam pointings in the V direction and the H direction.

3.4 Measuring and Controlling Beam Position

Figure 16:
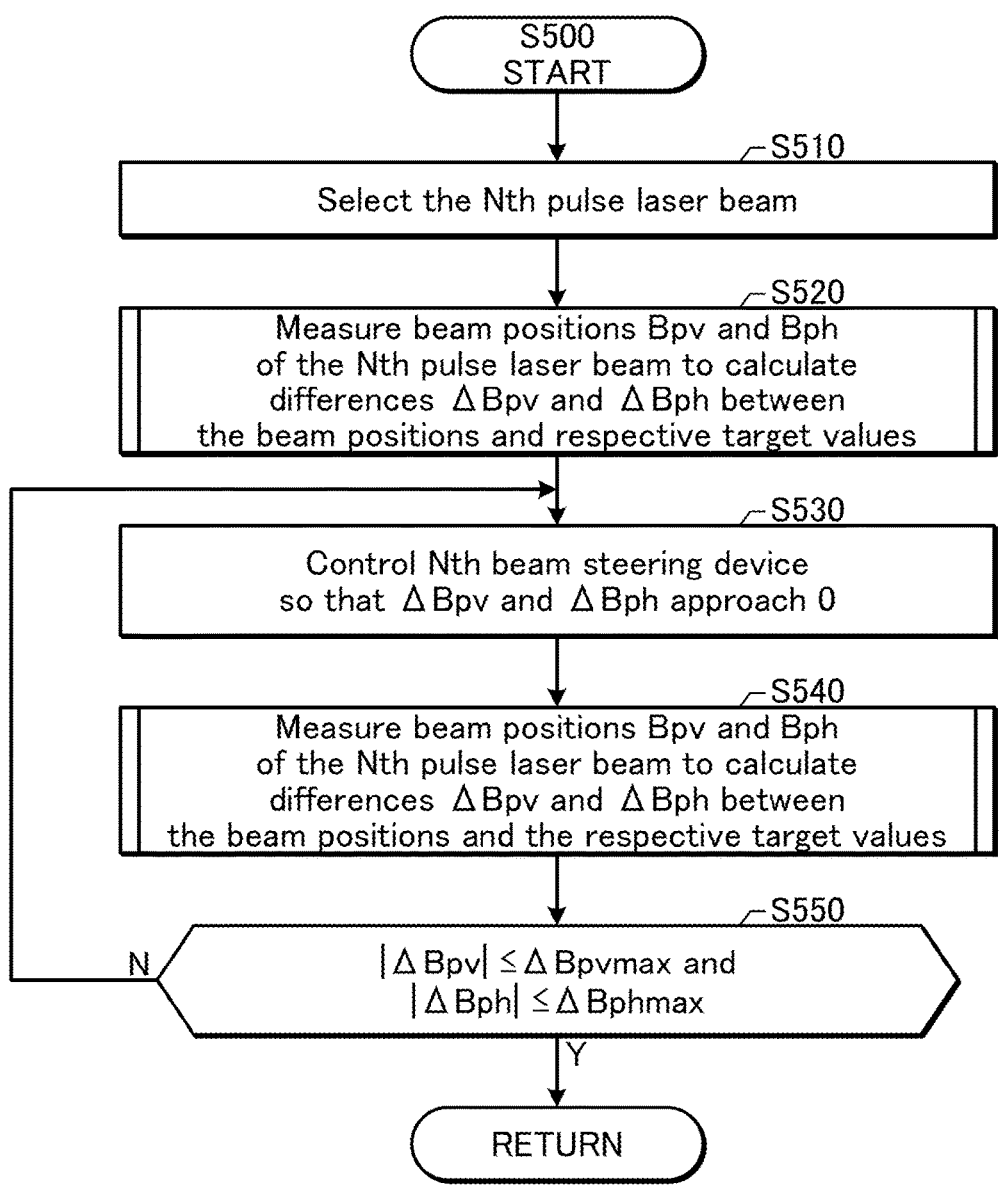
FIG. 16 is a flowchart illustrating detailed processing of measuring and controlling beam positions of the Nth pulse laser beam shown in FIG. 9.

FIG. 16 is a flowchart illustrating detailed processing of measuring and controlling the beam positions of the Nth pulse laser beam shown in FIG. 9. The processing shown in FIG. 16 may be performed by the beam delivery device controller 59 as a subroutine of S500 shown in FIG. 9.

As explained below, the processing shown in FIG. 16 may be substantially the same as that in FIG. 13 except that the beam positions are measured instead of measuring the beam pointing.

First, the process of S510 may be substantially the same as the process of S410 shown in FIG. 13.

Next, at S520, the beam delivery device controller 59 may measure beam positions Bpv and Bph of the Nth pulse laser beam using data outputted from the beam parameter measuring device 6. The beam delivery device controller 59 may then calculate differences ΔBpv and ΔBph between the beam positions Bpv and Bph and their respective target values. Details of these processes will be described below with reference to FIGS. 17 and 18.

Next, at S530, the beam delivery device controller 59 may control the Nth beam steering device such that the differences ΔBpv and ΔBph between the beam positions Bpv and Bph and their respective target values approach 0.

The next process of S540 may be substantially the same as the process of S520 described above.

Next, at S550, the beam delivery device controller 59 may determine whether absolute values of the respective differences ΔBpv and ΔBph between the respective beam positions and their respective target values are equal to or less than their respective predetermined threshold values as follows.

$$|\Delta Bpv|\leq \Delta Bpv\text{max}$$

$$|\Delta Bph|\leq \Delta Bph\text{max}$$

ΔBpvmax may be a threshold value to define the acceptable range of the difference ΔBpv between the beam position and the target value. ΔBphmax may be a threshold value to define the acceptable range of the difference ΔBph between the beam position and the target value.

If one of the absolute values of the respective differences ΔBpv and ΔBph between the respective beam positions and their respective target values is not equal to or less than the corresponding threshold value (S550: NO), the beam delivery device controller 59 may return to the above S530 to control the Nth beam steering device.

If both of the absolute values of the respective differences ΔBpv and ΔBph between the respective beam positions and their respective target values are equal to or less than their respective threshold values (S550: YES), the beam delivery device controller 59 may terminate the processing of this flowchart to proceed to S600 in FIG. 9.

Figure 17:
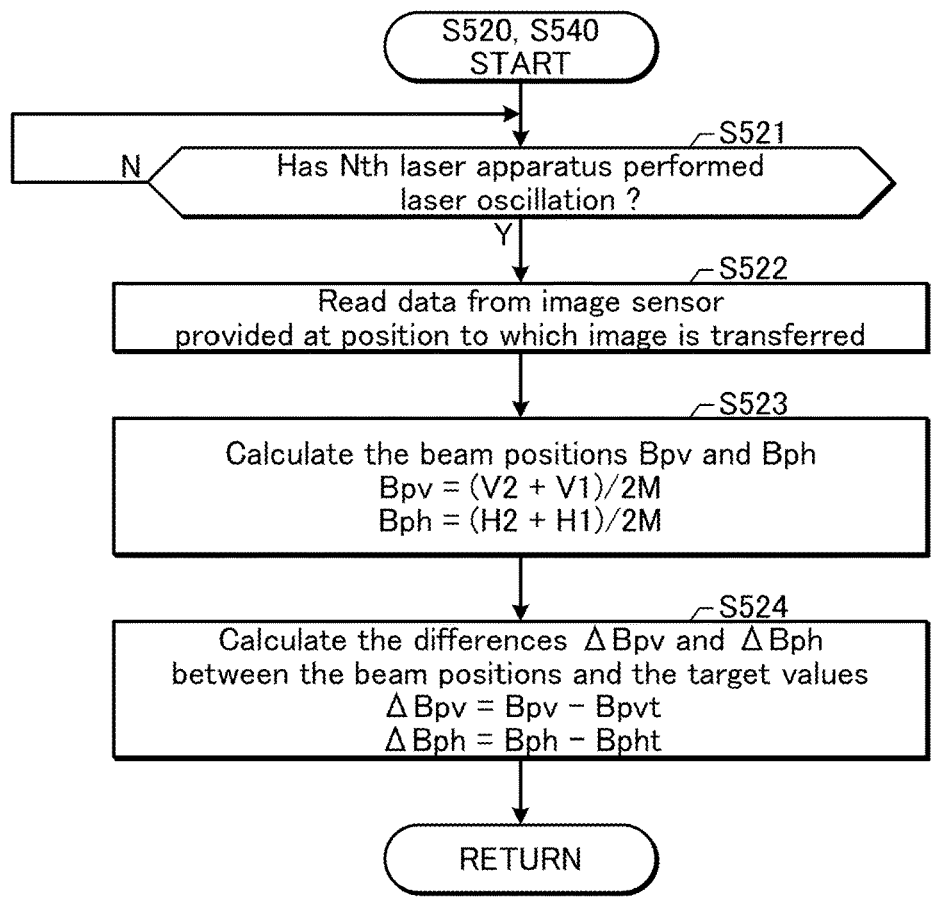
FIG. 17 is a flowchart illustrating detailed processing of measuring the beam positions and calculating differences between the beam positions and their respective target values shown in FIG. 16.

FIG. 17 is a flowchart illustrating detailed processing of measuring the beam positions and calculating the differences between the beam positions and their respective target values shown in FIG. 16. The processing shown in FIG. 17 may be performed by the beam delivery device controller 59 as a subroutine of S520 or S540 shown in FIG. 16.

First, the process of S521 may be substantially the same as the process of S421 described above with reference to FIG. 14.

At S522, the beam delivery device controller 59 may read data from the image sensor 66 provided at the position to which an image is transferred by the transfer optics 65 of the beam parameter measuring device 6. The data from the image sensor 66 may include data on the distribution of light intensity in a cross section of the Nth pulse laser beam. The beam delivery device controller 59 may detect coordinates of opposite ends of the beam width of the Nth pulse laser beam. The coordinates may be detected based on the data on the distribution of the light intensity in a cross section of the Nth pulse laser beam.

Figure 18:
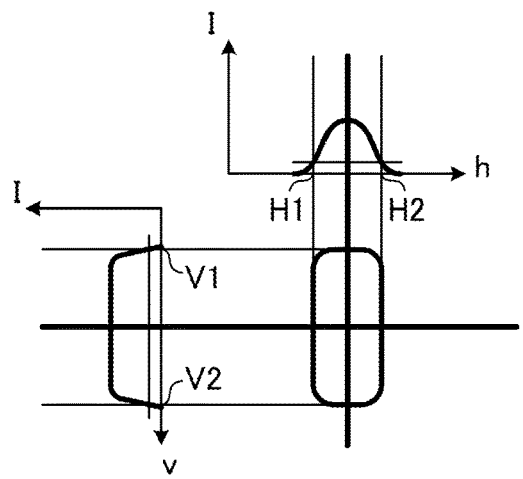
FIG. 18 shows a relationship between data on distributions of light intensity in a cross section of the Nth pulse laser beam and the beam positions.

FIG. 18 shows a relationship between the data on the distributions of the light intensity in the cross section of the Nth pulse laser beam and the beam positions. Each of the beam positions of the Nth pulse laser beam may be a center of a portion having light intensity corresponding to a predetermined ratio or more of the peak intensity. The predetermined ratio may be any one of $1/e^2$, 50%, and 5%. Alternatively, the beam position may be a centroid of the distribution of the light intensity. The beam positions of the Nth pulse laser beam may include a beam position in the V direction and a beam position in the H direction. The beam position in the V direction may be a middle point between the first position V1 where the light intensity is the threshold value and the second position V2 where the light intensity is the same threshold value. The beam position in the H direction may be a middle point between the first position H1 where the light intensity is the threshold value and the second position H2 where the light intensity is the same threshold value. The light intensities in these positions V1, V2, H1, and H2 may correspond to the predetermined ratio of the peak intensity.

Referring back to FIG. 17, at S523, the beam delivery device controller 59 may calculate the beam position Bpv in the V direction and the beam position Bph in the H direction by the following formula.

$$Bpv=(V2+V1)/2M$$

$$Bph=(H2+H1)/2M$$

Here, M may be magnification of the transfer optics 65. The beam position may be calculated by dividing the center of the light received on the image sensor 66 by the magnification of the transfer optics 65.

Next, at S524, the beam delivery device controller 59 may calculate differences ΔBpv and ΔBph between the beam positions Bpv and Bph and their respective target values as follows.

$$\Delta Bpv=Bpv-Bpvt$$

$$\Delta Bph=Bph-Bpht$$

Bpvt and Bpht may be the respective target values of the beam positions in the V direction and the B direction.

3.5 Measuring Bundled Laser Beam

Figure 19:
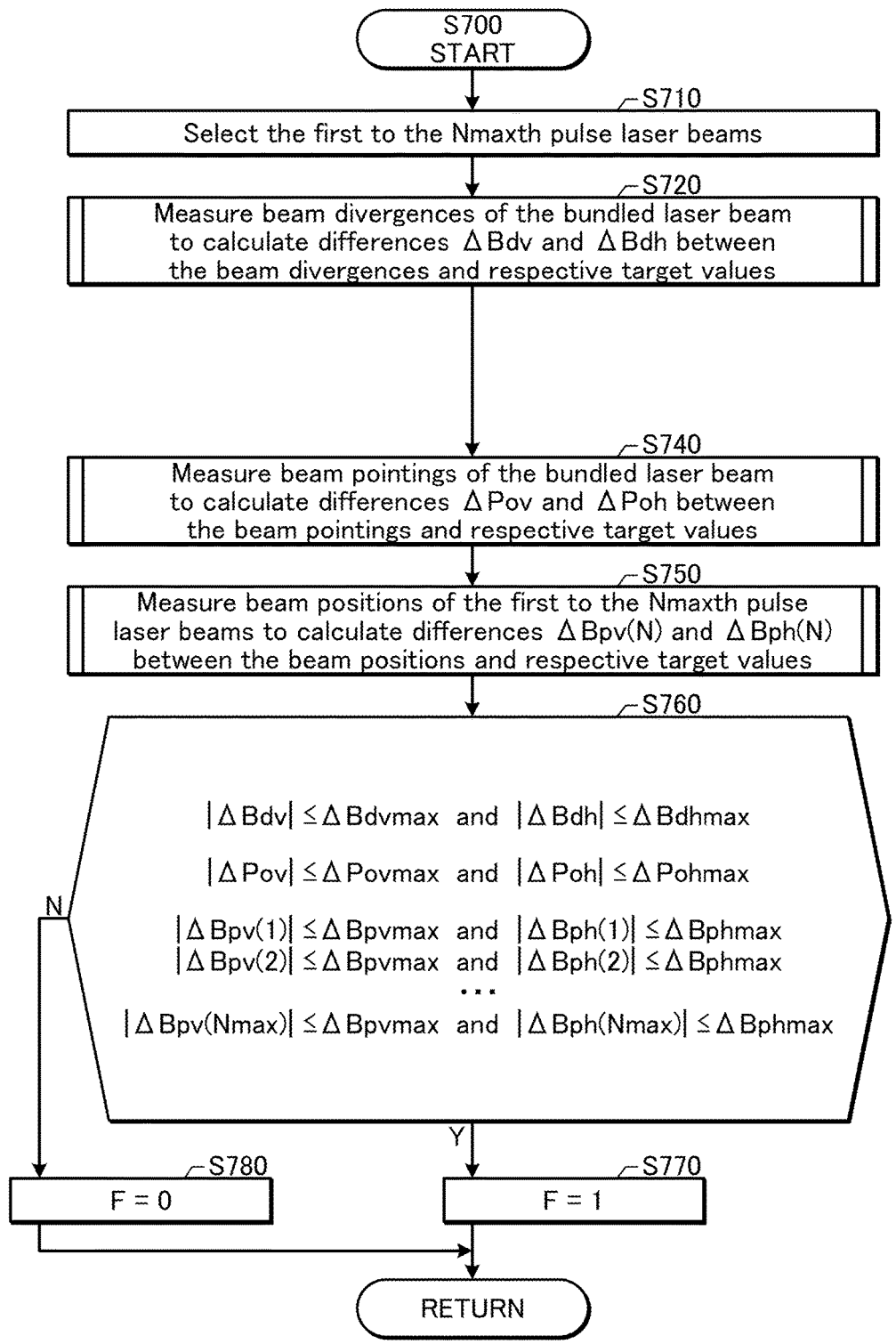
FIG. 19 is a flowchart illustrating detailed processing of measuring beam parameters of a bundled laser beam shown in FIG. 9.

FIG. 19 is a flowchart illustrating detailed processing of measuring the beam parameters of the bundled laser beam shown in FIG. 9. The processing shown in FIG. 19 may be performed by the beam delivery device controller 59 as a subroutine of S700 shown in FIG. 9.

First, at S710, the beam delivery device controller 59 may control the beam selecting mechanism 67 of the beam parameter measuring device 6 to select all of the first to Nmaxth pulse laser beams. In other words, the bundled laser beam including the first to Nmaxth pulse laser beams may be made pass through the beam selecting mechanism 67.

Next, at S720, the beam delivery device controller 59 may measure beam divergences Bdv and Bdh of the bundled laser beam. The beam delivery device controller 59 may then calculate differences ΔBdv and ΔBdh between the beam divergences Bdv and Bdh and their respective target values. This process may be substantially the same as the process of S200 described above with reference to FIGS. 9 to 12, except that the bundled laser beam is measured.

Next, at S740, the beam delivery device controller 59 may measure beam pointings Pov and Poh of the bundled laser beam. The beam delivery device controller 59 may then calculate differences ΔPov and ΔPoh between the beam pointings Pov and Poh and their respective target values. This process may be substantially the same as the process of S400 described above with reference to FIGS. 9 and 13 to 15, except that the bundled laser beam is measured.

Next, at S750, the beam delivery device controller 59 may measure beam positions Bpv(N) and Bph(N) of each of the first to Nmaxth pulse laser beams. Bpv(N) may represent each of Bpv(1), Bpv(2), . . . , and Bpv(Nmax). Bph(N) may represent each of Bph(1), Bph(2), . . . , and Bph(Nmax). Here, " . . . " may represent an ellipsis of some values identified by using integers between 2 and Nmax. The beam delivery device controller 59 may then calculate differences ΔBpv(N) and ΔBph(N) between the beam positions Bpv(N) and Bph(N) and their respective target values. ΔBpv(N) may represent each of ΔBpv(1), ΔBpv(2), . . . , and ΔBpv(Nmax). ΔBph(N) may represent each of ΔBph(1), ΔBph(2), . . . , and ΔBph(Nmax). Details of these processes will be described below with reference to FIGS. 20 and 21.

Next, at S760, the beam delivery device controller 59 may determine whether absolute values of the respective differences between the respective measured beam parameters and their respective target values are equal to or less than their respective predetermined threshold values as follows.

$|\Delta Bdv| \leq \Delta Bdvmax$ $|\Delta Bdh| \leq \Delta Bdhmax$ $|\Delta Pov| \leq \Delta Povmax$ $|\Delta Poh| \leq \Delta Pohmax$ $|\Delta Bpv(1)| \leq \Delta Bpvmax$ $|\Delta Bph(1)| \leq \Delta Bphmax$ $|\Delta Bpv(2)| \leq \Delta Bpvmax$ $|\Delta Bph(2)| \leq \Delta Bphmax$

...

$|\Delta Bpv(Nmax)| \leq \Delta Bpvmax$ $|\Delta Bph(Nmax)| \leq \Delta Bphmax$

If one of the absolute values of the respective differences between the respective measured beam parameters and their respective target values is not equal to or less than the corresponding threshold value (S760: NO), the beam delivery device controller 59 may set, at S780, a flag F showing a determination result to 0 and then terminate the processing of this flowchart.

If all of the absolute values of the respective differences between the respective measured beam parameters and their respective target values are equal to or less than their respective threshold values (S760: YES), the beam delivery device controller 59 may set, at S770, the flag F showing the determination result to 1 and then terminate the processing of this flowchart.

After terminating the processing of this flowchart, the beam delivery device controller 59 may proceed to S800 in FIG. 9. If the flag F showing the determination result was set to 0 (S760: NO), the beam delivery device controller 59 may decide at S800 in FIG. 9 that one of the differences between the beam parameters of the bundled laser beam and their respective target values is not within the corresponding acceptable range (S800: NO). If the flag F showing the determination result was set to 1 (S760: YES), the beam delivery device controller 59 may decide at S800 in FIG. 9 that the differences between the beam parameters of the bundled laser beam and their respective target values are within their respective ranges (S800: YES).

Figure 20:
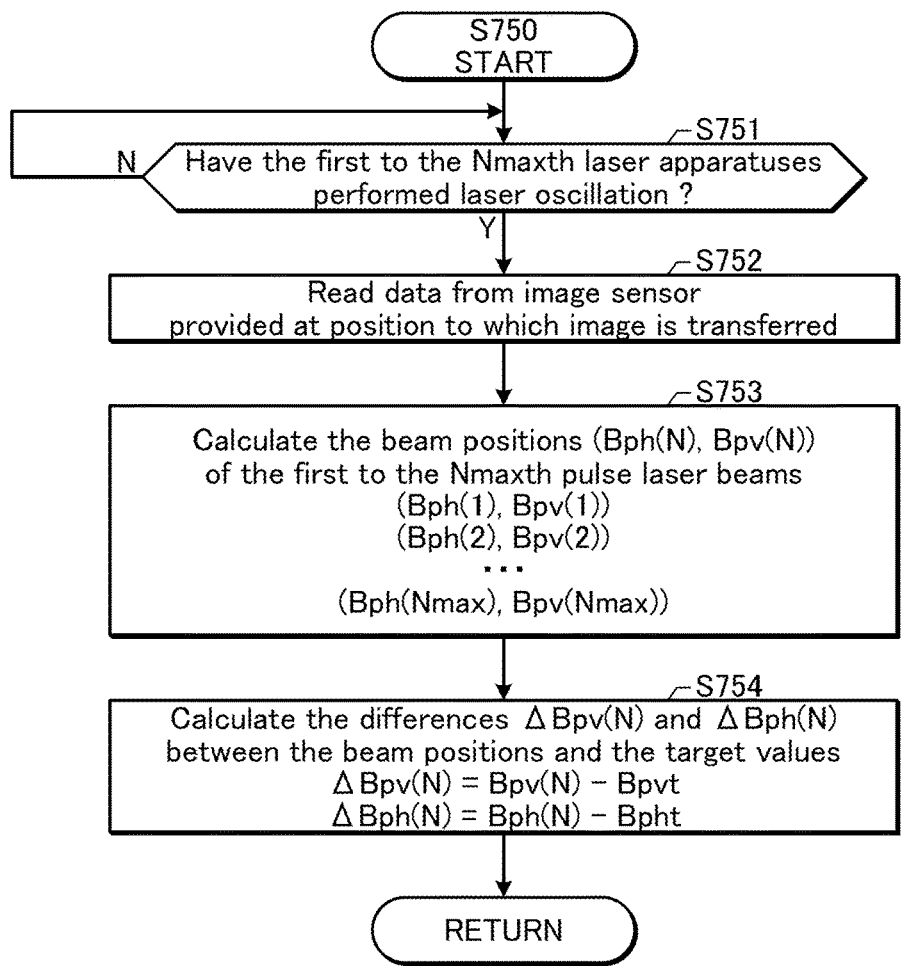
FIG. 20 is a flowchart illustrating detailed processing of measuring beam positions of first to Nmaxth pulse laser beams and calculating differences between the beam positions and their respective target values shown in FIG. 19.

FIG. 20 is a flowchart illustrating detailed processing of measuring the beam positions of the first to Nmaxth pulse laser beams and calculating differences between the beam positions and their respective target values shown in FIG. 19. The processing shown in FIG. 20 may be performed by the beam delivery device controller 59 as a subroutine of S750 shown in FIG. 19.

First, at S751, the beam delivery device controller 59 may determine whether the first to Nmaxth laser apparatuses have performed laser oscillation.

If the first to Nmaxth laser apparatuses have not performed laser oscillation (S751: NO), the beam delivery device controller 59 may stand by until the first to Nmaxth laser apparatuses perform laser oscillation.

If the first to Nmaxth laser apparatuses have performed laser oscillation (S751: YES), the beam delivery device controller 59 may proceed to S752.

At S752, the beam delivery device controller 59 may read data from the image sensor 66 provided at the position to which an image is transferred by the transfer optics 65 of the beam parameter measuring device 6. The data from the image sensor 66 may include data on the distribution of light intensity in cross sections of the first to Nmaxth pulse laser beams.

Figure 21:
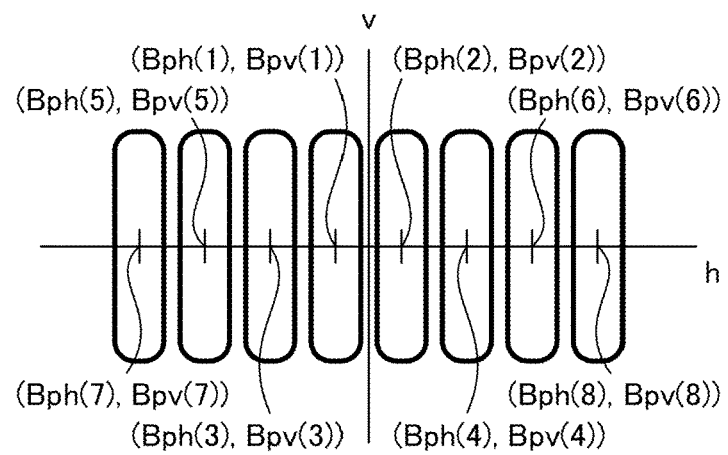
FIG. 21 shows a relationship between data on distributions of light intensity in cross sections of the first to Nmaxth pulse laser beams and the beam positions of the first to Nmaxth pulse laser beams.

FIG. 21 shows a relationship between the data on the distributions of the light intensity in the cross sections of the first to Nmaxth pulse laser beams and the beam positions of the first to Nmaxth pulse laser beams. The beam position of each of the first to Nmaxth pulse laser beams may be a center of a portion having light intensity corresponding to a predetermined ratio or more of the peak intensity of each of the pulse laser beams. The predetermined ratio may be any one of $1/e^2$, 50%, and 5%. Alternatively, the beam position may be a centroid of the distribution of the light intensity.

Referring back to FIG. 20, after reading the data from the image sensor 66 at S752, the beam delivery device controller 59 may proceed to S753.

At S753, the beam delivery device controller 59 may calculate the beam positions (Bph(N), Bpv(N)) of each of the first to Nmaxth pulse laser beams. The beam positions (Bph(N), Bpv(N)) may represent each of the following.

(Bph(1), Bpv(1))
(Bph(2), Bpv(2))
. . .
(Bph(Nmax), Bpv(Nmax))

Next, at S754, the beam delivery device controller 59 may calculate differences ΔBpv(N) and ΔBph(N) between the beam positions of the respective Nth pulse laser beams included in the first to Nmaxth pulse laser beams and their respective target values of the beam positions as follows.

$$\Delta Bpv(N)=Bpv(N)-Bpvt$$

$$\Delta Bph(N)=Bph(N)-Bpht(N)$$

Bpvt may be a target value of each of the beam positions of the first to Nmaxth pulse laser beams in the V direction. Bpht(N) may be a target value of the beam position of the Nth pulse laser beam included in the first to Nmaxth pulse laser beams in the H direction. The target value of the beam position in the H direction may vary according to the value of N.

As explained above, in the first embodiment, the beam parameters of each of the first to Nmaxth pulse laser beams may be adjusted, and then whether the beam parameters of the bundled laser beam are within their respective acceptable ranges may be determined. This may enable to stabilize the beam parameters of the bundled laser beam and improve annealing quality.

4. Second Embodiment

4.1 Main Flow

Figure 22:
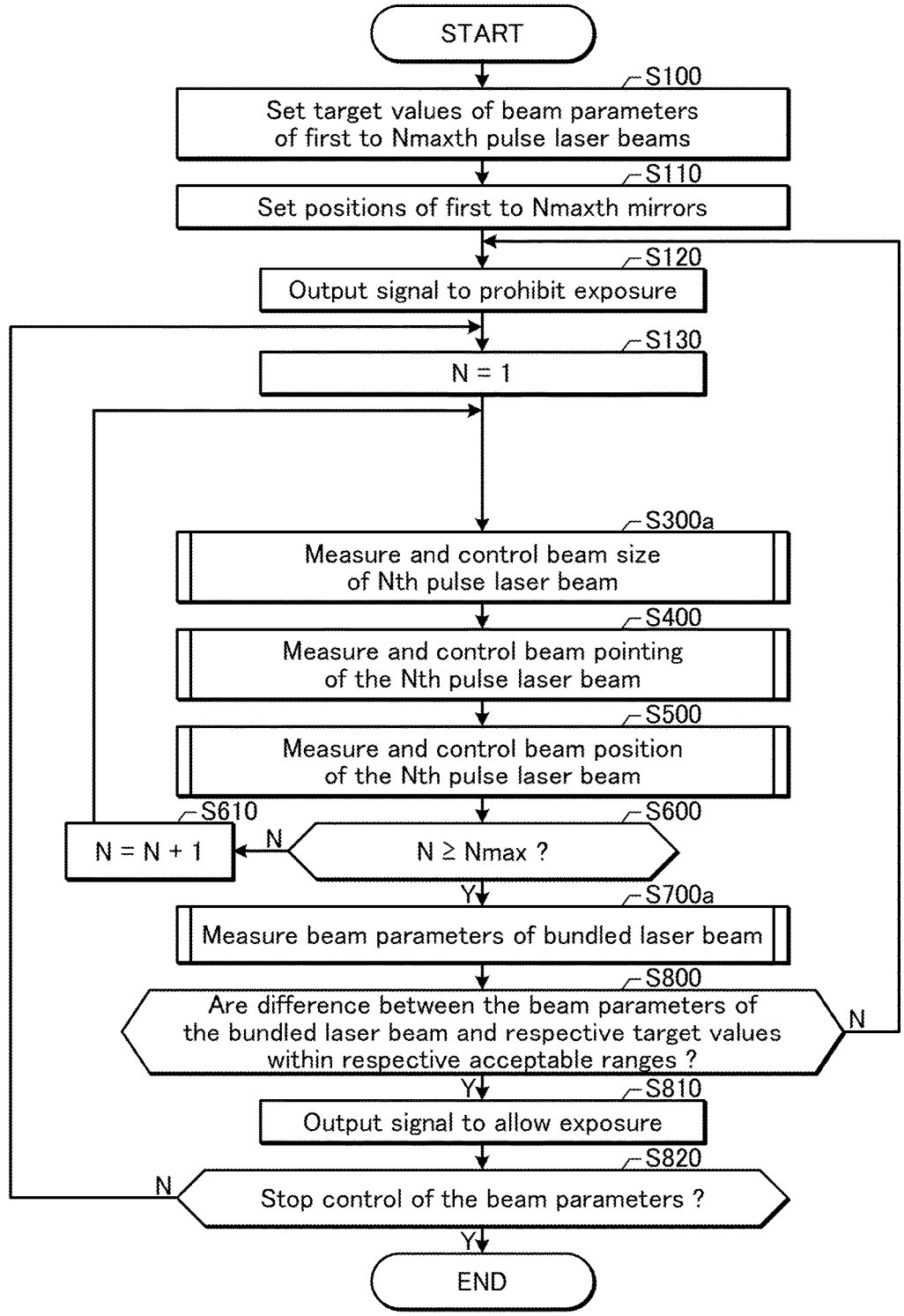
FIG. 22 is a flowchart illustrating an operation of a beam delivery device controller 59 according to a second embodiment of the present disclosure.

FIG. 22 is a flowchart illustrating an operation of a beam delivery device controller 59 according to a second embodiment of the present disclosure. In the second embodiment, the beam size of the Nth pulse laser beam may be measured instead of measuring the beam divergence of the Nth pulse laser beam (S300). In the second embodiment, the beam sizes of the first to Nmaxth pulse laser beams may be measured instead of measuring the beam divergence of the bundled laser beam. The second embodiment may be substantially the same as the first embodiment in the other aspect.

Processes from S100 to S130 shown in FIG. 22 may be substantially the same as the processes from S100 to S130 shown in FIG. 9. After 8130, the beam delivery device controller 59 may proceed to S300a.

At S300a, the beam delivery device controller 59 may measure the beam size of the Nth pulse laser beam. The beam delivery device controller 59 may then control the Nth beam adjuster such that the beam size of the Nth pulse laser beam approaches a desired value. Details of this process will be described below with reference to FIGS. 23 to 25.

The remaining processes from S400 to S610 may be substantially the same as the processes from S400 to S610 shown in FIG. 9. If the value of the counter N reaches Nmax at S600 (S600: YES), the beam delivery device controller 59 may proceed to S700a.

At S700a, the beam delivery device controller 59 may measure the beam parameters of the bundled laser beam. Details of this process will be described below with reference to FIGS. 26 to 28.

The remaining processes from S800 to S820 may be substantially the same as the processes from S800 to S820 shown in FIG. 9.

4.2 Measuring and Controlling Beam Size

Figure 23:
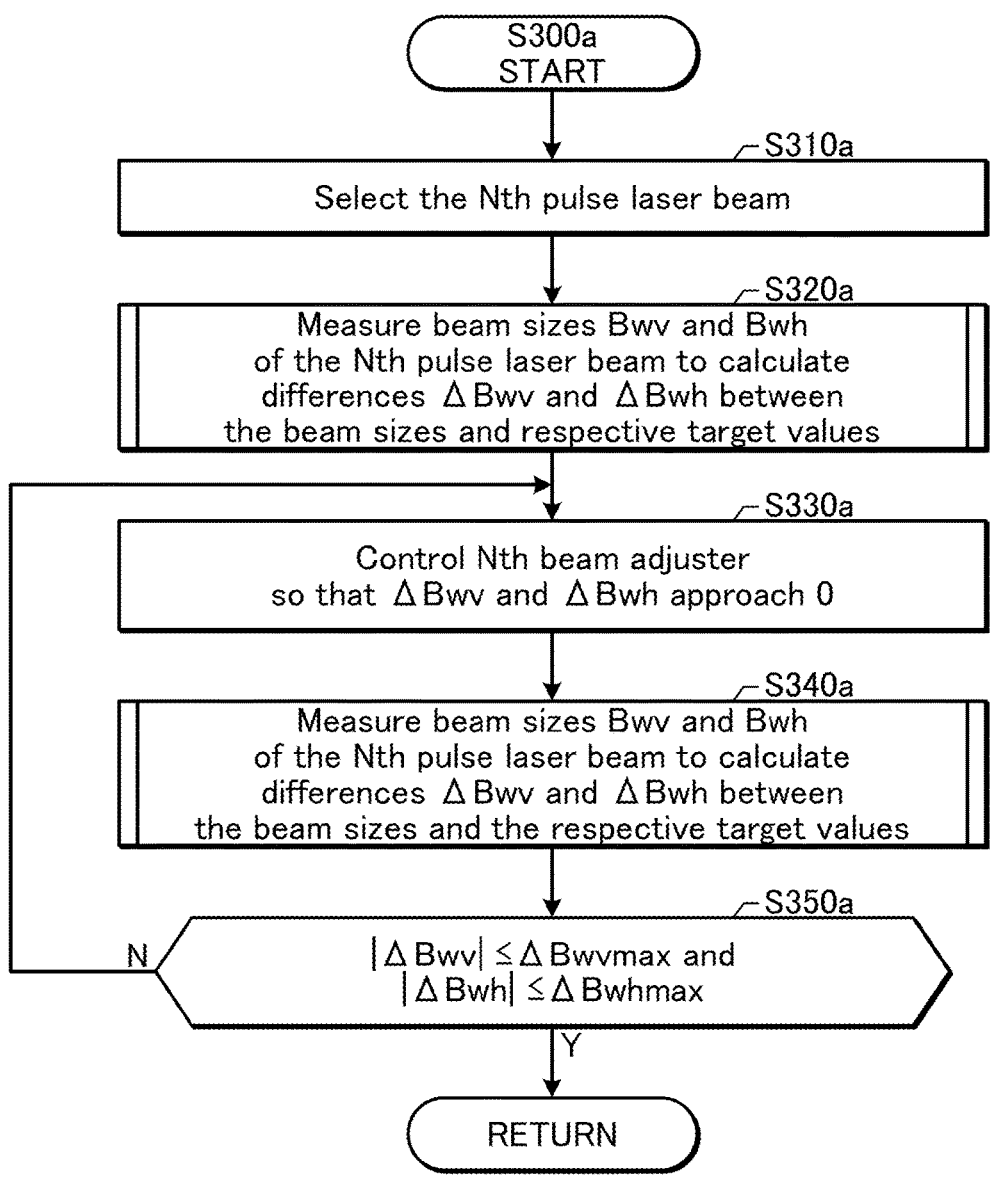
FIG. 23 is a flowchart illustrating detailed processing of measuring and controlling beam sizes of the Nth pulse laser beam shown in FIG. 22.

FIG. 23 is a flowchart illustrating detailed processing of measuring and controlling the beam sizes of the Nth pulse laser beam shown in FIG. 22. The processing shown in FIG. 23 may be performed by the beam delivery device controller 59 as a subroutine of S300a shown in FIG. 22.

As explained below, the processing shown in FIG. 23 may be substantially the same as that in FIG. 10 except that the beam sizes are measured instead of measuring the beam divergences.

First, the process of S310a may be substantially the same as the process of S210 shown in FIG. 10.

Next, at S320a, the beam delivery device controller 59 may measure the beam sizes Bwv and Bwh of the Nth pulse laser beam using data outputted from the beam parameter measuring device 6. The beam delivery device controller 59 may then calculate differences ΔBwv and ΔBwh between the beam sizes Bwv and Bwh and their respective target values. Details of these processes will be described below with reference to FIGS. 24 and 25.

Next, at S330a, the beam delivery device controller 59 may control the Nth beam adjuster such that the differences ΔBwv and ΔBwh between the beam sizes Bwv and Bwh and their respective target values approach 0. The Nth beam divergence adjuster may be controlled as the Nth beam adjuster.

The next process of S340a may be substantially the same as the process of S320a described above.

Next, at S350a, the beam delivery device controller 59 may determine whether absolute values of the respective differences ΔBwv and ΔBwh between the respective beam sizes and their respective target values are equal to or less than their respective predetermined threshold values as follows.

$$|\Delta Bwv| \le \Delta Bwv\text{max}$$

$$|\Delta Bwh| \le \Delta Bwh\text{max}$$

ΔBwvmax may be a threshold value to define the acceptable range of the difference ΔBwv between the beam size and the target value. ΔBwhmax may be a threshold value to define the acceptable range of the difference ΔBwh between the beam size and the target value.

If one of the absolute values of the respective differences ΔBwv and ΔBwh between the respective beam sizes and their respective target values is not equal to or less than the corresponding threshold value (S350a: NO), the beam delivery device controller 59 may return to the above S330a to control the Nth beam adjuster.

If both of the absolute values of the respective differences ΔBwv and ΔBwh between the respective beam sizes and their respective target values are equal to or less than their respective threshold values (S350a: YES), the beam delivery device controller 59 may terminate the processing of this flowchart to proceed to S400 in FIG. 22.

Figure 24:
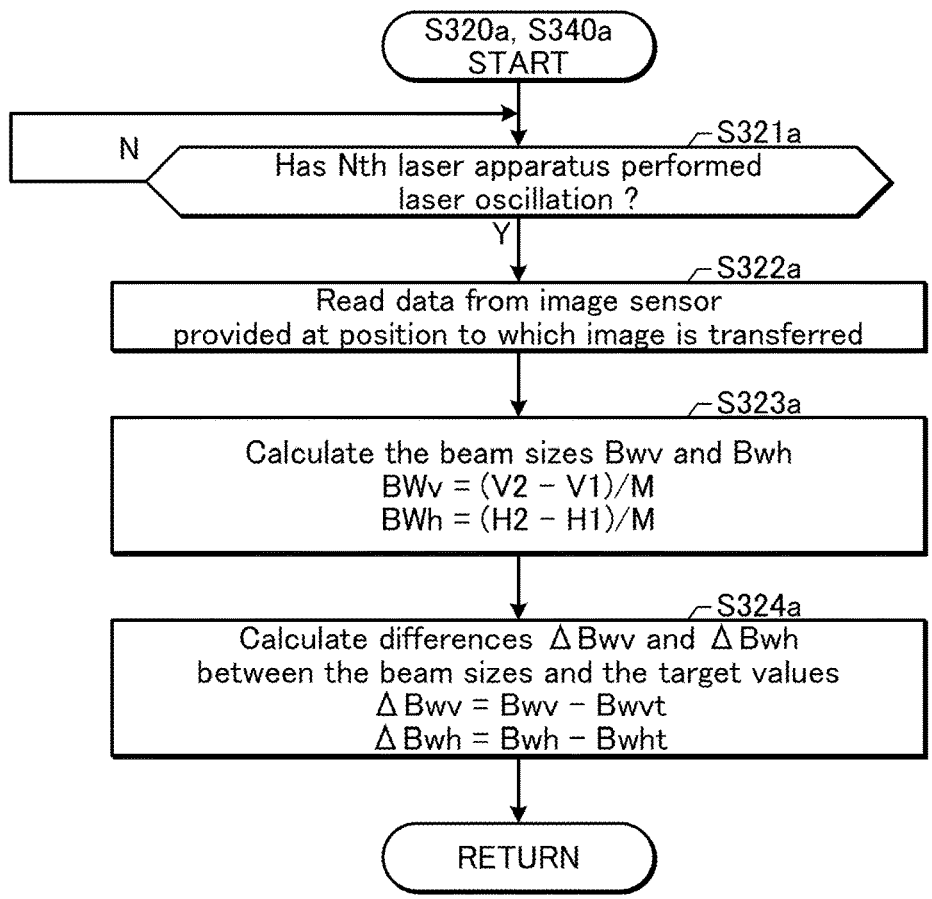
FIG. 24 is a flowchart illustrating detailed processing of measuring the beam sizes and calculating differences between the beam sizes and their target values shown in FIG. 23.

FIG. 24 is a flowchart illustrating detailed processing of measuring the beam sizes and calculating the differences between the beam sizes and their target values shown in FIG. 23. The processing shown in FIG. 24 may be performed by the beam delivery device controller 59 as a subroutine of S320a or S340a shown in FIG. 23.

First, the processes at S321a and S322a may be substantially the same as the processes at S521 and S522 described above with reference to FIG. 17.

Figure 25:
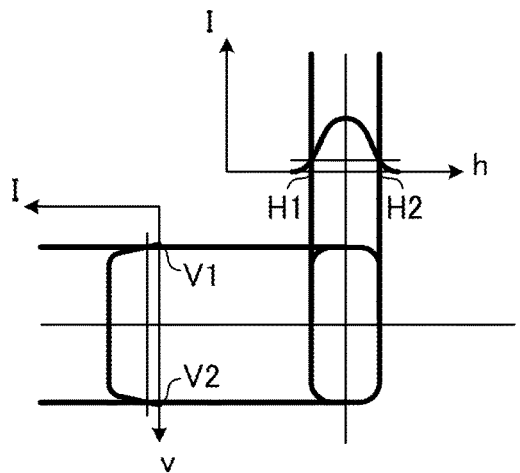
FIG. 25 shows a relationship between the data on the distributions of the light intensity in the cross section of the Nth pulse laser beam and the beam sizes.

FIG. 25 shows a relationship between the data on the distributions of the light intensity in the cross section of the Nth pulse laser beam and the beam sizes. Each of the beam sizes of the Nth pulse laser beam may be a width of a portion having light intensity corresponding to a predetermined ratio or more of the peak intensity. The predetermined ratio may be any one of $1/e^2$, 50%, and 5%. The beam sizes of the Nth pulse laser beam may include a beam size in the V direction and a beam size in the H direction. The beam size in the V direction may be a distance between the first position V1 where the light intensity is the threshold value and the second position V2 where the light intensity is the same threshold value. The beam size in the H direction may be a distance between the first position H1 where the light intensity is the threshold value and the second position H2 where the light intensity is the same threshold value. The light intensities in these positions V1, V2, H1, and H2 may correspond to the predetermined ratio of the peak intensity.

Referring back to FIG. 24, at S323a, the beam delivery device controller 59 may calculate the beam size Bwv in the V direction and the beam size Bwh in the H direction by the following formula.

$$Bwv=(V2-V1)/M$$

$$Bwh=(H2-H1)/M$$

Here, M may be magnification of the transfer optics 65. The beam size may be calculated by dividing the beam width of the light received on the image sensor 66 by the magnification of the transfer optics 65.

Next, at S324a, the beam delivery device controller 59 may calculate differences ΔBwv and ΔBwh between the beam sizes Bwv and Bwh and their respective target values as follows.

$$\Delta Bwv=Bwv-Bwvt$$

$$\Delta Bwh=Bwh-Bwht$$

Bwvt and Bwht may be the respective target values of the beam sizes in the V direction and the H direction.

4.3 Measuring Bundled Laser Beam

Figure 26:
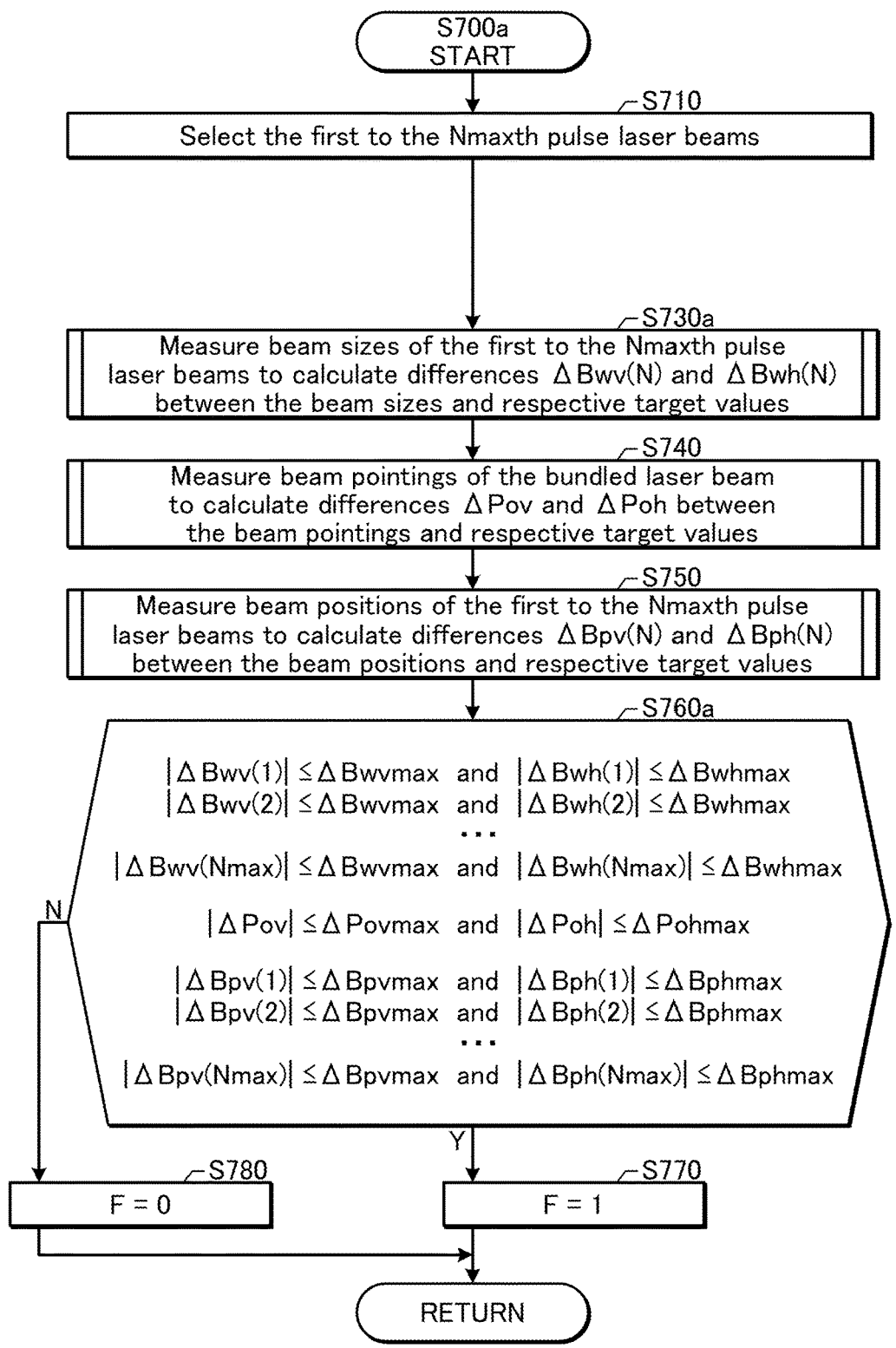
FIG. 26 is a flowchart illustrating detailed processing of measuring the beam parameters of the bundled laser beam shown in FIG. 22.

FIG. 26 is a flowchart illustrating detailed processing of measuring the beam parameters of the bundled laser beam shown in FIG. 22. The processing shown in FIG. 26 may be performed by the beam delivery device controller 59 as a subroutine of S700a shown in FIG. 22.

As explained below, the processing shown in FIG. 26 may be substantially the same as that in FIG. 19 except that the beam sizes are measured instead of measuring the beam divergence.

First, the process of S710 may be substantially the same as the process of S710 in FIG. 19.

Next, at S730a, the beam delivery device controller 59 may measure beam sizes Bwv(N) and Bwh(N) of each of the first to Nmaxth pulse laser beams. Bwv(N) may represent each of Bwv(1), Bwv(2), . . . , and Bwv(Nmax). Bwh(N) may represent each of Bwh(1), Bwh(2), . . . , and Bwh (Nmax). The beam delivery device controller 59 may then calculate differences ΔBwv(N) and ΔBwh(N) between the beam sizes Bwv(N) and Bwh(N) and their respective target values. ΔBwv(N) may represent each of ΔBwv(1), ΔBwv(2), . . . , and ΔBwv(Nmax). ΔBwh(N) may represent each of ΔBwh(1), ΔBwh(2), . . . , and ΔBwh(Nmax). Details of these processes will be described below with reference to FIGS. 27 and 28.

The next processes at S740 and S750 may be substantially the same as the processes at S740 and S750 shown in FIG. 19.

Next, at S760a, the beam delivery device controller 59 may determine whether absolute values of the respective differences between the respective measured beam parameters and their respective target values are equal to or less than their respective predetermined threshold values as follows.

$$|\Delta Bwv(1)| \leq \Delta Bwvmax$$

$$|\Delta Bwh(1)| \leq \Delta Bwhmax$$

$$|\Delta Bwv(2)| \leq \Delta Bwvmax$$

$$|\Delta Bwh(2)| \leq \Delta Bwhmax$$

$$\ldots$$

$$|\Delta Bwv(Nmax)| \leq \Delta Bwvmax$$

$$|\Delta Bwh(Nmax)| \leq \Delta Bwhvmax$$

$$|\Delta Pov| \leq \Delta Povmax$$

$$|\Delta Poh| \leq \Delta Pohmax$$

$$|\Delta Bpv(1)| \leq \Delta Bpvmax$$

$$|\Delta Bph(1)| \leq \Delta Bphmax$$

$$|\Delta Bpv(2)| \leq \Delta Bpvmax$$

$$|\Delta Bph(2)| \leq \Delta Bphmax$$

$$\ldots$$

$$|\Delta Bpv(Nmax)| \leq \Delta Bpvmax$$

$$|\Delta Bph(Nmax)| \leq \Delta Bphmax$$

If one of the absolute values of the respective differences between the respective measured beam parameters and their respective target values is not equal to or less than the corresponding threshold value (S760a: NO), the beam delivery device controller 59 may set, at S780, a flag F showing a determination result to 0 and then terminate the processing of this flowchart.

If all of the absolute values of the respective differences between the respective measured beam parameters and their respective target values are equal to or less than their respective threshold values (S760a: YES), the beam delivery device controller 59 may set, at S770, the flag F showing the determination result to 1 and then terminate the processing of this flowchart. After terminating the processing of this flowchart, the beam delivery device controller 59 may proceed to S800 in FIG. 22.

Figure 27:
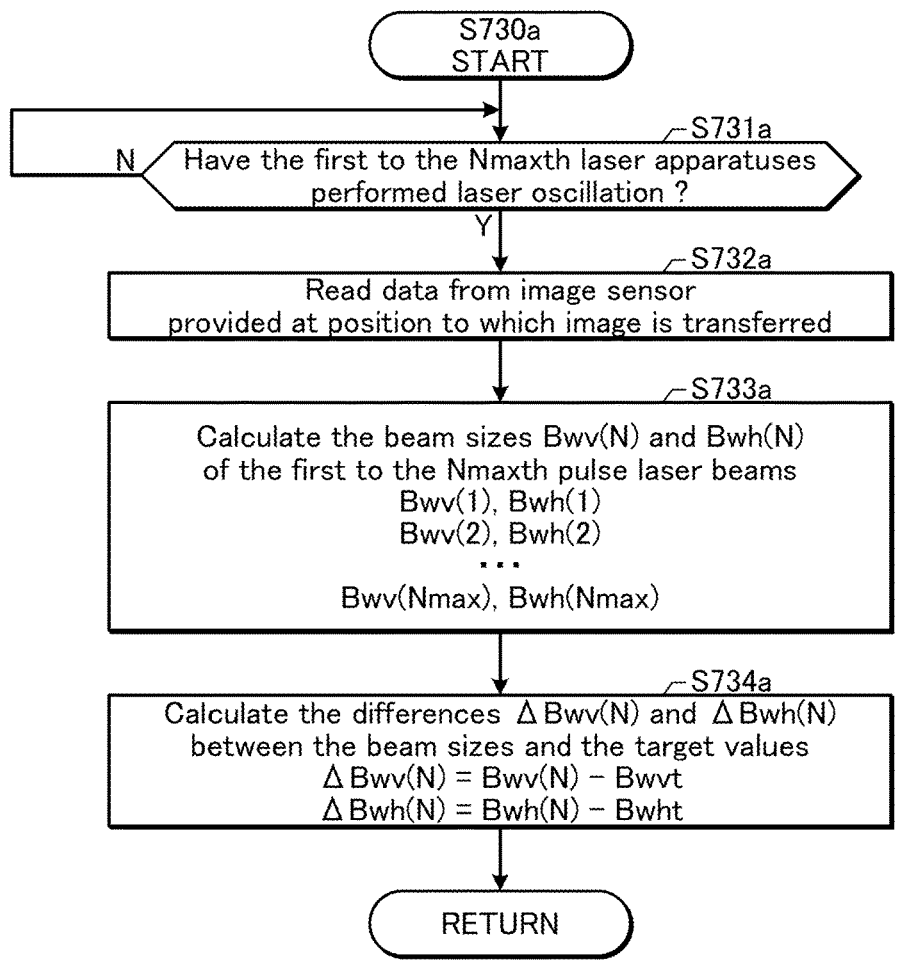
FIG. 27 is a flowchart illustrating detailed processing of measuring beam sizes of the first to Nmaxth pulse laser beams and calculating differences between the beam sizes and their respective target values shown in FIG. 26.

FIG. 27 is a flowchart illustrating detailed processing of measuring the beam sizes of the first to Nmaxth pulse laser beams and calculating differences between the beam sizes and their respective target values shown in FIG. 26. The processing shown in FIG. 27 may be performed by the beam delivery device controller 59 as a subroutine of S730a shown in FIG. 26.

First, the processes at S731a and S732a may be substantially the same as the processes at S751 and S752 described above with reference to FIG. 20.

Figure 28:
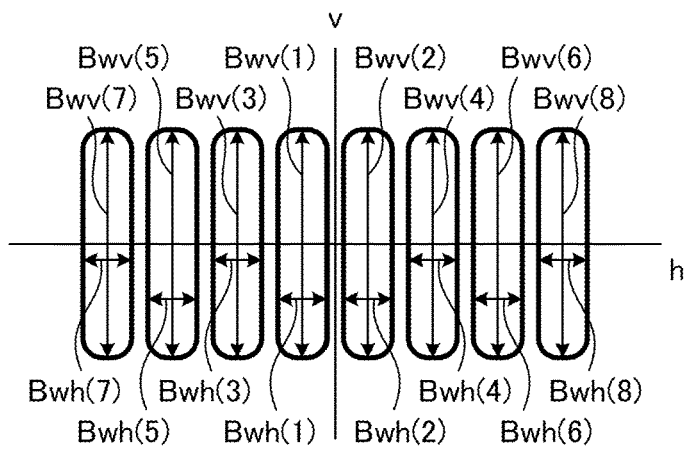
FIG. 28 shows a relationship between the data on the distributions of the light intensity in the cross sections of the first to Nmaxth pulse laser beams and the beam sizes of the first to Nmaxth pulse laser beams.

FIG. 28 shows a relationship between the data on the distributions of the light intensity in the cross sections of the first to Nmaxth pulse laser beams and the beam sizes of the first to Nmaxth pulse laser beams. The beam size of each of the first to Nmaxth pulse laser beams may be a width of a portion having light intensity corresponding to a predetermined ratio or more of the peak intensity of each of the pulse laser beams. The predetermined ratio may be any one of $1/e^2$, 50%, and 5%.

Referring back to FIG. 27, at S733a, the beam delivery device controller 59 may calculate the beam sizes Bwv(N) and Bwh(N) of each of the first to Namxth pulse laser beams. Bwv(N) may represent each of Bwv(1), Bwv(2), . . . , and Bwv(Nmax). Bwh(N) may represent each of Bwh(1), Bwh (2), . . . , and Bwh(Nmax).

Next, at S734a, the beam delivery device controller 59 may calculate differences ΔBwv(N) and ΔBwh(N) between the beam sizes of the respective Nth pulse laser beams included in the first to Nmaxth pulse laser beams and their respective target values as follows.

$$\Delta Bwv(N)=Bwv(N)-Bwvt$$

$$\Delta Bwh(N)=Bwh(N)-Bwht$$

Bwvt may be a target value of each of the beam sizes of the first to Nmaxth pulse laser beams in the V direction. Bwht may be a target value of each of the beam sizes of the first to Nmaxth pulse laser beams in the H direction.

5. Third Embodiment

5.1 Laser System Controller and Beam Delivery Device Controller

Figure 29:
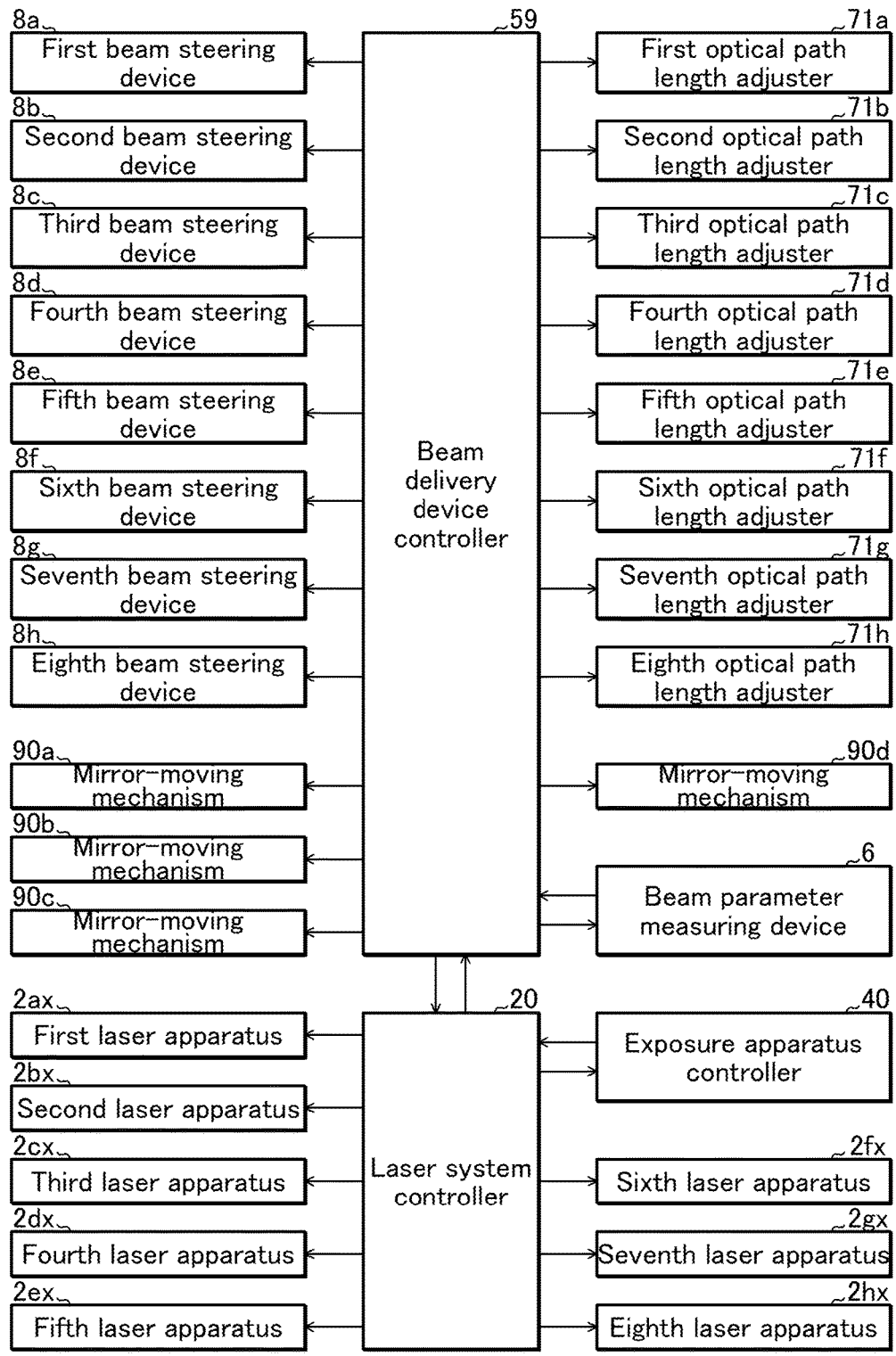
FIG. 29 is a block diagram of a laser system controller 20, a beam delivery device controller 59, and their peripheries according to a third embodiment of the present disclosure.

FIG. 29 is a block diagram of the laser system controller 20, the beam delivery device controller 59, and their peripheries according to a third embodiment of the present disclosure. In the third embodiment, the first to eighth beam adjusters 7a to 7h may include the first to eighth optical path length adjusters 71a to 71h, respectively, instead of the beam divergence adjusters 72a to 72h, respectively. As described below with reference to FIG. 31, first to eighth laser apparatuses 2ax to 2hx may include respective beam divergence adjusters 14x. The configuration of the third embodiment may be substantially the same as that of the first embodiment.

The beam delivery device controller 59 may control the first to eighth optical path length adjusters 71a to 71h based on data such as target values of the beam parameters received from the laser system controller 20. The first to eighth optical path length adjusters 71a to 71h may change optical path lengths of the first to eighth pulse laser beams 21a to 21h, respectively, under control by the beam delivery device controller 59.

The laser system controller 20 may control the beam divergence adjuster 14x included in each of the first to eighth laser apparatuses 2ax to 2hx based on measured data received from the beam delivery device controller 59. The corresponding beam divergence adjuster 14x may change the beam divergence of the first to eighth pulse laser beams 21a to 21h under control by the laser system controller 20.

5.2 Optical Path Length Adjuster

Figure 30:
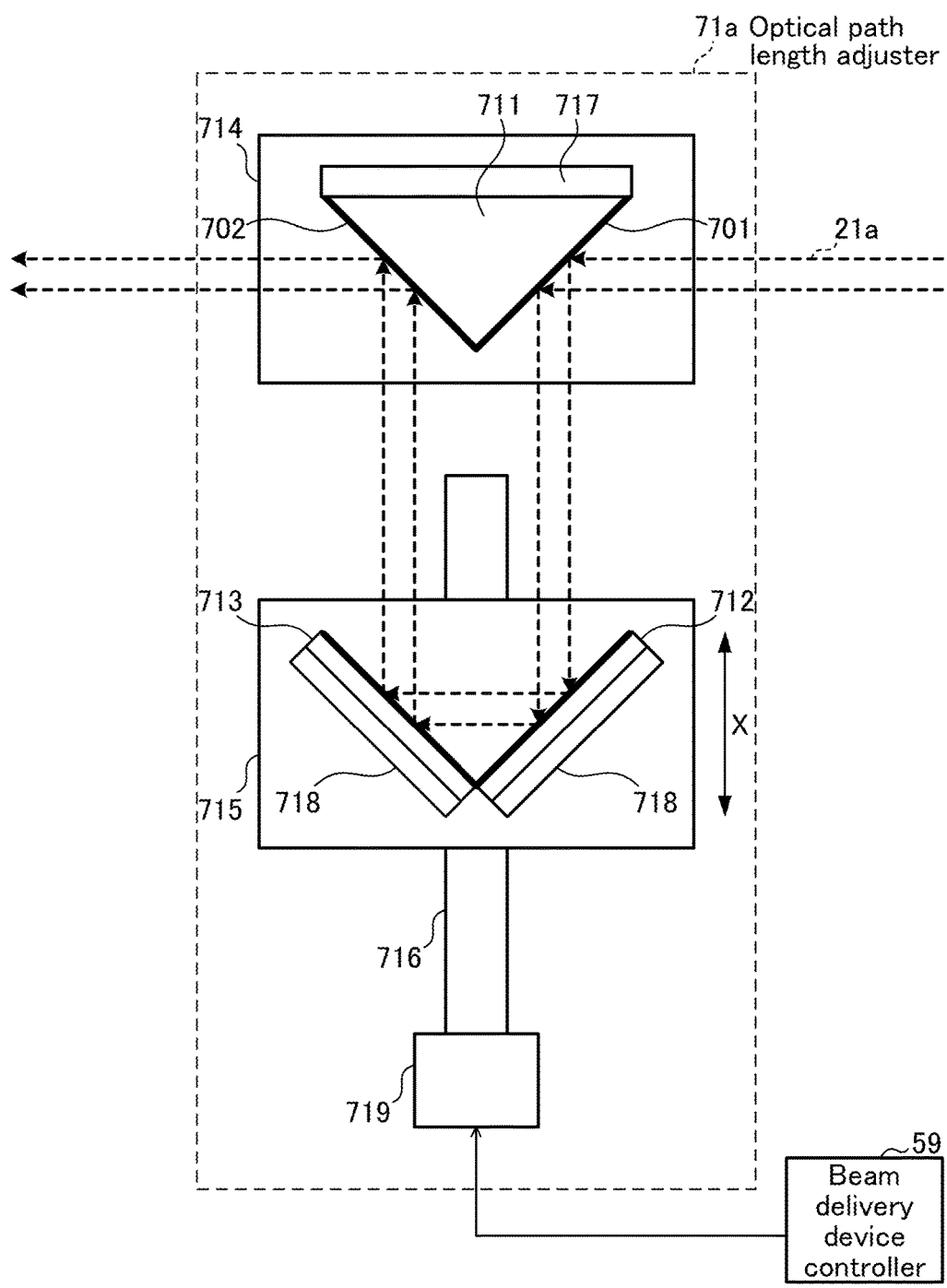
FIG. 30 schematically shows a configuration of an optical path length adjuster.

FIG. 30 schematically shows a configuration of an optical path length adjuster. The first optical path length adjuster 71a may make for example the first pulse laser beam 21a detour to change the optical path length of the first pulse laser beam 21a.

The first optical path length adjuster 71a may include a right-angle prism 711, two high-reflective mirrors 712 and 713, plates 714 and 715, and a uniaxial stage 716.

The second to eighth optical path length adjusters 71b to 71h may have substantially the same configuration as that of the first optical path length adjuster 71a. The first to eighth optical path length adjusters 71a to 71h may control the respective optical path lengths from the corresponding laser apparatus to the emitting position of the laser system 5 to be substantially the same with each other.

The right-angle prism 711 may have a first surface 701 and a second surface 702 perpendicular to each other, each of which may be coated with a high-reflective film. The right-angle prism 711 may be held by a holder 717. The holder 717 may be fixed to the plate 714. The right-angle prism 711 may be provided in the optical path of the first pulse laser beam 21a.

The two high-reflective mirrors 712 and 713 may be held by a holder 718 such that their reflective surfaces are perpendicular to each other. The holder 718 may be fixed to the plate 715. The plate 715 may be fixed to the uniaxial stage 716. The uniaxial stage 716 may be configured to move the two high-reflective mirrors 712 and 713 in a direction substantially parallel to the optical path axis of the first pulse laser beam 21a reflected by the first surface 701 of the right-angle prism 711.

The first pulse laser beam 21a reflected by the first surface 701 of the right-angle prism 711 may be reflected by the two high-reflective mirrors 712 and 713. The first pulse laser beam 21a is then made incident on the second surface 702 of the right-angle prism 711. The first pulse laser beam 21a incident on the second surface 702 of the right-angle prism 711 may emit from the second surface 702 of the right-angle prism 711 along an extension line of the optical path axis of the first pulse laser beam 21a incident on the first surface 701 of the right-angle prism 711.

The beam delivery device controller 59 may drive a motor 719 of the uniaxial stage 716 to move the two high-reflective mirrors 712 and 713. Moving the two high-reflective mirrors 712 and 713 by a distance X may cause the optical path length of the first pulse laser beam 21a to be changed by 2X. Changing the optical path length may cause the beam size of the first pulse laser beam 21a to be changed.

5.3 Laser Apparatus

Figure 31:
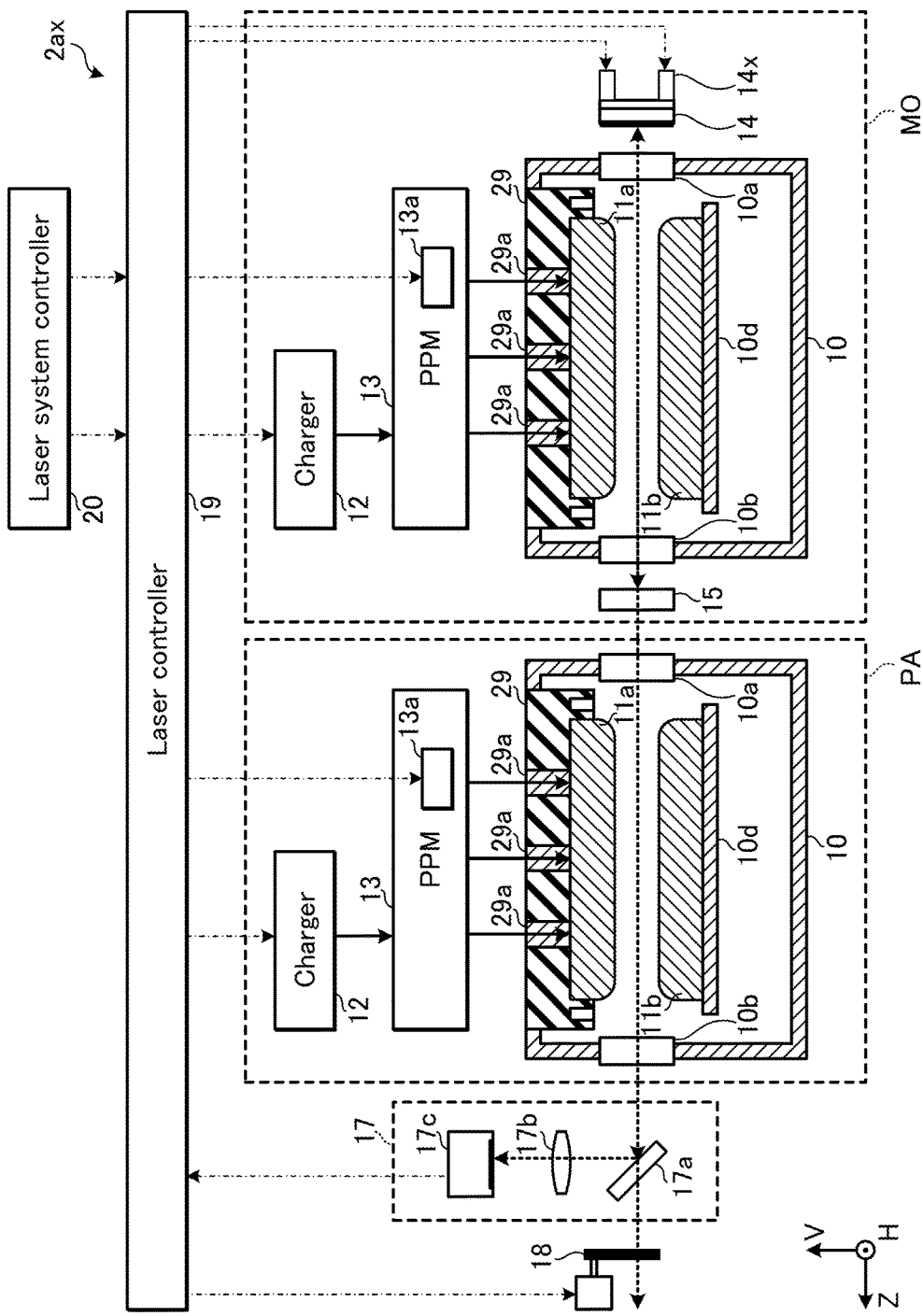
FIG. 31 shows an exemplary configuration of a laser apparatus shown in FIG. 29.

FIG. 31 shows an exemplary configuration of the laser apparatus shown in FIG. 29. For example, the first laser apparatus 2ax may include the beam divergence adjuster 14x having an actuator capable of changing a posture angle of the high-reflective mirror 14. The beam divergence adjuster 14x may change the posture angle of the high-reflective mirror 14 in the V direction and the H direction.

Beam divergence of the pulse laser beam may fluctuate, for example, by shifting alignment of the master oscillator MO. In that case, stability of the beam divergence may be improved by adjusting the posture angle of the high-reflective mirror 14 by the beam divergence adjuster 14x.

The other configurations may be substantially the same as those of the laser apparatus described above with reference to FIG. 8. The second to eighth laser apparatuses 2bx to 2hx may also be substantially the same.

5.4 Main Flow

Figure 32:
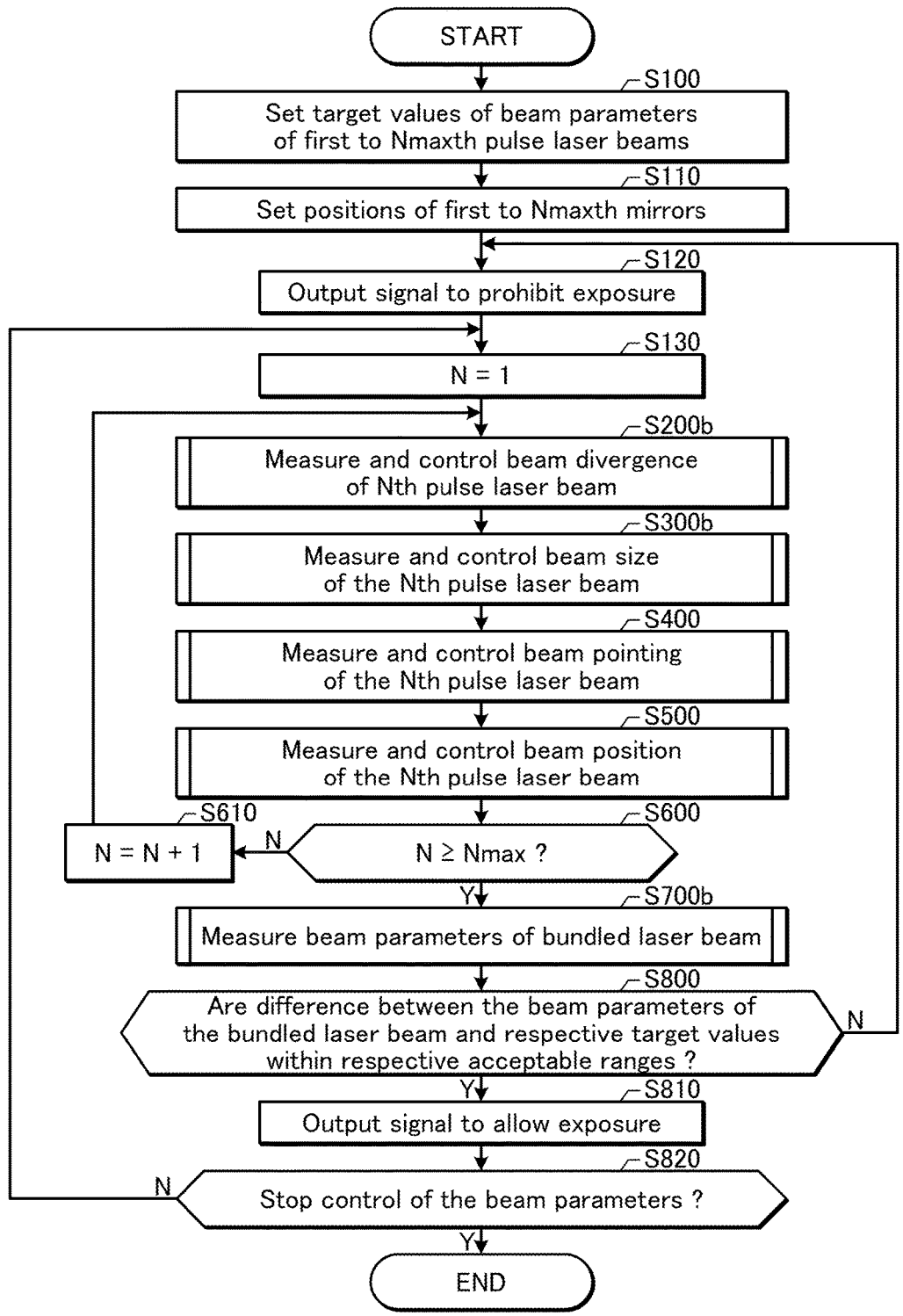
FIG. 32 is a flowchart illustrating an operation of the beam delivery device controller 59 according to the third embodiment of the present disclosure.

FIG. 32 is a flowchart illustrating an operation of the beam delivery device controller 59 according to the third embodiment of the present disclosure. In the third embodiment, both beam divergence of the Nth pulse laser beam and the beam size of the Nth pulse laser beam may be measured (S200b, S300b). In the third embodiment, both the beam divergence of the bundled laser beam and the beam sizes of the first to Nmaxth pulse laser beams may be measured. The operation of the third embodiment may be substantially the same as that in the first embodiment.

Processes from S100 to S130 in FIG. 32 may be substantially the same as the processes from S100 to S130 in FIG. 9.

At S200b, the beam delivery device controller 59 may measure the beam divergence of the Nth pulse laser beam. The beam delivery device controller 59 may control the beam divergence adjuster 14*x* included in the Nth pulse laser apparatus such that the beam divergence of the Nth pulse laser beam approaches a desired value. This process may be substantially the same as the corresponding process in the first embodiment described above with reference to FIGS. 10 to 12 except that the beam divergence adjuster 14*x* in the Nth laser apparatus is controlled. The control of the beam divergence adjuster 14*x* may be performed by the laser system controller 20.

At S300*b*, the beam delivery device controller 59 may measure the beam size of the Nth pulse laser beam. The beam delivery device controller 59 may control the Nth optical path length adjuster such that the beam size of the Nth pulse laser beam approaches a desired value. This process may be substantially the same as the corresponding process in the second embodiment described above with reference to FIGS. 23 to 25, except that the optical path length adjuster is controlled. However, the optical path length adjuster may fail to change the beam size in the V direction and the beam size in the H direction independently from each other.

The next processes from S400 to S610 may be substantially the same as the processes from S400 to S610 in FIG. 9. If the value of the counter N reaches Nmax at S600 (S600: YES), the beam delivery device controller 59 may proceed to S700*b*.

At S700*b*, the beam delivery device controller 59 may measure the beam parameters of the bundled laser beam. Details of this process will be described below with reference to FIG. 33.

The remaining processes from S800 to S820 may be substantially the same as the processes from S800 to S820 shown in FIG. 9.

5.5 Measuring Bundled Laser Beam

Figure 33:
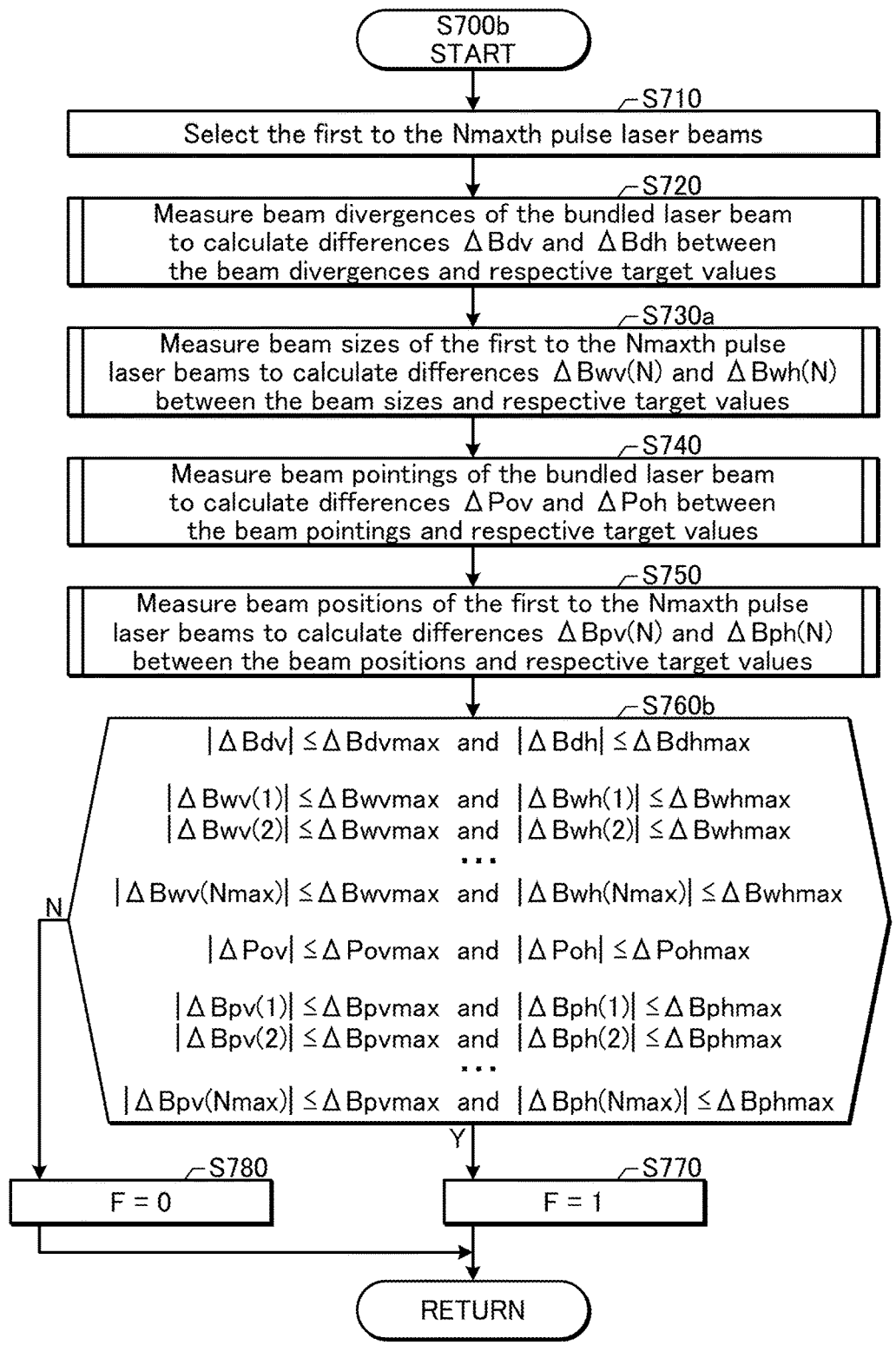
FIG. 33 is a flowchart illustrating detailed processing of measuring the beam parameters of the bundled laser beam shown in FIG. 32.

FIG. 33 is a flowchart illustrating detailed processing of measuring the beam parameters of the bundled laser beam shown in FIG. 32. The processing shown in FIG. 33 may be performed by the beam delivery device controller 59 as a subroutine of S700*b* shown in FIG. 32.

As described below, the processing shown in FIG. 33 may be substantially the same as that in FIG. 19 except that both the beam divergence and the beam size may be measured.

First, the process of S710 may be substantially the same as the process of S710 shown in FIG. 19.

Next, at S720, the beam delivery device controller 59 may measure the beam divergences Bdv and Bdh of the bundled laser beam. The beam delivery device controller 59 may calculate differences ΔBdv and ΔBdh between the beam divergences Bdv and Bdh and their respective target values. This process may be substantially the same as the process of S720 shown in FIG. 19.

Next, at S730*a*, the beam delivery device controller 59 may measure the beam sizes Bwv(N) and Bwh(N) of each of the first to Nmaxth pulse laser beams. The beam delivery device controller 59 may then calculate differences ΔBwv(N) and ΔBwh(N) between the beam sizes Bwv(N) and Bwh(N) and their respective target values. This process may be substantially the same as the process of S730*a* shown in FIG. 26.

The next processes at S740 and S750 may be substantially the same as the processes at S740 and S750 shown in FIG. 19.

Next, at S760*b*, the beam delivery device controller 59 may determine whether absolute values of the respective differences between the respective measured beam parameters and their respective target values are equal to or less than their respective predetermined threshold values as follows.

$$|\Delta Bdv| \le \Delta Bdvmax$$

$$|\Delta Bdh| \le \Delta Bdhmax$$

$$|\Delta Bwv(1)| \le \Delta Bwvmax$$

$$|\Delta Bwh(1)| \le \Delta Bwhmax$$

$$|\Delta Bwv(2)| \le \Delta Bwvmax$$

$$|\Delta Bwh(2)| \le \Delta Bwhmax$$

...

$$|\Delta Bwv(Nmax)| \le \Delta Bwvmax$$

$$|\Delta Bwh(Nmax)| \le \Delta Bwhvmax$$

$$|\Delta Pov| \le \Delta Povmax$$

$$|\Delta Poh| \le \Delta Pohmax$$

$$|\Delta Bpv(1)| \le \Delta Bpvmax$$

$$|\Delta Bph(1)| \le \Delta Bphmax$$

$$|\Delta Bpv(2)| \le \Delta Bpvmax$$

$$|\Delta Bph(2)| \le \Delta Bphmax$$

...

$$|\Delta Bpv(Nmax)| \le \Delta Bpvmax$$

$$|\Delta Bph(Nmax)| \le \Delta Bphmax$$

If one of the absolute values of the respective differences between the respective measured beam parameters and their respective target values is not equal to or less than the corresponding threshold value (S760*b*: NO), the beam delivery device controller 59 may set, at S780, a flag F showing a determination result to 0 and then terminate the processing of this flowchart.

If all of the absolute values of the respective differences between the respective measured beam parameters and their respective target values are equal to or less than their respective threshold values (S760*b*: YES), the beam delivery device controller 59 may set, at S770, the flag F showing the determination result to 1 and then terminate the processing of this flowchart. After terminating the processing of this flowchart, the beam delivery device controller 59 may proceed to S800 in FIG. 32.

According to the third embodiment, each of the master oscillators of the first to eighth laser apparatuses 2*ax* to 2*hx* may include the beam divergence adjuster 14*x*. This may enable to further stabilize the beam parameters.

In the third embodiment, the process of measuring and controlling of the beam size of the Nth pulse laser beam (S300*b*) does not have to be performed. In other words, the optical path length adjuster does not have to be controlled.

6. Fourth Embodiment

Figure 34A:
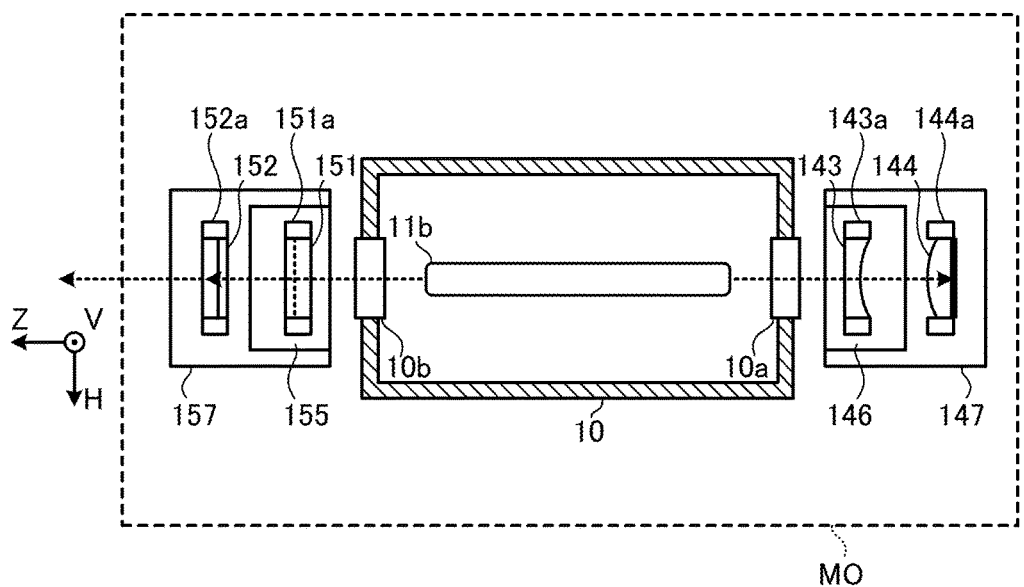
FIGS. 34A and 34B show an exemplary configuration of a master oscillator used in a fourth embodiment of the present disclosure.
Figure 34B:
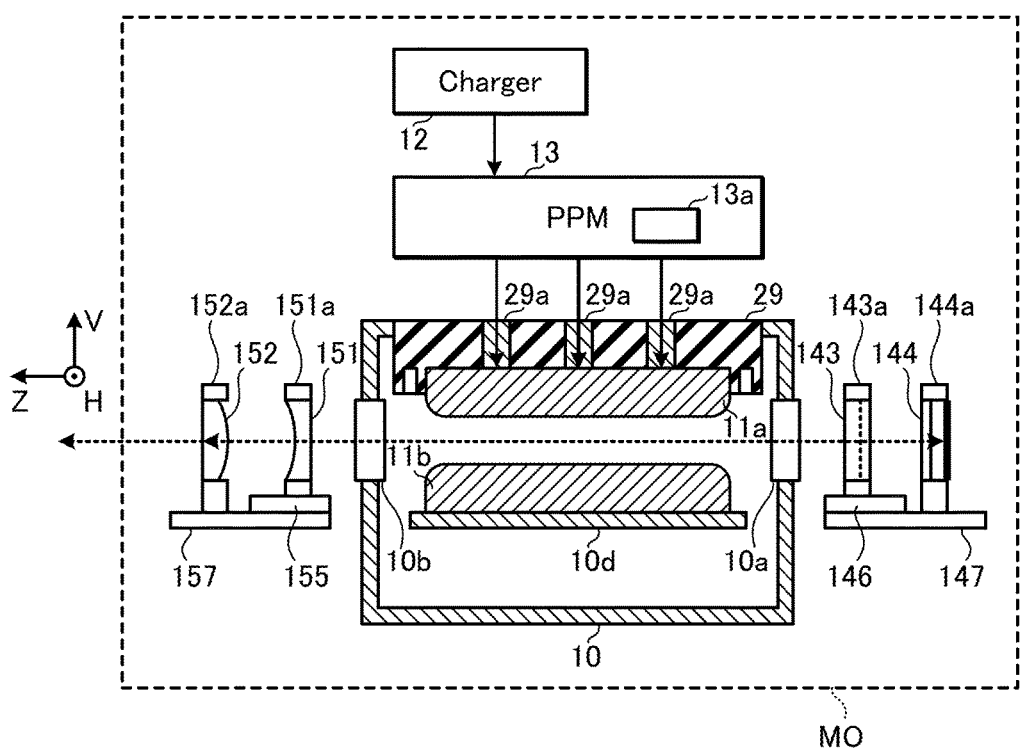

FIGS. 34A and 34B show an exemplary configuration of a master oscillator used in a fourth embodiment of the present disclosure. FIG. 34A is a cross sectional view from the V direction, and FIG. 34B is a cross sectional view from the H direction. In the fourth embodiment, the master oscillator MO in each laser apparatus may include a beam divergence adjuster. The beam divergence adjuster in the master oscillator MO may include a first cylindrical concave lens 151, a first cylindrical convex lens 152, a second cylindrical concave lens 143, and a second cylindrical convex lens 144.

Each of the first cylindrical convex lens 152 and the second cylindrical convex lens 144 may be a plano-convex lens. The first cylindrical convex lens 152 and the second cylindrical convex lens 144 may be arranged such that the convex surfaces may face each other, and the flat surfaces may face opposite directions. The first cylindrical concave lens 151 and the second cylindrical concave lens 143 may be arranged between the first cylindrical convex lens 152 and the second cylindrical convex lens 144. The laser chamber 10 may be arranged between the first cylindrical concave lens 151 and the second cylindrical concave lens 143.

The first cylindrical concave lens 151 may be held by a holder 151a to a uniaxial stage 155. The first cylindrical convex lens 152 may be held by a holder 152a to the plate 157. The second cylindrical concave lens 143 may be held by a holder 143a to a uniaxial stage 146. The second cylindrical convex lens 144 may be held by a holder 144a to the plate 147.

The flat surface of the first cylindrical convex lens 152 may be coated with a partially-reflective film to transmit a part of the pulse laser beam and reflect another part. The flat surface of the second cylindrical convex lens 144 may be coated with a high-reflective film to reflect the pulse laser beam at high reflectance. The convex surface of the first cylindrical convex lens, the convex surface of the second cylindrical convex lens 144, both surfaces of the first cylindrical concave lens 151, and both surfaces of the second cylindrical concave lens 143 may be coated with an anti-reflective film to suppress reflecting the pulse laser beam.

The concave surface of the first cylindrical concave lens 151 and the convex surface of the first cylindrical convex lens 152 may be cylindrical surfaces each having a central axis substantially parallel to the H direction. The first cylindrical concave lens 151 and the first cylindrical convex lens 152 may thus expand or reduce the beam width in the V direction.

The uniaxial stage 155 may move the first cylindrical concave lens 151 along the optical path axis of the pulse laser beam to change the wavefront of the pulse laser beam in the V direction. Changing the wavefront of the pulse laser beam in the V direction may cause the beam divergence of the pulse laser beam to be changed in the V direction.

The concave surface of the second cylindrical concave lens 143 and the convex surface of the second cylindrical convex lens 144 may be cylindrical surfaces each having a central axis substantially parallel to the V direction. The second cylindrical concave lens 143 and the second cylindrical convex lens 144 may thus expand or reduce the beam width in the H direction.

The uniaxial stage 146 may move the second cylindrical concave lens 143 along the optical path axis of the pulse laser beam to change the wavefront of the pulse laser beam in the H direction. Changing the wavefront of the pulse laser beam in the H direction may cause the beam divergence of the pulse laser beam to be changed in the H direction.

According to the beam divergence adjuster, the beam divergence in the V direction and the beam divergence in the H direction are independently controlled.

In FIGS. 34A and 34B, the flat surface of the first cylindrical convex lens 152 is coated with the partially-reflective film. However, a partially-reflective mirror (not shown) and a first cylindrical convex lens in which both surfaces are coated with anti-reflective films (not shown) may be separately provided.

In the fourth embodiment, the flat surface of the second cylindrical convex lens 144 is coated with the high-reflective film. However, a high-reflective mirror (not shown) and a second cylindrical convex lens in which both surfaces are coated with anti-reflective films (not shown) may be separately provided.

In FIGS. 34A and 34B, the beam divergence may be changed in both the H direction and the V direction. However, the beam divergence may be changed in either one of the H direction and the V direction. For example, a stricter target value may be required for the beam divergence in the V direction than for the beam divergence in the H direction. In that case, only the second cylindrical concave lens 143 or the second cylindrical convex lens 144 may be made movable.

In FIGS. 34A and 34B, the beam divergence of the pulse laser beam may be changed by the combination of the convex cylindrical lens and the concave cylindrical lens. However, the present disclosure is not limited to this. For example, the beam divergence of the pulse laser beam may be changed by a combination of two convex cylindrical lenses. Further, the high-reflective mirror 14 in FIG. 8 may be substituted by a linear deformable mirror. The beam divergence of the pulse laser beam may be changed by changing the reflective surface of the linear deformable mirror to a cylindrical shape.

In other aspects, the fourth embodiment may be substantially the same as the third embodiment.

According to the fourth embodiment, the master oscillator in each of the first to eighth laser apparatuses 2ax to 2hx may include the beam divergence adjuster. This may enable to further stabilize the beam parameters.

7. Fifth Embodiment

Figure 35:
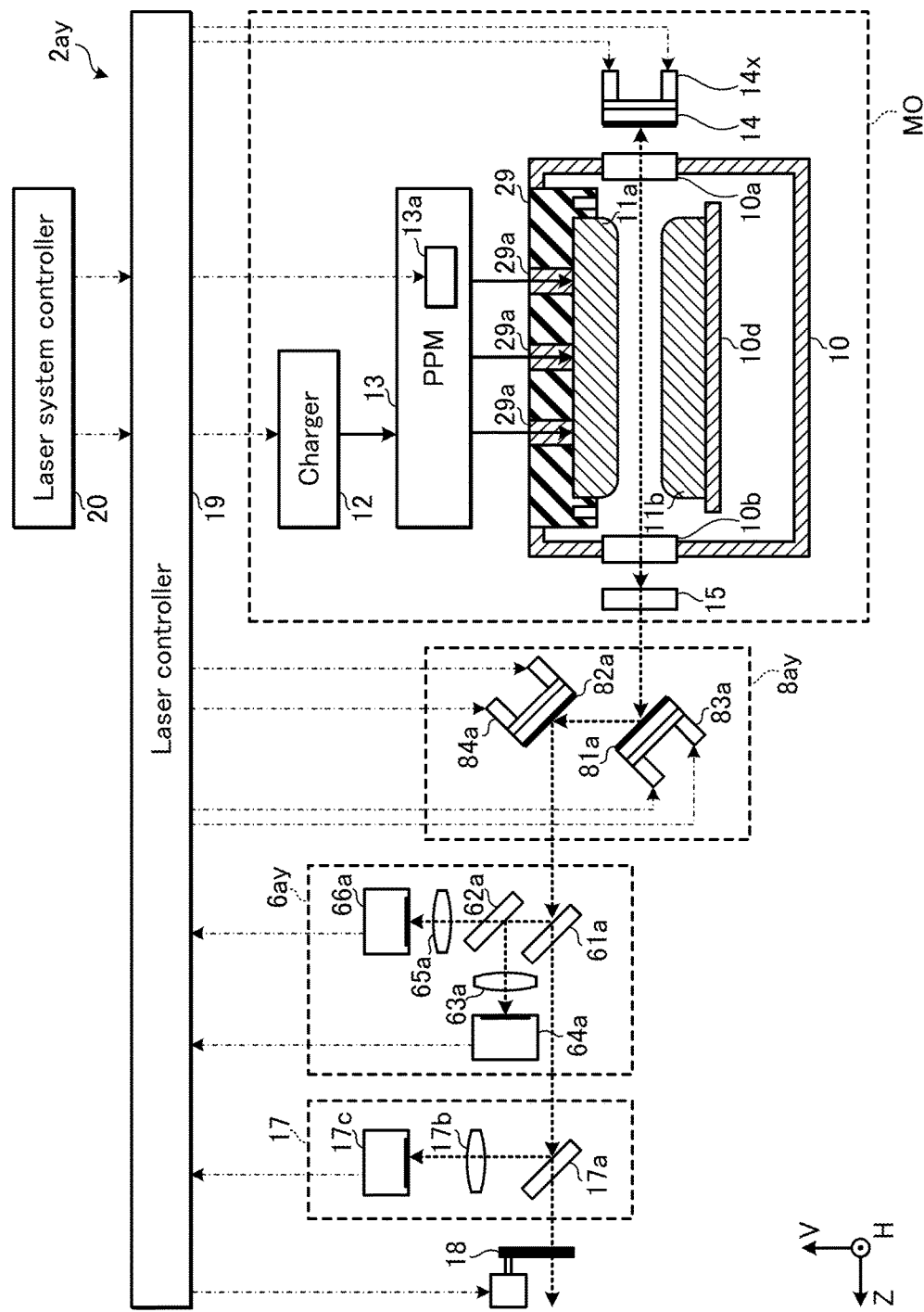
FIG. 35 shows an exemplary configuration of a laser apparatus used in a fifth embodiment of the present disclosure.

FIG. 35 shows an exemplary configuration of a laser apparatus used in a fifth embodiment of the present disclosure. In the fifth embodiment, a first laser apparatus 2ay may include a beam parameter measuring device 6ay. Further, a beam steering device 8ay may be provided between the master oscillator MO and the beam parameter measuring device 6ay. The master oscillator MO may include the beam divergence adjuster 14x.

The power amplifier PA is omitted in FIG. 35. The power amplifier PA may be provided, or does not have to be provided, between the master oscillator MD and the beam steering device 8ay. In other aspects, the configuration of the laser apparatus may be substantially the same as that in FIG. 8. The configuration of each of the second to eighth laser apparatuses may be substantially the same as that of the first laser apparatus 2ay.

The beam parameter measuring device 6ay may include beam splitters 61a and 62a, focusing optics 63a, an image sensor 64a, transfer optics 65a, and an image sensor 66a.

The beam parameter measuring device 6ay does not have to include the beam selecting mechanism. The beam parameter measuring device 6ay may be provided not in the optical path of the bundled laser beam but in the optical path of the pulse laser beam emitted from the beam steering device Say of the first laser apparatus 2ay. The other configuration of the beam parameter measuring device 6ay may be substantially the same as that of the beam parameter measuring device 6 described above with reference to FIG. 4.

The beam steering device 8ay may include a first high-reflective mirror 81a, a second high-reflective mirror 82a, and actuators 83a and 84a.

The first high-reflective mirror 81a may be provided in the optical path of the pulse laser beam emitted from the master oscillator MO of the first laser apparatus 2ay. The actuator 83a may change the posture of the first high-reflective mirror 81a according to a driving signal outputted by the laser system controller 20. The first high-reflective mirror 81a may reflect the pulse laser beam to a direction according to the posture adjusted by the actuator 83a. The actuator 83a may change the posture angle of the high-reflective mirror 81a, for example, in two directions perpendicular to each other.

The second high-reflective mirror 82a may be provided in the optical path of the pulse laser beam reflected by the first high-reflective mirror 81a. The actuator 84a may change the posture of the second high-reflective mirror 82a according to a driving signal outputted by the laser system controller 20. The second high-reflective mirror 82a may reflect the pulse laser beam to a direction according to the posture adjusted by the actuator 84a. The actuator 84a may change the posture angle of the high-reflective mirror 82a, for example, in two directions perpendicular to each other.

By adjusting the posture angle of each of the high-reflective mirrors 81a and 82a, the beam steering device 8ay may control both the beam pointing of the pulse laser beam and the beam position of the pulse laser beam.

The first laser apparatus 2ay may include, instead of the beam steering device Say, the first beam steering device 8a described with reference to FIG. 6.

Configuration of the beam divergence adjuster 14x may be substantially the same as the corresponding configuration described above with reference to FIG. 31.

In the fifth embodiment, the beam steering device 8ay and the beam divergence adjuster 14x may be controlled, at each laser apparatus, according to the beam parameters measured by the beam parameter measuring device 6ay such as the beam divergence, the beam pointing, the beam position, and the beam size. Further, similarly to the first or the second embodiment, the first to eighth beam steering devices 8a to 8h and the first to eighth beam adjusters 7a to 7h may be controlled based on the beam parameters measured by the beam parameter measuring device 6 in the beam delivery device 50. This may enable to further stabilize the beam parameters.

8. Sixth Embodiment

Figure 36:
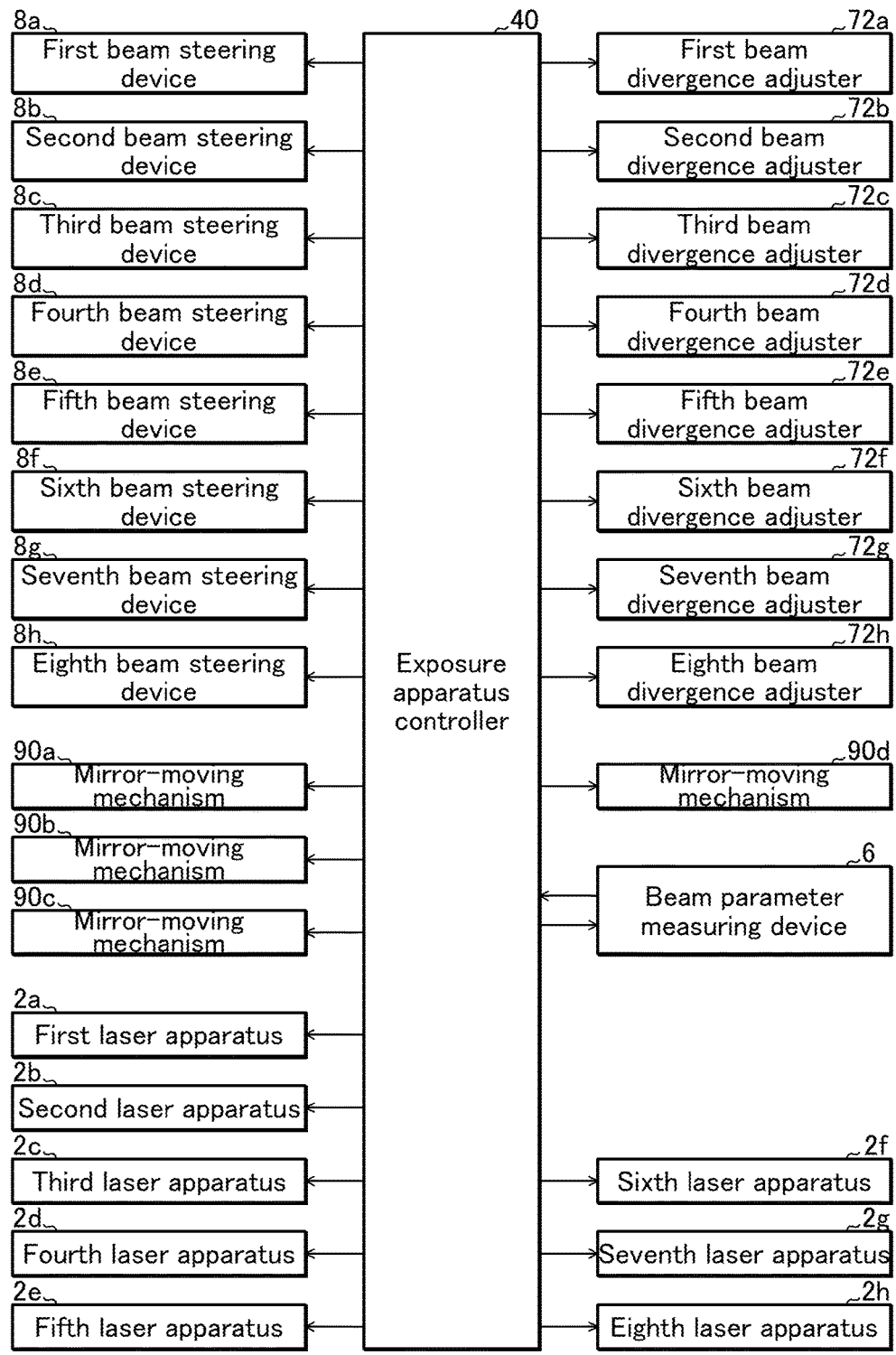
FIG. 36 is a block diagram of a laser system according to a sixth embodiment of the present disclosure.

FIG. 36 is a block diagram of a laser system according to a sixth embodiment of the present disclosure. In the sixth embodiment, instead of the beam delivery device controller 59 or the laser system controller 20, the exposure apparatus controller 40 in the exposure apparatus 4 may perform the various controls.

The exposure apparatus controller 40 may control the first to eighth beam steering devices 8a to 8h, the first to eighth beam divergence adjusters 72a to 72h, the mirror-moving mechanisms 90a to 90d, and the first to eighth laser apparatuses 2a to 2h.

In other aspects, the sixth embodiment may be substantially the same as each embodiment described above.

9. Beam Combiner Including Fly Eye Lens

Figure 37:
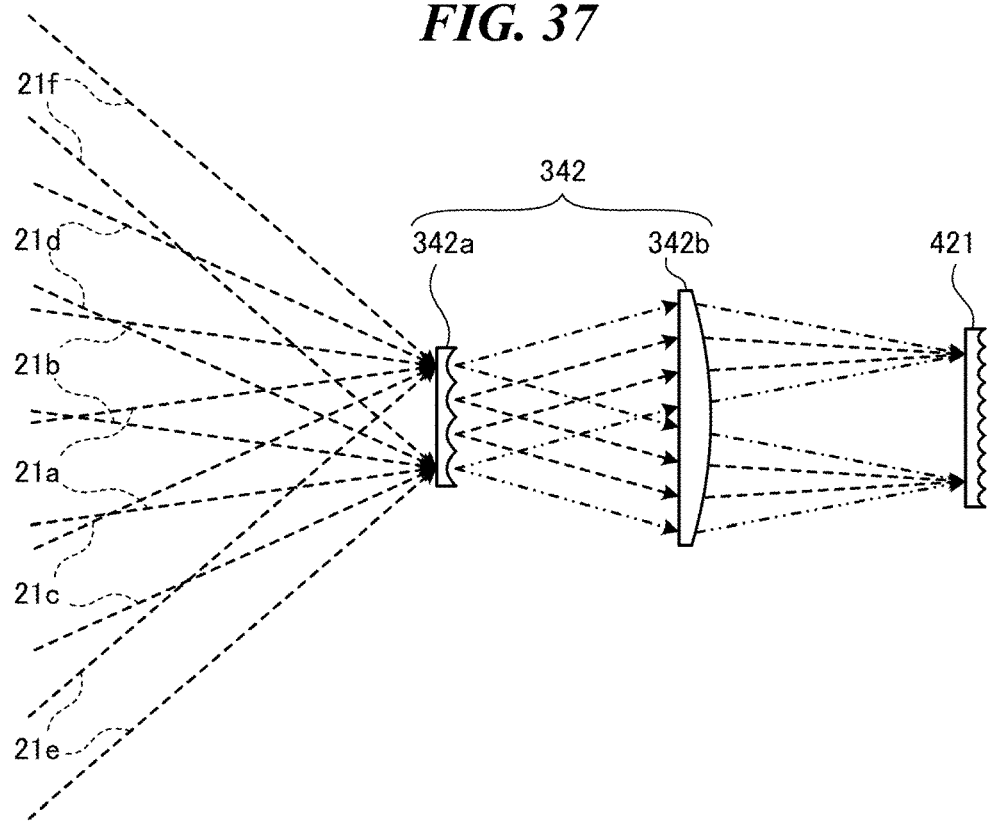
FIG. 37 shows an example of a beam combiner that can be used in each of the above embodiments.

FIG. 37 shows an example of a beam combiner that can be used in each of the above embodiments. In FIG. 37, illustration of the high-reflective mirror 41 in the exposure apparatus 4 is omitted. Instead of the beam combiner 34 using the diffractive optical element shown in FIG. 1, a beam combiner 342 including a fly eye lens 342a and condenser optics 342b may be used.

The fly eye lens 342a may be constituted by an ultraviolet-transmitting substrate, such as a synthetic quartz substrate or a calcium fluoride substrate, on which multiple concave or convex lenses are formed. The fly eye lens 342a may be provided at the position where the first to sixth pulse laser beams 21a to 21f emitted from the incident optics 33 overlap with each other.

In FIG. 37, the pulse laser beams emitted from the incident optics 33 include the first to sixth pulse laser beams 21a to 21f. However, the pulse laser beams may include the first to eighth pulse laser beams 21a to 21h, or any plural number of pulse laser beams.

The lenses included in the fly eye lens 342a may be arranged in the cross sections of the plurality of pulse laser beams. The lenses may transmit respective parts of the plurality of pulse laser beams toward the condenser optics 342b and expand beam widths of the respective parts. The fly eye lens 342a may thus form multiple point light sources as secondary light sources using the pulse laser beams. The fly eye lens 342a may include a set of cylindrical concave or convex lenses arranged in one direction and another set of cylindrical concave or convex lenses arranged in another direction perpendicular to the one direction.

The condenser optics 342b may include at least one convex lens. The condenser optics 342b may extend over the optical paths of the respective parts of the plurality of pulse laser beams expanded by the respective lenses of the fly eye lens 342a.

The fly eye lens 342a may be provided such that a front-side focal plane of the condenser optics 342b substantially coincides with respective focal positions of the fly eye lens 342a. The condenser optics 342b may thus collimate each of the parts of the plurality of pulse laser beams expanded by the respective lenses of the fly eye lens 342a, such that each of the parts has substantially parallel rays.

The condenser optics 342b may be provided such that a rear-side focal plane of the condenser optics 342b substantially coincides with a light-receiving surface of the fly eye lens 421 of the exposure apparatus 4. The condenser optics 342b may thus make the respective parts, expanded by the respective lenses of the fly eye lens 342a, enter substantially the same portion of the fly eye lens.

Consequently, the pulse laser beam in which the parts are overlapping with each other at the light-receiving surface of the fly eye lens 421 of the exposure apparatus 4 may have small variation in light intensity distribution in a cross section of the pulse laser beam.

10. Exposure Apparatus Including Line Focusing Optics

Figure 38:
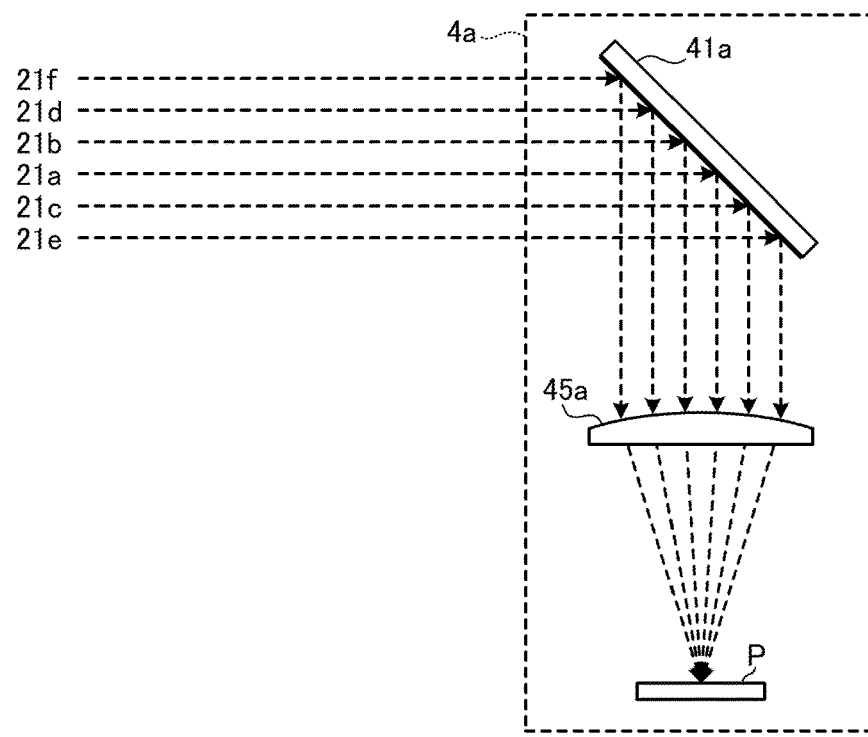
FIG. 38 shows an example of an exposure apparatus that can be used in each of the above embodiments.

FIG. 38 shows an example of an exposure apparatus that can be used in each of the above embodiments. The exposure apparatus 4a shown in FIG. 38 may include a high-reflective mirror 41a and line focusing optics 45a. In FIG. 38, the bundled laser beam may include the first to sixth pulse laser beams 21a to 21f. However, the bundled laser beam may include the first to eighth pulse laser beams 21a to 21h, or any plural number of pulse laser beams.

The bundled laser beam may be incident on the high-reflective mirror 41a in the exposure apparatus 4a. The bundled laser beam may be reflected by the high-reflective mirror 41a and enter the line focusing optics 45a. The line focusing optics 45a may include, for example, a convex cylindrical lens. The line focusing optics 45a may concentrate the bundled laser beam on a light-receiving surface of the irradiation object P such that the pulse laser beams included in the bundled laser beam overlap with each other.

11. Configuration of Controller

Figure 39:
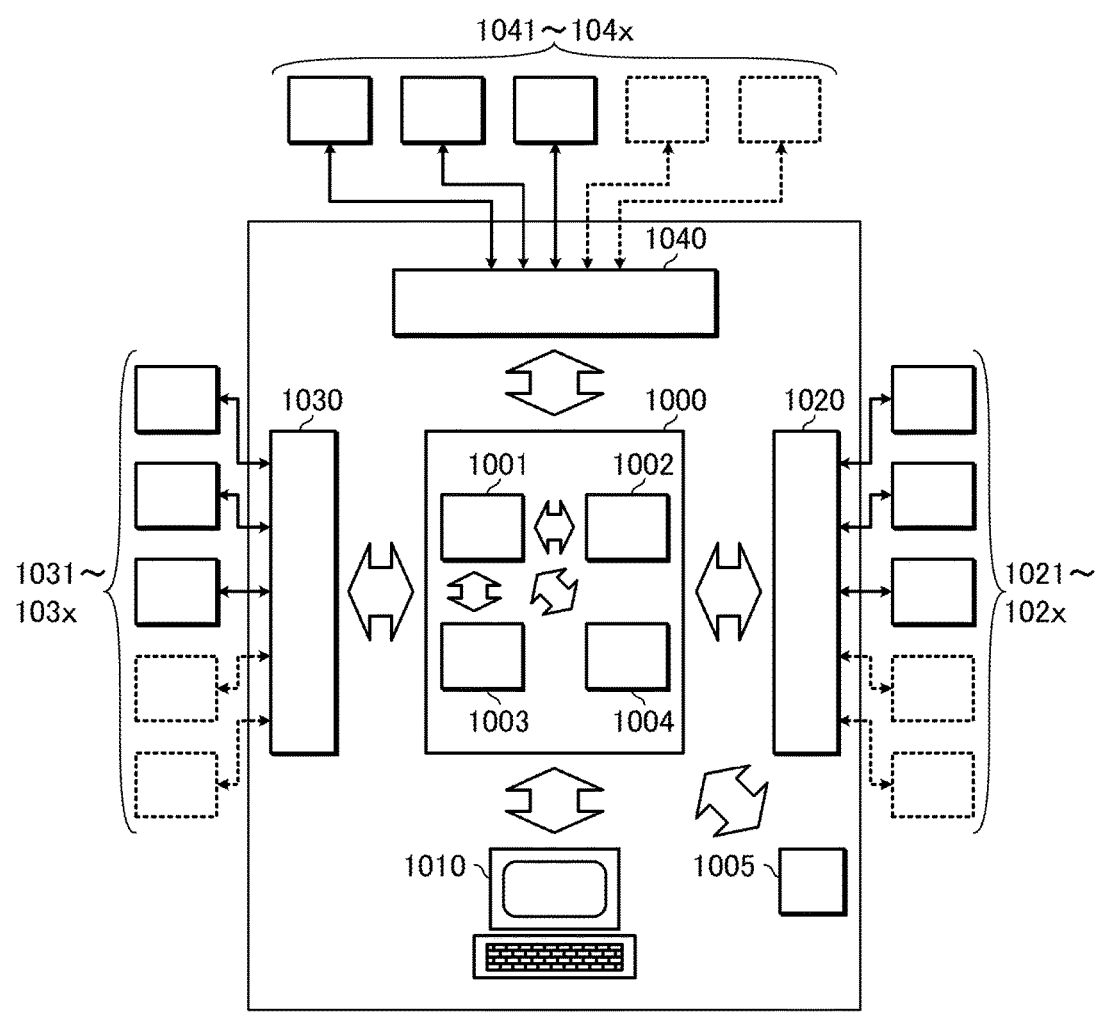
FIG. 39 is a block diagram schematically illustrating a configuration of the controller.

FIG. 39 is a block diagram schematically illustrating a configuration of the controller.

A controller, such as the laser system controller 20 or the beam delivery device controller 59, in the above-mentioned embodiments may be constituted by a general-purpose control device, such as a computer or a programmable controller. For example, the controller may be constituted as described below.

(Configuration)

The controller may include a processor 1000 and other elements connected to the processor 1000. Such elements may include a storage memory 1005, a user interface 1010, a parallel input/output (I/O) controller 1020, a serial I/O controller 1030, and an analog-to-digital (A/D) and digital-to-analog (D/A) converter 1040. The processor 1000 may include a central processing unit (CPU) 1001 and other elements connected to the CPU 1001 including a memory 1002, a timer 1003, and a graphics processing unit (GPU) 1004.

(Operation)

The processor 1000 may read out programs stored in the storage memory 1005. The processor 1000 may execute the read-out programs, read out data from the storage memory 1005 in accordance with the execution of the programs, or store data in the storage memory 1005.

The parallel I/O controller 1020 may be connected to devices 1021 to 102x communicable through parallel I/O ports. The parallel I/O controller 1020 may control communication using digital signals through the parallel I/O ports that is performed in the process where the processor 1000 executes programs.

The serial I/O controller 1030 may be connected to devices 1031 to 103x communicable through serial I/O ports. The serial I/O controller 1030 may control communication using digital signals through the serial I/O ports that is performed in the process where the processor 1000 executes programs.

The A/D and D/A converter 1040 may be connected to devices 1041 to 104x communicable through analog ports. The A/D and D/A converter 1040 may control communication using analog signals through the analog ports that is performed in the process where the processor 1000 executes programs.

The user interface 1010 may be configured to display progress of executing programs by the processor 1000 to an operator or to receive instructions by the operator to the processor 1000 to stop execution of the programs or to execute interruption processing.

The CPU 1001 of the processor 1000 may perform arithmetic processing of programs. In the process where the CPU 1001 executes programs, the memory 1002 may temporally store programs or temporally store data in the arithmetic process. The timer 1003 may measure time or elapsed time. The timer 1003 may output the time or the elapsed time to the CPU 1001 in accordance with the execution of the programs. When image data is inputted to the processor 1000, the GPU 1004 may process the image data in accordance with the execution of the programs and output the results to the CPU 1001.

The devices 1021 to 102x communicable through the parallel I/O ports, which are connected to the parallel I/O controller 1020, may be the first to eighth laser apparatuses 2a to 2h, the exposure apparatus controller 40, another controller, or the like, and may be used for sending or receiving the oscillation trigger signal or the signal indicating the timing.

The devices 1031 to 103x communicable through the serial I/O ports, which are connected to the serial I/O controller 1030, may be the first to eighth laser apparatuses 2a to 2h, the exposure apparatus controller 40, another controller, or the like, and may be used for sending or receiving data.

The devices 1041 to 104x communicable through the analog ports, which are connected to the A/D and D/A converter 1040, may be various sensors, such as the beam parameter measuring device 6, the pulse energy measuring unit 17, or the like.

With the above-mentioned configuration, the controller may be capable of achieving the operation illustrated in each of the embodiments.

The aforementioned descriptions are intended to be taken only as examples, and are not to be seen as limiting in any way. Accordingly, it will be clear to those skilled in the art that variations on the embodiments of the present disclosure may be made without departing from the scope of the appended claims.

The terms used in the present specification and in the entirety of the scope of the appended claims are to be interpreted as not being limiting. For example, wording such as "includes" or "is included" should be interpreted as not being limited to the item that is described as being included. Furthermore, "has" should be interpreted as not being limited to the item that is described as being had. Furthermore, the modifier "a" or "an" as used in the present specification and the scope of the appended claims should be interpreted as meaning "at least one" or "one or more".

The invention claimed is:

1. A laser system comprising:
   a plurality of laser apparatuses;
   a beam delivery device configured to bundle pulse laser beams emitted from respective laser apparatuses of the plurality of laser apparatuses to emit a bundled pulse laser beam;
   a beam parameter measuring device provided in an optical path of the bundled pulse laser beam to measure a beam parameter of each one of the pulse laser beams and a beam parameter of the bundled pulse laser beam;
   beam steering devices provided in respective optical paths between the respective laser apparatuses and the beam parameter measuring device;
   a controller configured to control the beam steering devices based on measurement result of the beam parameter measuring device; and
   beam divergence adjusters provided in the respective optical paths between the respective laser apparatuses and the respective beam steering devices, wherein
   the controller controls the beam steering devices and the beam divergence adjusters based on the measurement result of the beam parameter measuring device.

2. The laser system according to claim 1, wherein
   the beam parameter measuring device includes a selecting mechanism, the selecting mechanism being configured to select at least one of the pulse laser beams, the beam parameter measuring device being configured to measure the beam parameter of each one of the at least one of the pulse laser beams.

3. The laser system according to claim 1, wherein the beam parameter measuring device includes an image sensor and a selecting mechanism, the selecting mechanism being configured to select at least one of the pulse laser beams to have the at least one of the pulse laser beams enter the image sensor, the image sensor being configured to measure the beam parameter of each one of the at least one of the pulse laser beams.

4. A laser system comprising:
a plurality of laser apparatuses;
a beam delivery device configured to bundle pulse laser beams emitted from respective laser apparatuses of the plurality of laser apparatuses to emit a bundled pulse laser beam;
a beam parameter measuring device provided in an optical path of the bundled pulse laser beam to measure a beam parameter of each one of the pulse laser beams and a beam parameter of the bundled pulse laser beam;
beam steering devices provided in respective optical paths between the respective laser apparatuses and the beam parameter measuring device;
a controller configured to control the beam steering devices based on measurement result of the beam parameter measuring device; and
optical path length adjusters provided in the respective optical paths between the respective laser apparatuses and the respective beam steering devices, wherein
the controller controls the beam steering devices and the optical path length adjusters based on the measurement result of the beam parameter measuring device.

5. The laser system according to claim 4, wherein the beam parameter measuring device includes a selecting mechanism, the selecting mechanism being configured to select at least one of the pulse laser beams, the beam parameter measuring device being configured to measure the beam parameter of each one of the at least one of the pulse laser beams.

6. The laser system according to claim 4, wherein the beam parameter measuring device includes an image sensor and a selecting mechanism, the selecting mechanism being configured to select at least one of the pulse laser beams to have the at least one of the pulse laser beams enter the image sensor, the image sensor being configured to measure the beam parameter of each one of the at least one of the pulse laser beams.

7. A laser system comprising:
a plurality of laser apparatuses;
a beam delivery device configured to bundle pulse laser beams emitted from respective laser apparatuses of the plurality of laser apparatuses to emit a bundled pulse laser beam;
a beam parameter measuring device provided in an optical path of the bundled pulse laser beam to measure a beam parameter of each one of the pulse laser beams and a beam parameter of the bundled pulse laser beam;
beam steering devices provided in respective optical paths between the respective laser apparatuses and the beam parameter measuring device;
a controller configured to control the beam steering devices based on measurement result of the beam parameter measuring device; and
beam divergence adjusters provided in the respective laser apparatuses, wherein
the controller controls the beam steering devices and the beam divergence adjusters based on the measurement result of the beam parameter measuring device.

8. The laser system according to claim 7, wherein the beam parameter measuring device includes a selecting mechanism, the selecting mechanism being configured to select at least one of the pulse laser beams, the beam parameter measuring device being configured to measure the beam parameter of each one of the at least one of the pulse laser beams.

9. The laser system according to claim 7, wherein the beam parameter measuring device includes an image sensor and a selecting mechanism, the selecting mechanism being configured to select at least one of the pulse laser beams to have the at least one of the pulse laser beams enter the image sensor, the image sensor being configured to measure the beam parameter of each one of the at least one of the pulse laser beams.

* * * * *